(12) United States Patent
Akita et al.

(10) Patent No.: US 9,722,819 B2
(45) Date of Patent: Aug. 1, 2017

(54) DISTORTION COMPENSATION SYSTEM AND COMMUNICATION APPARATUS

(71) Applicant: DENSO CORPORATION, Kariya, Aichi-pref. (JP)

(72) Inventors: Hironobu Akita, Kariya (JP); Shigeki Ohtsuka, Kariya (JP); Nobuaki Matsudaira, Kariya (JP); Takahisa Yoshimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/027,534

(22) PCT Filed: Sep. 22, 2014

(86) PCT No.: PCT/JP2014/004842
§ 371 (c)(1),
(2) Date: Apr. 6, 2016

(87) PCT Pub. No.: WO2015/052879
PCT Pub. Date: Apr. 16, 2015

(65) Prior Publication Data
US 2016/0241422 A1    Aug. 18, 2016

(30) Foreign Application Priority Data

Oct. 9, 2013  (JP) ................................. 2013-211869
Apr. 22, 2014 (JP) ................................. 2014-088220
Jun. 17, 2014 (JP) ................................. 2014-124297

(51) Int. Cl.
*H03H 7/40* (2006.01)
*H04L 25/03* (2006.01)
(Continued)

(52) U.S. Cl.
CPC ......... *H04L 25/03057* (2013.01); *H04B 3/04* (2013.01); *H04B 3/10* (2013.01);
(Continued)

(58) Field of Classification Search
CPC ......... H04L 25/03038; H04L 25/03133; H04L 25/03057
(Continued)

(56) References Cited

U.S. PATENT DOCUMENTS 5,835,526 A    11/1998 Juntti
2004/0203559 A1    10/2004 Stojanovic et al.
(Continued)

FOREIGN PATENT DOCUMENTS

JP    06-165241 A    6/1994
JP    2012-217081 A    11/2012

OTHER PUBLICATIONS

Yoshikazu Fujishiro, "Taking Advantage of S-Parameter", TDK Corporation Application Center.
(Continued)

*Primary Examiner* — Khai Tran
(74) *Attorney, Agent, or Firm* — Posz Law Group, PLC

(57) ABSTRACT

A distortion compensation system includes a first communication node including a first reception unit including an equalizer configured by a first digital filter unit and a first transmission unit including an emphasis circuit configured by a second digital filter unit, and a second communication node including a second transmission unit transmitting a training pattern before receiving normal data from the first communication node. The equalizer converges a filter constant of the first digital filter unit so that an error of the received training pattern is converged. The first transmission unit performs a distortion compensation using the converged filter constant of the first digital filter unit as at least a part of a filter constant of the second digital filter unit of the emphasis circuit, and then transmits the data.

40 Claims, 38 Drawing Sheets

(51) Int. Cl.
  *H04B 3/10* (2006.01)
  *H04L 25/02* (2006.01)
  *H04B 3/04* (2006.01)
  *H04B 3/14* (2006.01)

(52) U.S. Cl.
  CPC ........... *H04B 3/14* (2013.01); *H04L 25/0272* (2013.01); *H04L 25/0278* (2013.01); *H04L 25/03* (2013.01); *H04L 2025/03815* (2013.01)

(58) Field of Classification Search
  USPC ............... 375/231, 219, 229, 232, 233, 257; 708/322, 323
  See application file for complete search history.

(56) References Cited

U.S. PATENT DOCUMENTS

| | | | |
|---|---|---|---|
| 2005/0134305 A1 | 6/2005 | Stojanovic et al. | |
| 2005/0134306 A1 | 6/2005 | Stojanovic et al. | |
| 2005/0134307 A1 | 6/2005 | Stojanovic | |
| 2005/0281343 A1 | 12/2005 | Hsu et al. | |
| 2007/0178849 A1* | 8/2007 | St. Germain | H04L 25/0298 455/83 |
| 2008/0080608 A1 | 4/2008 | Mobin et al. | |
| 2008/0080609 A1 | 4/2008 | Mobin et al. | |
| 2008/0080611 A1 | 4/2008 | Mobin et al. | |
| 2008/0137721 A1 | 6/2008 | Hsu et al. | |
| 2008/0310569 A1 | 12/2008 | Takeuchi | |
| 2009/0290651 A1* | 11/2009 | Okamura | H04L 1/205 375/257 |
| 2010/0327924 A1 | 12/2010 | Hasegawa et al. | |
| 2011/0206109 A1* | 8/2011 | Agazzi | H03M 1/0604 375/229 |
| 2012/0207202 A1 | 8/2012 | Hidaka | |
| 2012/0207204 A1 | 8/2012 | Hidaka | |
| 2013/0114665 A1* | 5/2013 | Aziz | H04L 25/03057 375/233 |

OTHER PUBLICATIONS

Dr. Thomas Kirchner, "Cleaning the Rusty Channel Emphasis, Equalization & Embedding", Agilent Technologies.
Florian Hartwich, "CAN with Flexible Data-Rate", Proceedings of the 13th international CAN Conference (ICC), Hambach, Germany, Mar. 5, 2012, pp. 14-1-14-9.
International Search Report of the International Searching Authority dated Nov. 4, 2014 issued in the corresponding International application No. PCT/JP2014/004842 (and English translation).
Ramin Farjad-Rad et al., "A 0.4-µm CMOS 10-Gb/s 4-PAM Pre-Emphasis Serial Link Transmitter", IEE Journal of Solid-State Circuits, vol. 24, No. 5, May 1999.
Miao Li et al., "FIR Filter Optimization as Pre-emphasis of High-speed Backplane Data Transmission", 2004.

* cited by examiner

FIG. 10A

| h1[0] | h1[1] | h1[2] | h1[3] | h1[4] | h1[5] | h1[6] | h1[7] | h1[8] | h1[9] | h1[10] | h1[11] |
|---|---|---|---|---|---|---|---|---|---|---|---|
| 0.005149 | 0.00428 | -0.01967 | 0.005872 | 0.03701 | -0.0402 | -0.03089 | 0.067358 | 0.054643 | -0.1222 | -0.61491 | 2.295077 |

FIG. 10B

| h2[0] | h2[1] | h2[2] | h2[3] | h2[4] | h2[5] | h2[6] | h2[7] | h2[8] | h2[9] | h2[10] | h2[11] |
|---|---|---|---|---|---|---|---|---|---|---|---|
| 0 | -0.34893 | -0.51896 | 0.229592 | -0.00103 | 9.37E-05 | 0.001408 | -0.00152 | -0.00061 | 0.000486 | 0.000328 | -0.00096 |

FIG. 19

|  | h1[0] | h1[1] | h1[2] | ... | h2[0] | h2[1] | h2[2] | ... |
|---|---|---|---|---|---|---|---|---|
| FILTER CONSTANT CORRESPONDING TO ECU_B | B10 | B11 | B12 | ... | B20 | B21 | B22 | ... |
| FILTER CONSTANT CORRESPONDING TO ECU_C | C10 | C11 | C12 | ... | C20 | C21 | C22 | ... |
| FILTER CONSTANT CORRESPONDING TO ECU_D | D10 | D11 | D12 | ... | D20 | D21 | D22 | ... |
| FILTER CONSTANT CORRESPONDING TO ECU_E | E10 | E11 | E12 | ... | E20 | E21 | E22 | ... |
| FILTER CONSTANT CORRESPONDING TO ECU_F | F10 | F11 | F12 | ... | F20 | F21 | F22 | ... |
| : | : | : | : | ... | : | : | : | ... |

DISTORTION COMPENSATION SYSTEM AND COMMUNICATION APPARATUS

CROSS REFERENCE TO RELATED APPLICATIONS

This application is a U.S. national stage of International Application No. PCT/JP2014/004842 filed on Sep. 22, 2014 and is based on Japanese Patent Application No. 2013-211869 filed on Oct. 9, 2013, Japanese Patent Application No. 2014-088220 filed on Apr. 22, 2014, and Japanese Patent Application No. 2014-124297 filed on Jun. 17, 2014, the disclosures of which are incorporated herein by reference.

TECHNICAL FIELD

The present disclosure relates to a distortion compensation system and a communication apparatus each of which compensates for distortion occurring during data transmission.

BACKGROUND ART

When multiple communication nodes perform data communication with each other through a transmission line, with an increase of data rate, a transmission waveform is more likely to be distorted. At this time, the distortion of the transmission waveform results in an intersymbol interference, which interrupts digital communication processing from being properly carried out.

When the transmission path characteristic of the transmission line has been recognized in advance and a communication apparatus includes an emphasis circuit, it is possible to compensate for waveform distortion and properly perform data communication by minimizing the influence of the distortion. In general, emphasis circuit has a pre-emphasis type and a de-emphasis type, which have substantially the same implementation and substantially the same effect.

For example, the de-emphasis type is used in the internal bus of, e.g., a personal computer or the like. In the internal bus of the personal computer, consideration is given to waveform distortion which causes, e.g., a given transmitted bit to affect an immediately subsequent bit.

Generally speaking, when considering the influence of a given transmitted bit on an immediately subsequent bit, compensation may be carried out for compensating for the distortion caused by the influence. However, the transmission characteristic of a transmission line varies depending on a cable length, a material, or the like. Thus, it is difficult to identify the transmission characteristic when a situation cannot be recognized in advance.

As another technique which improves waveform distortion, there is a technique referred to as Adaptive DFE (Decision Feedback Equalizer). According to the DFE technique, a reception unit compensates for distortion using a reception waveform.

When the DFE technique described above is used, a circuit scale tends to increase. Suppose that a communication node which transmits normal data is a first communication node and a communication node which receives the normal data is a second communication node. For example, when the second communication node is more severely limited by size constraints than the first communication node, it is difficult to provide the DFE circuit in the second communication node. There may also be cases where, under various constraints which are not limited to size constraints, the second communication node cannot include a distortion compensation circuit such as the DFE circuit.

A technique in which the first communication node transmits a test pattern to the second communication node and a result of the test pattern reception is transmitted back to the first communication node is also known for compensating for the distortion (see, e.g., Patent Literature 1). However, this configuration requires an additional communication circuit in the second communication node for transmitting back the result of test pattern reception from the second communication node toward the first communication node.

PRIOR ART LITERATURE

Patent Literature

[Patent Literature 1] JP 2008-503929 A (Japanese Patent No. 4841548)

SUMMARY OF INVENTION

In view of the foregoing difficulties, it is an object of the present disclosure to provide a distortion compensation system which can compensate for signal distortion caused by a transmission line used for a communication processing between a first communication node and a second communication node without disposing a distortion compensation circuit in the second communication node functioning as a reception node nor disposing a communication circuit in the second communication node for transmitting back a result of test pattern reception from the second communication node to the first communication node. It is also an object of the present disclosure to provide a communication apparatus which is included in the above distortion compensation system.

According to an aspect of the present disclosure, a distortion compensation system includes a first communication node and a second communication node. The first communication node includes a first reception unit and a first transmission unit. The first reception unit includes an equalizer and the equalizer includes a first digital filter unit. The first transmission unit includes an emphasis circuit and the emphasis circuit includes a second digital filter unit. The second communication node includes a second transmission unit. The second transmission unit transmits a training pattern determined in advance before receiving normal data from the first transmission unit of the first communication node through a first transmission line. The first communication node receives the training pattern transmitted from the second transmission unit of the second communication node using the first reception unit. The equalizer converges a filter constant of the first digital filter unit so that an error with respect to the training pattern to be received is converged. The first transmission unit of the first communication node performs a distortion compensation on the normal data to be transmitted using the converged filter constant of the first digital filter unit as at least a part of a filter constant of the second digital filter unit of the emphasis circuit, and then transmits the normal data.

According to the foregoing distortion compensation system, prior to an execution of the communication processing on the normal data between the first communication node and the second communication node, the second transmission unit of the second communication node transmits the training pattern determined in advance to the first communication node. The first reception unit of the first communication node converges the filter constant of the first digital filter of the equalizer so as to reduce reception errors of the training pattern.

Then, the first transmission unit of the first communication node performs the distortion correction in advance using the converged filter constant of the first digital filter as at least a part of the filter constant of the second digital filter of the emphasis circuit, and transmits the corrected signal. Thus, the first and second communication nodes can compensate for the signal distortion caused by the transmission line.

In the above configuration, a distortion compensation circuit is no longer necessary in the second communication node, which functions as the data receiver. It is sufficient for the second communication node to only dispose a transmission circuit for transmitting the training pattern. This configuration further eliminates the need to dispose the communication circuit for transmitting back the result of test pattern reception in the second communication node.

According to another aspect of the present disclosure, a communication apparatus includes a first reception unit and a first transmission unit. The first reception unit includes an equalizer and the equalizer includes a first digital filter unit. The first transmission unit includes an emphasis circuit and the emphasis circuit includes a second digital filter unit. The first reception unit receives a training pattern when the training pattern determined in advance is transmitted from a second transmission unit of a second communication node. The equalizer converges a filter constant of the first digital filter unit so that an error with respect to the training pattern to be received is converged. The first transmission unit performs a distortion compensation on normal data to be transmitted using the converged filter constant of the first digital filter as at least a part of a filter constant of the second digital filter unit of the emphasis circuit, and then transmits the normal data.

In the foregoing communication apparatus, the first transmission unit performs the distortion correction in advance using the converged filter constant of the first digital filter as at least a part of the filter constant of the second digital filter of the emphasis circuit, and then transmits the corrected signal. This configuration can compensate for the signal distortion caused by a transmission line between the foregoing communication apparatus and the external second communication node without disposing a distortion compensation circuit in the second communication node nor disposing a communication circuit for transmitting back the result of test pattern reception from the second communication node to the foregoing communication apparatus.

BRIEF DESCRIPTION OF DRAWINGS

The above and other objects, features and advantages of the present disclosure will become more apparent from the following detailed description made with reference to the accompanying drawings. In the drawings:

FIGS. 10A and 10B are diagrams illustrating an example of a simulation of the converged filter constants of the digital filters;

FIG. 19 is a diagram illustrating an example of the filler constants of the digital filters acquired by the first communication node;

EMBODIMENTS FOR CARRYING OUT INVENTION

Figure 1:
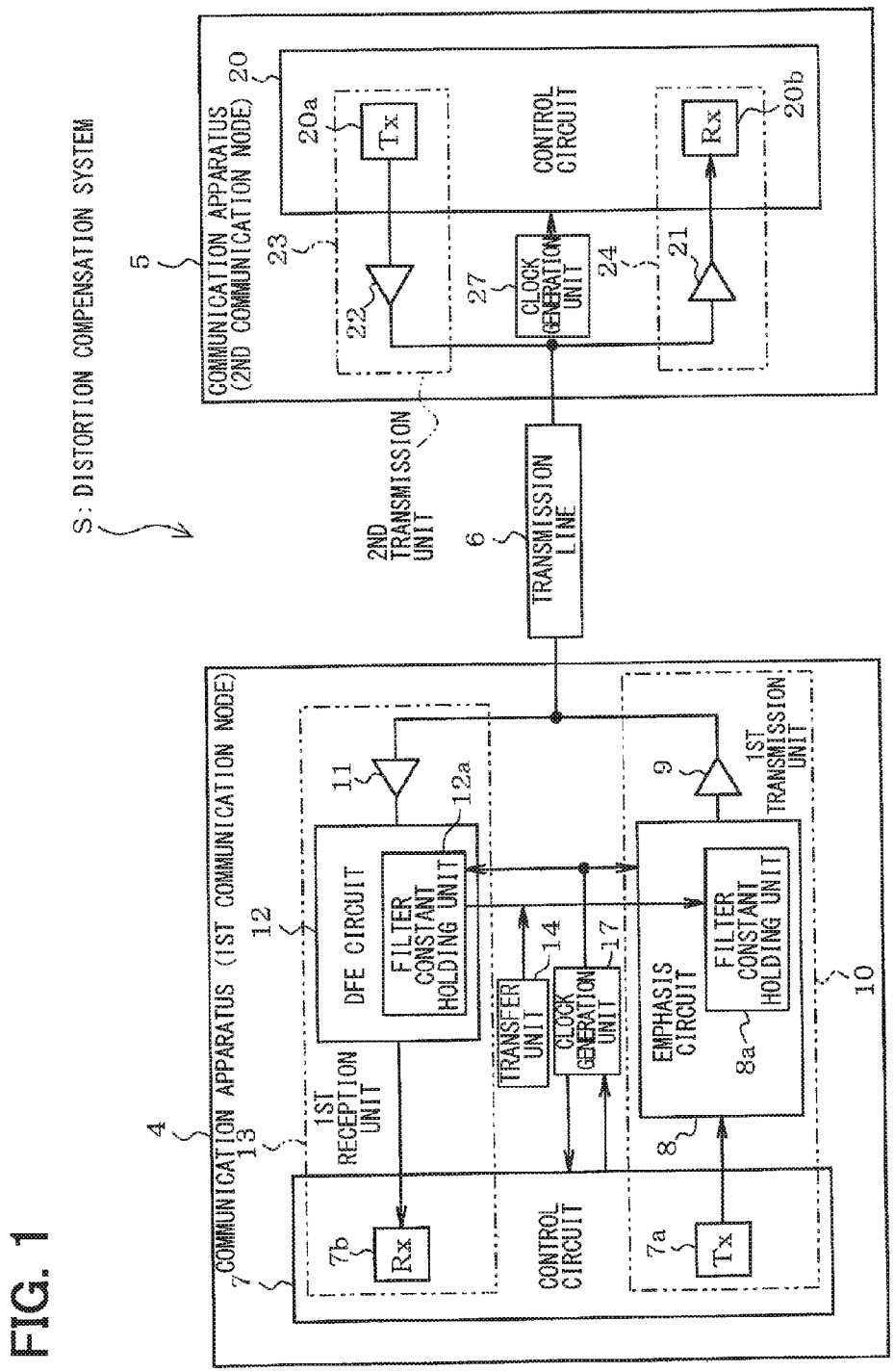
FIG. 1 is a block diagram schematically showing an example of an electric configuration of a distortion compensation system according to a first embodiment of the present disclosure.

The foregoing will describe several embodiments of a distortion compensation system with reference to the accompanying drawings. A description of a constituent feature having the same or a similar function in each of the embodiments is omitted as necessary by designating the constituent feature with the same or a similar reference numeral. A description will be given mainly of a portion with the characteristic feature of each of the embodiments.

First Embodiment

Figure 2:
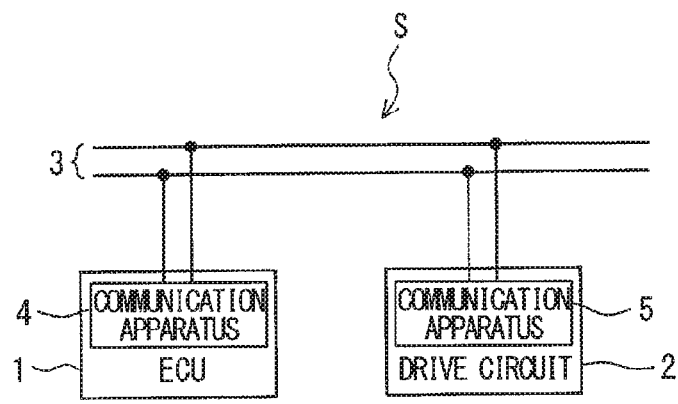
FIG. 2 is a block diagram schematically showing an example of an electric configuration of a vehicular system.

FIGS. 1 to 12 show the first embodiment. FIG. 1 shows an example of an electric configuration of a distortion compensation system S. FIG. 2 schematically shows an example of a connection configuration in a vehicular system.

As shown in FIG. 2, in a vehicle, an ECU 1 serving as a master and a drive circuit 2 serving as a slave are connected via, e.g., a bus 3. The drive circuit 2 may be disposed for driving an actuator. When a comparison is made between the ECU 1 and the drive circuit 2, the ECU 1 has a larger circuit scale than that of the drive circuit 2, and the ECU 1 also has a space for mounting a circuit or the like which is larger than that of the drive circuit 2.

In the ECU 1, a communication apparatus (corresponding to a first communication node) 4 is mounted. In the drive circuit 2, a communication apparatus (corresponding to a second communication node) 5 is mounted. Each of the communication apparatus 4 and 5 includes, e.g., a semiconductor integrated circuit. The communication apparatus 4 of the ECU 1 includes a circuit which mainly transmits normal data. The communication apparatus 5 of the drive circuit 2 includes a circuit which mainly receives the normal data.

The bus 3 shown in FIG. 2 electrically functions as a transmission line 6 shown in FIG. 1. As shown in FIG. 1, the communication apparatus 4 of the ECU 1 includes a transmission unit 10, and the transmission unit 10 includes a control circuit 7, an emphasis circuit 8, and a transmission amplifier 9. The control circuit 7 includes, as a main component, a microcomputer. The microcomputer includes a CPU, a ROM, a RAM, a nonvolatile memory, and the like. The control circuit 7 functionally includes a data transmission unit 7a and a data reception unit 7b. The data transmission unit 7a generates digital data and outputs the digital data to the emphasis circuit 8.

The emphasis circuit 8 is a functional block which receives the digital data transmitted from the data transmission unit 7a at normal times, performs distortion compensation on the digital data, and outputs the digital data to the transmission amplifier 9 via a D/A conversion unit which is not shown. The emphasis circuit 8 includes a filter constant holding unit 8a. The filter constant holding unit 8a is a storage unit which stores constants (coefficients h1[0] to h1[k1] of a second feedforward filter FF2 in FIG. 7A and coefficients h2[0] to h2[k2] of a second feedback filter FB2 in FIG. 7B, the coefficients will be described later) required for internal processing in the digital filters. For example, the filter constant holding unit 8a may be provided by a register.

The transmission amplifier 9 converts the amplitude of an output signal from the emphasis circuit 8 to the amplitude of an electric signal and outputs the signal to the transmission line 6. A transmission signal from the transmission unit 10 is transmitted to the communication apparatus 5 via the transmission line 6.

The communication apparatus 4 of the ECU 1 includes a reception unit 13, and the reception unit 13 includes a reception amplifier 11 and a DFE circuit 12. The DFE circuit 12 serves as an equalizer. The reception unit 13 receives the signal transmitted from the communication apparatus 5 of the drive circuit 2 through the transmission line 6. The reception amplifier 11 amplifies the signal, which is transmitted from the communication apparatus 5 through the transmission line 6. Then, the reception amplifier 11 outputs the signal to the DFE circuit 12.

The DFE circuit 12 is a block which performs equalization processing for improving waveform distortion, and has an embedded filter constant holding unit 12a. The filter constant holding unit 12a is a storage unit which stores constants (coefficients h1[0] to h1[n1] of a first feedforward filter FF1 in FIG. 5A and coefficients h2[0] to h2[n2] of a first feedback filter FB1 in FIG. 5B) required for internal processing in the digital filters, which will be described later. For example, the filter constant holding unit 12a may be provided by a register.

After performing the equalization processing, the DFE circuit 12 outputs the processed signal to the data reception unit 7b of the control circuit 7. The data reception unit 7b receives the signal transmitted from the DFE circuit 12, and outputs the received signal as digital data.

The communication apparatus 4 of the ECU 1 includes a transfer unit 14. The transfer unit 14 is a block which transfers the filter constants from the filter constant holding unit 12.a of the DFE circuit 12 to the filter constant holding unit 8a of the emphasis circuit 8. The transfer unit 14 may be implemented by internal software of the microcomputer included in the control circuit 7, or may also be implemented by a hardware circuit.

The communication apparatus 4 also includes a clock generation unit 17. The clock generation unit 17 is a block which receives a control signal from the control circuit 7 to generate clock signals for the operation of the DFE circuit 12 and the emphasis circuit 8. The clock generation unit 17 is configured to be capable of changing the frequencies of the clock signals in accordance with, e.g., the control signal from the control circuit 7. The clock generation unit 17 generates and outputs required clock signals as operation clock signals to the control circuit 7, the reception unit 13 (e.g., the DFE circuit 12 or the data reception unit 7b), and the transmission unit 10 (e.g., the data transmission unit 7a, the emphasis circuit 8, or the D/A conversion unit which is not shown).

The communication apparatus 5 of the drive circuit 2 includes a control circuit 20, a reception amplifier 21, and a transmission amplifier 22. The control circuit 7 includes a microcomputer as a main component. The microcomputer includes a CPU, a ROM, a RAM, a nonvolatile memory, and the like. The control circuit 7 functionally includes a data transmission unit 20a and a data reception unit 20b. The communication apparatus 5 also includes a clock generation unit 27. The clock generation unit 27 generates a clock signal having a predetermined frequency and supplies the clock signal for the operation of the control circuit 20. The data transmission unit 20a generates digital data and outputs the digital data to the transmission amplifier 22. The transmission amplifier 22 amplifies a digital data signal and outputs the amplified digital data signal to the transmission line 6.

The reception amplifier 21 receives the transmission signal from the transmission unit 10 of the communication apparatus 4 through the transmission line 6, amplifies the received signal, and outputs the amplified signal to the data reception unit 20b. The data reception unit 20b receives the signal amplified by the reception amplifier 21 and outputs the signal as digital data.

The data reception unit 20a and the transmission amplifier 22 are included in a transmission unit 23 (corresponding to a second transmission unit) of the communication apparatus 5. The reception amplifier 21 and the data reception unit 20b are included in a reception unit 24 of the communication apparatus 5. With the above-described configuration, the communication apparatus 4 and 5 can mutually transmit or receive data to or from each other in a bidirectional manner.

Figure 3:
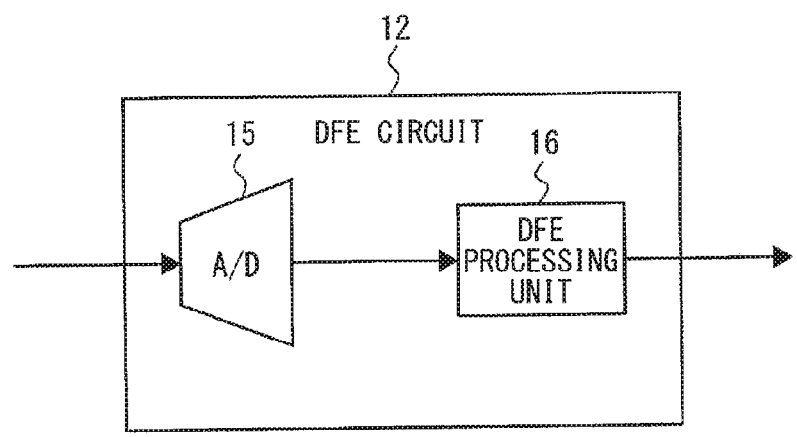
FIG. 3 is an electric configuration diagram schematically showing an example of a configuration of a DFE circuit.

The DFE circuit 12 in the communication apparatus 4 is provided by a so-called Adaptive DFE (Decision Feedback Equalizer). As shown in FIG. 3, the DFE circuit 12 includes an A/D conversion unit 15 and a DFE processing unit 16. The DFE processing unit 16 performs DFE processing on the result of conversion from the A/D conversion unit 15. The A/D conversion unit 15 performs analog-digital conversion processing on the reception signal amplified by the reception amplifier 21, and outputs a digital signal, which is converted from the analog signal, to the DFE processing unit 16.

Figure 4:
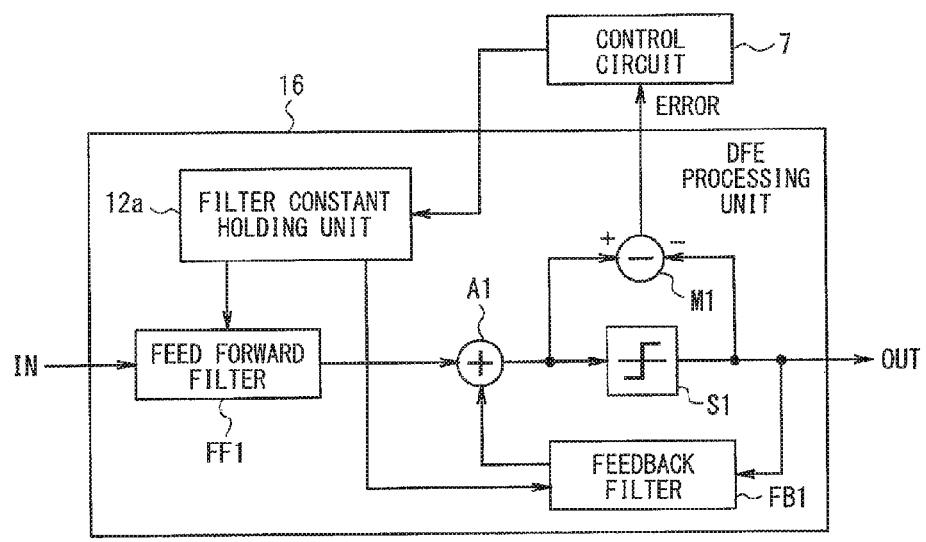
FIG. 4 is an electric configuration diagram schematically showing an example of a configuration of a DFE processing unit.

As shown in FIG. 4, the DFE processing unit 16 performs distortion compensation processing on the digital signal outputted from the A/D conversion unit 15. The DFE processing unit 16 includes a first feedforward filter FF1, an adder A1, a slicer S1, a subtractor M1, and a first feedback filter FB1.

In the example shown in FIG. 4, the first feedforward filter FF1 performs digital filter (e.g., FIR filter) processing on the digital signal inputted to the DFE processing unit 16, and outputs the filtered digital signal to the adder A1. The first feedback filter FB1 performs digital filter (e.g., FIR filter) processing on the digital signal outputted from the DFE processing unit 16 and outputs the filtered digital signal to the adder A1.

Figure 5A:
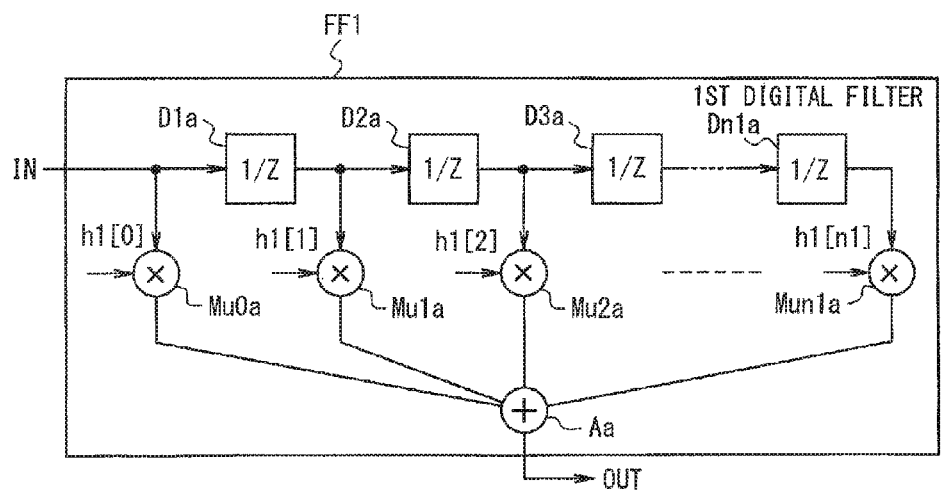
FIG. 5A is an electric configuration diagram schematically showing an example of a configuration of a digital filter when a first feedforward filter is provided by an FIR filter.

As shown in FIG. 5A, the first feedforward filter FF1 includes 1-clock delay elements D1a to Dn1a which are connected in series, multipliers Mu0a to Mun1a, and an adder Aa. The number of 1-clock delay elements is n1, and the number of multipliers is (n1+1).

Each of the delay elements D1a to Dn1a performs delay processing corresponding to one clock in response to the clocks (not shown) given by the control circuit 7. The filter constant holding unit 12a holds the coefficients h1[0] to h1[n1] and provides the coefficients h1[0] to h1[n1] to the multipliers Mu0a to Mun1a.

The multipliers Mu0a to Mun1a of the first feedforward filter FF1 multiply 0 to n1 clock delay data items, which are delayed by the respective n1 delay elements D1a to Dn1a, by the respective coefficients h1[0] to h1[n1]. Here, the 0 clock delay data item represents input data IN. The adder Aa of the first feedforward filter FF1 adds up the respective results of the multiplications by the multipliers Mu0a to Mun1a to produce output data OUT.

Figure 5B:
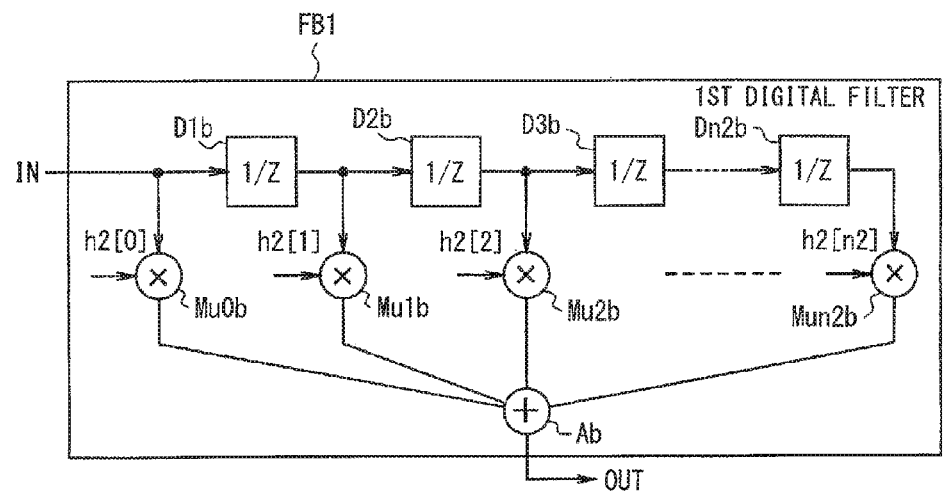
FIG. 5B is an electric configuration diagram schematically showing an example of a configuration of a digital filter when a first feedback filter is provided by an FIR filter.

As shown in FIG. 5B, the first feedback filter FB1 includes 1-clock delay elements D1b to Dn2b which are connected in series, multipliers Mu0b to Mun2b, and an adder Ab. The number of 1-clock delay elements is n2, and the number of multipliers is (n2+1).

The multipliers Mu0b to Mun2b of the first feedback filter FB1 multiply 0 to n2 clock delay data items, which are delayed by the respective n2 delay elements Mb to Dn2b, by the respective coefficients h2[0] to h2[n2]. Here, the 0 clock delay data item represents the input data IN. The adder Ab of the first feedback filter FB1 adds up the respective results of the multiplications by the multipliers Mu0b to Mun2b to produce the output data OUT In the above description, FIR filters are used as an example. Alternatively, another type (such as IIR filters) of digital filters may also be used.

The description will be continued using FIG. 4 as the drawing to be referenced. The adder A1 shown in FIG. 4 adds up respective output signals from the first feedforward filter FF1 and the first feedback filter FB1 and outputs the addition result to the slicer S1. The slicer S1 is a circuit which converts a signal waveform to a data value, and outputs the conversion result as an output of the DFE processing unit 16.

A signal waveform is distorted under the influence of the transmission line 6. The slicer S1 determines a closest signal level for the distorted waveform.

The subtractor M1 calculates the signal difference between an input signal to the slicer S1 and the output symbol OUT and outputs the calculation result as an error to the control circuit 7. The control circuit 7 receives the error, converges the respective coefficients h1[0] to h1[n1] and h2[0] to h2[n2], which are to be set to the first feedforward filter FF1 and the first feedback filter FB1, so that the error converges to 0, and stores the convergent coefficients in the filter constant holding unit 12a.

Examples of a method for converging the filter constants of the digital filters include a method using an algorithm such as, e.g., LMS (Least Mean Square), Sign-data, Sign-error, Sign-Sign LMS, or Leaky LMS. The converging method is not limited to the described methods.

The control circuit 7 converges the respective coefficients h1[0] to h1[n1] and h2[0] to h2[n2], which are to be set to the first feedforward filter FF1 and the first feedback filter FB1, such that the input of the slicer S1 is equal to the output of the slicer S1. Here, when the input/output error (input/output voltage error) becomes smaller than a predetermined value, it is considered that the convergence is completed.

After the convergence is completed, update processing for the filter constants may be ended. As another example, it is also possible to, e.g., continue the update processing at each predetermined cycle period or continue the update processing while gradually reducing the frequency of updating from the predetermined cycle period. The update processing may also be performed such that the amount of updating load is reduced. When it is empirically clear that, e.g., the error decreases to or lower than the predetermined value after performing the convergence processing for a given period of time, it may also be possible to assume that the convergence is completed after the given period of time mentioned above has elapsed using a timer. The "predetermined value" used for the convergence processing of the error is determined in terms of design in accordance with the S/N required for the system.

Figure 6:
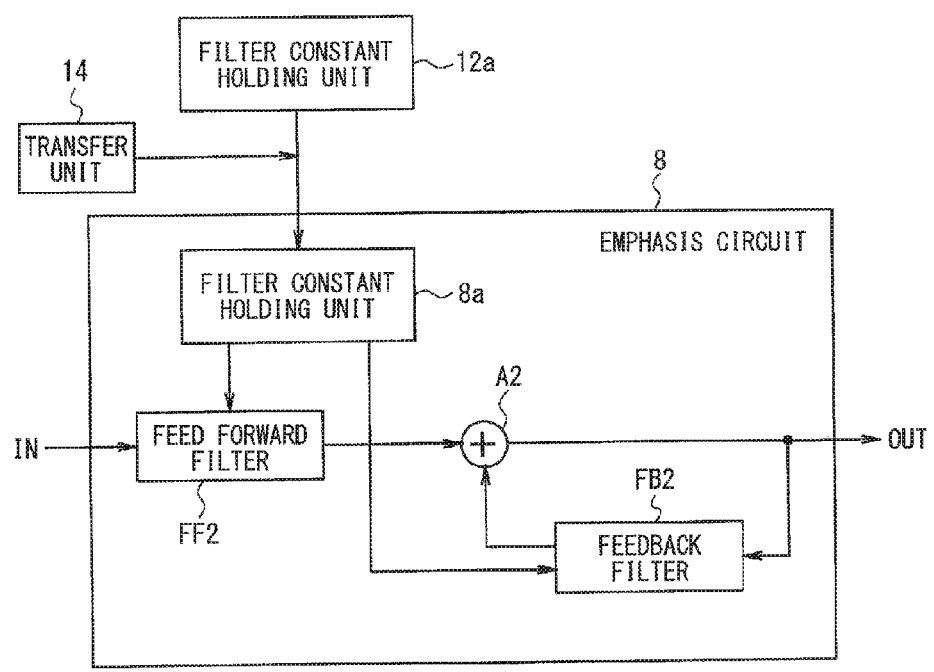
FIG. 6 is an electric configuration diagram schematically showing an example of a configuration of an emphasis circuit.

The emphasis circuit 8 shown in FIG. 6 includes the second feedforward filter FF2, the second feedback filter FB2, an adder A2, and the filter constant holding unit 8a. Here, the second feedforward filter FF2 may be provided by a similar structure as that of, e.g., the first feedforward filter FF1. The second feedback filter FB2 may be provided by a similar structure as that of, e.g., the first feedback filter FB1.

As shown in FIG. 6, the emphasis circuit 8 is functionally different from the circuit of the DFE processing unit 16. The emphasis circuit 8 is provided by a circuit in which the slicer S1 and the subtractor M1 are omitted from the DFE processing unit 16.

Figure 7A:
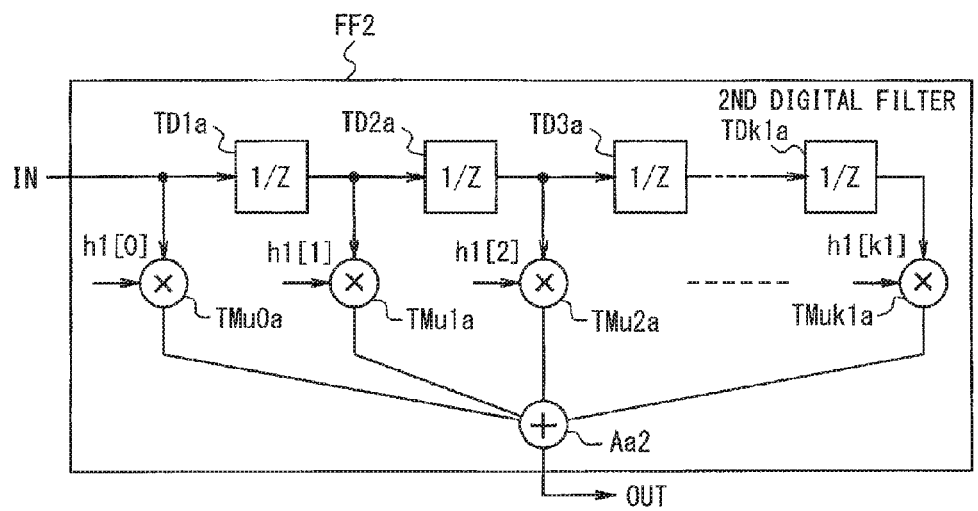
FIG. 7A is an electric configuration diagram schematically showing an example of a configuration of a digital filter when a second feedforward filter is provided by an FIR filter.
Figure 7B:
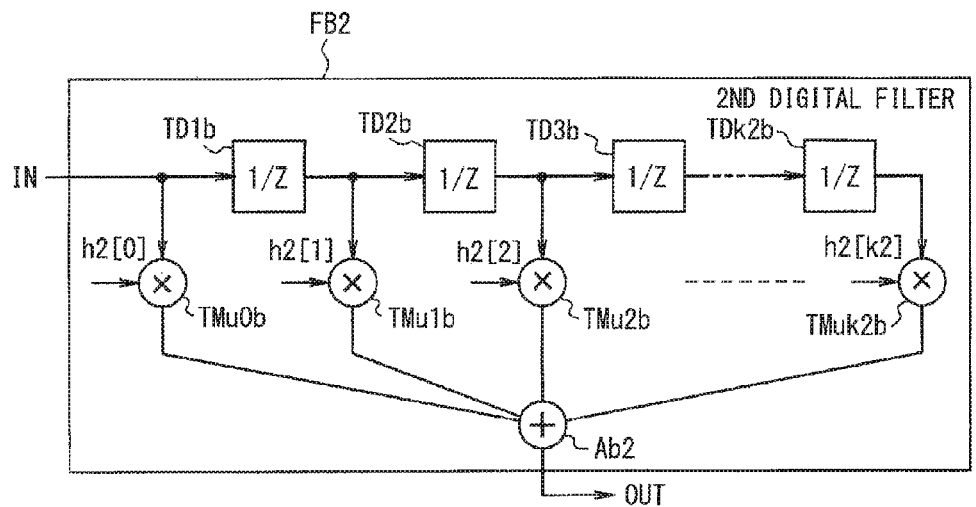
FIG. 7B is an electric configuration diagram schematically showing an example of a configuration of a digital filter when a second feedback filter is provided by an FIR filter.

FIGS. 7A and 7B schematically show an example of a configuration of the digital filter when each of the second feedforward filter FF2 and the second feedback filter FB2 is provided by an FIR filter.

As shown in FIG. 7A, the second feedforward filter FF2 includes 1-clock delay elements TD1a to TDk1a which are connected in series and multipliers TMu0a to TMuk1a. The number of 1-clock delay elements is k1, and the number of multipliers is (k1+1).

Each of the delay elements TD1a to TDn1a of the second feedforward filter FF2 performs delay processing corresponding to one clock in response to the clocks given by the control circuit 7. To the multipliers TMu0a to TMuk1a of the second feedforward filter FF2, the coefficients h1[0] to h1[k1] are respectively provided by the filter constant holding unit 8a of the emphasis circuit 8.

As described above, the DFE processing unit 16 calculates the multiplication coefficients h1[0] to h1[n1] of the first feedforward filter FF1. The calculation results are stored in the filter constant holding unit 12a in the DFE circuit 12. The transfer unit 14 transfers theses coefficients h1[0] to h1[n1] to the filter constant holding unit 8a of the emphasis circuit 8.

Here, the multipliers TMu0b to TMuk1a of the second feedforward filter FF2 are provided with the coefficients h1[0] to h1[n1] (the coefficients of the multipliers Mu0$a$ to Mun1$a$ of the first feedforward filter FF1) transferred from the transfer unit 14 to the filter constant holding unit 8$a$.

Here, when the second feedforward filter FF2 uses the digital filter which satisfies k1=n1, the multiplication coefficients h1[0] to h1[n1] of the first feedforward filter FF1 are directly provided to the multipliers TMu0$a$ to TMuk1$a$ of the second feedforward filter FF2.

The multipliers TMu0$b$ to TMuk1$a$ of the second feedforward filter FF2 multiply 0 to k1 clock delay data items, which are generated by the (k1+1) delay elements TD1$a$ to TDn1$a$, by the respective coefficients h1[0] to h1[k1]. The adder Aa2 of the second feedforward filter FF2 adds up the respective results of the multiplications by the multipliers TMu0$a$ to TMuk1$a$ to produce the output OUT.

As shown in FIG. 7B, the second feedback filter FB2 includes 1-clock delay elements TD1$b$ to TDk2$b$ which are connected in series, multipliers TMu0$b$ to TMuk2$b$, and an adder Ab2. The number of 1-clock delay elements is k2, and the number of the multipliers is (k2+1).

Each of the delay elements TD1$b$ to TDk2$b$ of the second feedback filter FB2 performs delay processing corresponding to one clock in response to the clocks given by the control circuit 7. To the multipliers TMu0$b$ to TMuk2$b$ of the second feedback filter FB2, the coefficients h2[0] to h2[k2] are provided by the filter constant holding unit 8$a$ of the emphasis circuit 8.

As described above, the DFE processing unit 16 of the DFE circuit 12 calculates the multiplication coefficients h2[0] to h2[n2] of the first feedback filter FB1. The calculation results are stored in the filter constant holding unit 12$a$ in the DFE circuit 12. The transfer unit 14 transfers the coefficients h2[0] to h2[n2] to the filter constant holding unit 8$a$ of the emphasis circuit 8. Then, the filter constant holding unit 8$a$ provides the coefficients h2[0] to h2[n2] of the multipliers Mu0$b$ to Mun2$b$ of the first feedback filter FB1 to the multipliers TMu0$b$ to TMuk2$b$ of the second feedback filter FB2.

Here, when the second feedback filter FB2 uses a digital filter which satisfies k2=n2, the multiplication coefficients h2[0] to h2[n2] of the first feedback filter FB1 may be directly provided to the multipliers TMu0$b$ to TMuk2$b$ of the second feedback filter FB2.

The multipliers TMu0$b$ to TMuk2$b$ of the second feedback filter FB2 multiply 0 to k2 clock delay data items, which are generated by the (k2+1) delay elements TD1$b$ to TDk2$b$ through delay processing as necessary, by respective coefficients h2[0] to h2[k2].

The adder Ab2 of the second feedback filter FB2 adds up the respective results of the multiplications by the multipliers TMu0$b$ to TMuk2$b$ to produce the output OUT. Consequently, even when the input data IN is at a digital level corresponding to binary values "0" and "1", the output data OUT is digital data having a decimal level other than the binary values.

Figure 8:
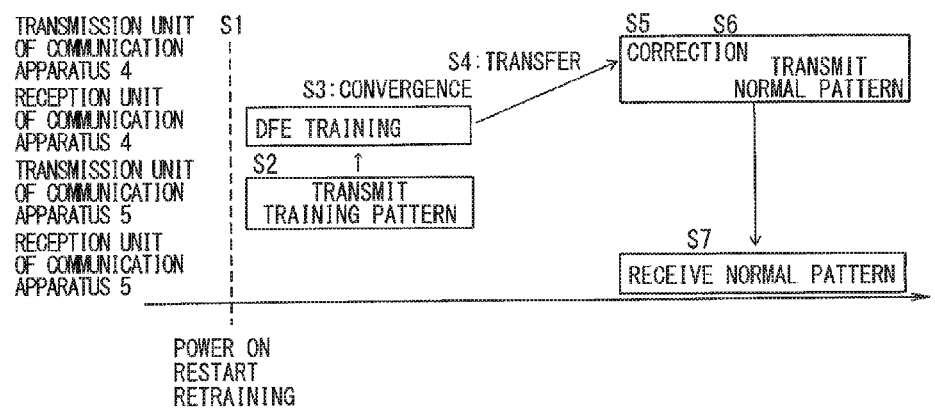
FIG. 8 is a timing chart schematically showing an example of the flow of communication processing of a training pattern and communication processing of normal data.

The following will describe communication operation in the foregoing configuration with reference to FIG. 8. The communication apparatus 4 of the ECU 1 performs transmission processing on the large-capacity normal data between the communication apparatus 4 and the communication apparatus 5 of the drive circuit 2 through the transmission line 6. In the present embodiment, prior to an execution of the transmission/reception processing on the normal data, the communication apparatus 4 performs communication processing on a training pattern.

Examples of the timing for communicating the training pattern between the ECU 1 and the drive circuit 2 include the time when, e.g., the vehicle is powered ON (when an ignition switch is turned ON: Power-on). Besides, the examples of the timing for communicating the training pattern also include the time when the ECU 1 or the drive circuit 2 is reset (re-start) and the time of retraining (re-training) when the transmission line 6 is changed, such as when the transmission line 6 is newly provided/added/changed/removed (see S1 in FIG. 8).

Note that, in the present embodiment, while, e.g., the large-capacity normal data is transmitted in the direction from the communication apparatus 4 of the ECU 1 to the communication apparatus 5 of the drive circuit 2, the training pattern is transmitted from the communication apparatus 5 of the drive circuit 2 to the communication apparatus 4 of the ECU 1 (see S2 in FIG. 8). Thus, the training processing is performed prior to the large-capacity communication.

The communication apparatus 5 does not include a distortion compensation circuit corresponding to the emphasis circuit 8 included in the ECU 1. Accordingly, when the communication apparatus 5 transmits the training pattern in the form of a binary signal using, e.g., a Pseudo Random Binary Sequence (PRBS), the signal waveform received by the communication apparatus 4 is distorted under the influence of the transmission line 6 or the like.

Note that, as the training pattern, any pattern may be used as long as the pattern has been determined in advance such that the coefficients h1[0] to M[n1] and h2[0] to h2[n2] of the digital filters FF1 and FB1 of the DFE processing unit 16 converge. It is desirable to use the pseudo random binary sequence in order to randomly generate various patterns with equal probabilities and without bias. The pseudo random binary sequence is generally generated using, e.g., an LFSR (Linear Feedback Shift Register).

The communication apparatus 4 of the ECU 1 receives the training pattern (see S2 in FIG. 8). The reception amplifier 11 in the communication apparatus 4 amplifies the training pattern. Herein, the training pattern includes a distortion caused by the transmission line 6. The DFE processing unit 16 perform correction processing on the distortion included in the signal waveform. When performing correction processing on the distortion of the signal waveform, the DFE processing unit 16 converges the coefficients h1[0] to h1[n1] and h2[0] to h2[n2] of the digital filters FF1 and FB1 in the DFE processing unit 16 (see S3 in FIG. 8).

In this case, the DFE processing unit 16 converges the respective coefficients h1[0] to h1[n1] and h2[0] to h2[n2] of the first feedforward filter FF1 and the first feedback filter FB1 so as to maximally suppress an error, and then stores the coefficients in the filter constant holding unit 12$a$. When these filter constants are converged, the transfer unit 14 transfers the filter constants held in the filter constant holding unit 12$a$ to the filter constant holding unit 8$a$ of the emphasis circuit 8 (see S4 in FIG. 8).

The emphasis circuit 8 in the communication apparatus 5 corrects, with reference to the filter constants held in the filler constant holding unit 8$a$, transmission data in such a manner as to make compensation in advance (see S5 in FIG. 8). At this time, the transmission data immediately after the correction is a signal in which the data is distorted.

The transmission unit 10 of the communication apparatus 4 transmits the normal data (normal pattern) to the communication apparatus 5 of the drive circuit 2 (see S6 in FIG. 8). The transmission signal undergoes distortion when passing through the transmission line 6. Since the emphasis circuit 8 has corrected the transmission signal in such a manner as to make compensation in advance, the effects of the correction and the distortion cancel out each other to allow the data reception unit 20b of the drive circuit 2 to receive a signal waveform with substantially no distortion (see S7 in FIG. 8).

(Description of Principle)

The following will describe the principle of why distortion can be corrected when data communication is performed following the above-described flow. The characteristic of the transmission line 6 can generally be expressed using S-parameters. Even in a differential transmission line, there are four ports. In the differential transmission line, when attention is focused on a differential signal, approximation can be made using 2-port S-parameters. In general, the characteristic of the transmission line 6 is expressed using S-parameters in 2×2 rows and columns. For example, when conditions in such a case as where the transmission line 6 includes no internal positive element but has a passive characteristic are satisfied, the S-parameters in the 2×2 rows and columns represented by S11, S21, S12, and S22 satisfy the following expression:

$$S21=S12 \qquad \text{(Expression 1).}$$

After the filter constants of the digital filters FF1 and FB are converged, if a quantization error or the like is ignored, it can be considered that the transmission line 6 has a linear characteristic.

Since the DFE processing unit 16 includes the slicer S1, the DFE processing unit 16 has a non-linear characteristic. However, when the error is completely equal to zero or when the error is not completely equal to 0 but has a substantially small value that can be ignored, a state has been provided where, even when the slicer S1 performs the processing assigned to the slicer S1, no signal change occurs. In a situation where the signal is not affected by the slicer S1, it can be considered that the DFE processing unit 16 has a linear characteristic.

When the frequency dependence of the passing characteristic of the DFE processing unit 16 is defined as G_dfe, the transmission characteristic of the drive circuit 2 from the transmission amplifier 22 to the reception amplifier 11 of the ECU 1 can be expressed as S12×G_dfe. At this time, when the coefficients of the digital filters FF1 and FB1 are converged, the value becomes a constant value (Costant) as the following.

$$S12 \times G\_dfe = \text{Constant} \qquad \text{(Expression 2).}$$

This value has no frequency dependence. Accordingly, the waveform distortion can be compensated. The typical transmission line 6, the typical DFE processing unit 16, and the like have frequency dependent characteristics, and are not guaranteed in, e.g., an extremely high frequency region.

However, the operation frequencies at which various circuits such as, e.g., the transmission line 6 and the DFE processing unit 16 operate have been determined in advance by transmission data. It can be considered that, within the range of the operation frequencies, the frequency dependence of each of the transmission line 6, the DFE processing unit 16, and the like is substantially constant.

Next, suppose that the frequency characteristic of the emphasis circuit 8 is defined as G_emph. The emphasis circuit 8 has the same filter constants as those of the DFE processing unit 16, and has a circuit configuration similar to that of the DFE processing unit 16. Thus, the emphasis circuit 8 and the DFE processing unit 16 have the same frequency characteristics as the following.

$$G\_dfe = G\_emph \qquad \text{(Expression 3).}$$

The transmission characteristic from the transmission unit 10 of the communication apparatus 4 of the ECU 1 to immediately before the reception amplifier 21 of the communication apparatus 5 of the drive circuit 2 can be represented as G_emph×S21. When consideration is given to the relational expressions shown above, an expression 4 can be determined by calculation as the following.

$$\begin{aligned} G\_emph \times S21 &= S21 \times G\_emph \qquad \text{(Expression 4)} \\ &= S12 \times G\_emph \\ &= S12 \times G\_dfe \end{aligned}$$

Accordingly, the transmission characteristic from the transmission unit 10 of the ECU 1 to immediately before the reception amplifier 21 of the drive circuit 2 is the same as the transmission characteristic from immediately after the transmission amplifier 22 of the drive circuit 2 to the DFE circuit 12 of the ECU 1.

As a result, when the emphasis circuit 8 of the ECU 1 performs digital filter processing on the signal waveform using the same filter constants, even when the signal waveform is distorted in the transmission line 6, the distortion of the signal waveform is compensated for in the reception unit of the drive circuit 2. This configuration can minimize the error.

(Result of Simulation)

The inventors of the present disclosure have verified on the above-described point using a simulation method. For example, consideration is given to the case where a step response waveform W2 shown in FIG. 9 is received in the reception unit 13 of the ECU 1 through the transmission line 6 (cable) when the communication apparatus 5 transmits a stepwise waveform W1 switching from "0" to "1".

Figure 9:
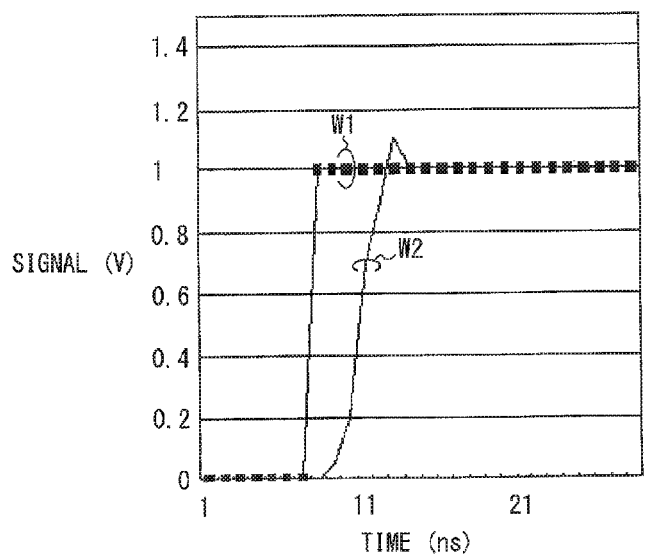
FIG. 9 is a diagram showing an example of a response waveform in a transmission line.

In this case, according to the expression 1, when the data transmission unit 7a of the ECU 1 transmits the stepwise waveform W1 switching from "0" to "1" as shown in FIG. 9, the data reception unit 20b of the drive circuit 2 receives the step response waveform W2.

The transmission signal shown in FIG. 9 uses, e.g., a 1 Gbps transmission signal and shows the result of a simulation in a 1 nanosecond step cycle. Accordingly, during a 1 nanosecond step, the result obtained by performing linear interpolation is shown. However, the obtained result may be different from the result of real monitoring.

When the data transmission unit 20a of the communication apparatus 5 transmits a pattern in the form of a pseudo random signal as the training pattern, the communication apparatus 4 performs distortion correction using the DFE processing unit 16. At this time, the DFE processing unit 16 converges the filter constants of the first feedforward filter FF1 and the first feedback filter FB1.

FIG. 10A shows an example of the result of a simulation of the converged filter constant of the first feedforward filter FF1. FIG. 10B shows an example of the result of a simulation of the converged filter constant of the first feedback filter FB1.

Figure 11:
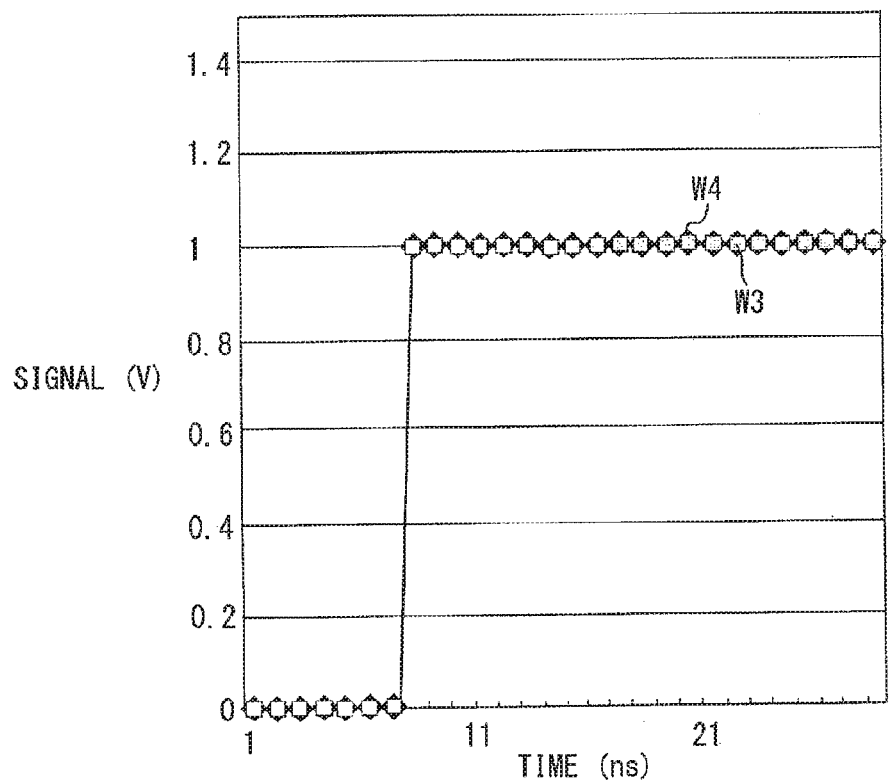
FIG. 11 is a diagram illustrating an example of a simulation schematically showing a transmission waveform from a second communication node and an output waveform from a DFE circuit in the reception unit of a first communication node.

FIG. 11 schematically shows a transmission waveform W3 (blank quadrilaterals) from the communication apparatus 5, and shows a waveform W4 (solid diamonds) after the DFE processing by the DFE processing unit 16. It can be seen that, in the example in FIG. 11, the transmission waveform W3 and the post-processing waveform W4 substantially match with each other. Note that, in nature, the timing when the reception waveform is input to the communication apparatus 4 and the timing after the waveform processing by the DFE processing unit 16 do not completely match under the influence of a filter delay time after the DFE processing or the like. In FIG. 11, for an easier comparison between the post-processing waveform W4 and the transmission waveform W3, the post-processing waveform W4 shown in the drawing has been shifted by the delay time to match with the transmission waveform W3.

As shown by the post-processing waveform W4 in FIG. 11, it can be seen that, since the DFE processing unit 16 of the communication apparatus 4 compensates for distortion, the transmission waveform W3 is substantially perfectly reproduced.

Next, the transmission unit 14 transfers the filter constants stored in the filter constant holding unit 12a of the DFE circuit 12 to the filter constant holding unit 8a of the emphasis circuit 8. The emphasis circuit 8 performs distortion correction using the filter constants held in the filter constant holding unit 8a.

Figure 12:
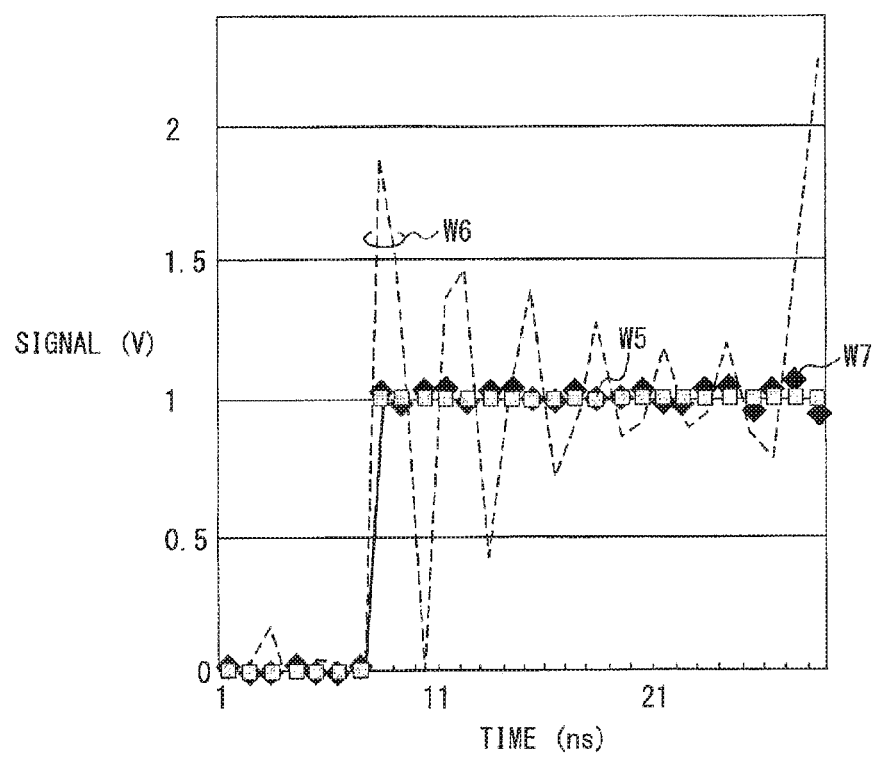
FIG. 12 is a diagram illustrating an example of a simulation schematically showing a transmission waveform from the first communication node and a reception waveform in the reception unit of the second communication node.

When the signal (waveform W5: blank quadrilaterals) shown in FIG. 12 is inputted, the emphasis circuit 8 generates the signal (waveform W6) shown in FIG. 12. When the communication apparatus 4 transmits the signal through the transmission line 6, the signal undergoes waveform distortion in the transmission line 6.

As a result, the communication apparatus 5 receives a signal waveform W7 (solid diamonds) shown in FIG. 12. It can be seen that the signal waveform W7 in FIG. 12 substantially overlaps with the signal waveform W5 in FIG. 12. This is because the emphasis circuit 8 has compensated for the waveform distortion in advance.

As shown in FIG. 12, there is a period of time during which the output signal waveform W6 of the emphasis circuit 8 exceeds signal level of 2. This is because the output signal waveform W6 depends on the magnitudes of the filter constants of the digital filters FF1 and FF2 of the DFE processing unit 16, and is determined in accordance with the internal processing in the DFE processing unit 16. The use of the output waveform W6 is not limited to that in the present method.

When the output signal from the communication apparatus 4 has excessively large waveform amplitude, the output voltage is scaled as required. Even in this case, the input waveform of the communication apparatus 5 is scaled only by the same amount, and the input waveform to the communication apparatus 5 does not change. Accordingly, by properly setting an input threshold (threshold for determination between "0" and "1") for the input signal data to the communication apparatus 5, reception performance is no longer adversely affected.

According to the present embodiment, the communication apparatus 5, at first, transmits the training pattern to the reception unit 13 of the communication apparatus 4 through the transmission line 6, and the DFE processing unit 16 of the communication apparatus 4 performs distortion compensation. At this time, the DFE processing unit 16 converges the coefficients h1[0] to h1[n1] and h2[0] to h2[n2] of the digital filters (the first feedforward filter FF1 and the first feedback filter FB1) to properly compensate for the distortion occurring in the transmission line 6. This configuration enables the digital data Vout_D received by the communication apparatus 4 to be substantially the same as the digital data transmitted from the communication apparatus 5.

The emphasis circuit 8 uses all the coefficients h1[0] to h1[n1] and h2[0] to h2[n2] converged by the DFE processing unit 16 as the filter constants of the second feedforward filter FF2 and the second feedback filter FB2.

Then, the communication apparatus 4 corrects the distortion in advance and transmits the data. Accordingly, even when the circuit size of the communication apparatus 5 of the drive circuit 2 is limited and the communication apparatus 5 should be limited to a circuit scale smaller than that of the communication apparatus 4 of the ECU 1, distortion compensation can be properly performed to the communication signals transmitted between the communication apparatus 4 and 5.

The above-described configuration eliminates the need to provide a distortion compensation circuit in the drive circuit 2 which receives the large-capacity data. It is sufficient to provide only a transmission circuit for the training pattern in the drive circuit 2. This further eliminates the need to provide another communication circuit for transmitting back the reception result of the test pattern.

Second Embodiment

Figure 13:
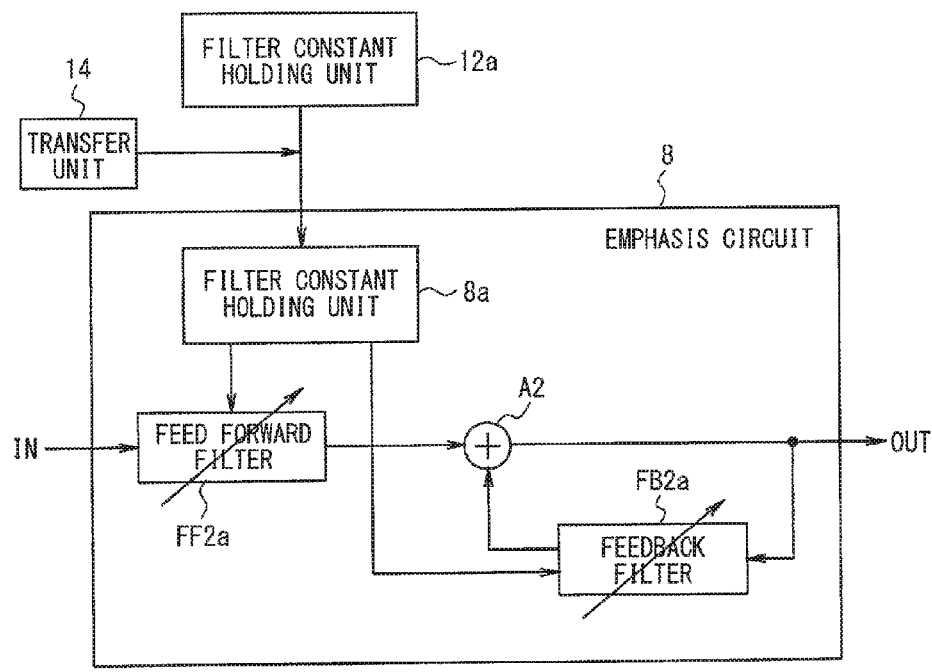
FIG. 13 is a diagram illustrating an example of a configuration of an emphasis circuit having the function of adjusting the tap length of a digital filter in a second embodiment of the present disclosure.
Figure 14:
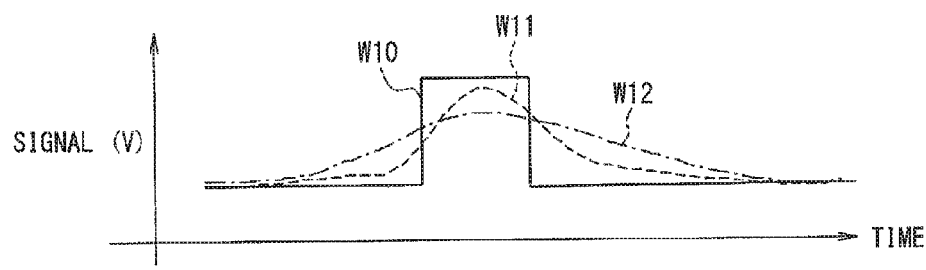
FIG. 14 is a diagram illustrating an example of the transmission characteristic of the transmission line.

The following will describe a second embodiment with reference to FIGS. 13 and 14. The embodiment described above has described a configuration in which, the relationship between the respective numbers of filter taps of the first and second feedforward filters FF1 and FF2 and the relationship between the respective numbers of the filter taps of the first and second feedback filters FB1 and FF2 satisfy the relationships given by n1=k1 and n2=k2 in the DFE processing unit 16 and the emphasis circuit 8. The relationships between the numbers of taps may be different, and the present disclosure will particularly describe an example in which the filter taps satisfy relationships of k1<n1 and k2<n2, which are considered as desirable.

The DFE processing unit 16 determines the filter constants when receiving the training pattern. Thus, highly precise calculation for the convergence of the filter constants is required. Accordingly, filters having relatively large numbers of filter taps n1 and n2 may be used as appropriate.

The emphasis circuit 8 only uses the filter constants determined in the DFE processing unit 16, and has no concern about the convergence. Accordingly, the numbers of filter taps k1 and k2 may be respectively smaller than the numbers of filter taps n1 and n2. Therefore, when the relationships between the numbers of filter taps are determined to satisfy, e.g., k1<n1 or/and k2<n2, the circuit scale can be further reduced. In this case, it is possible to reduce the disposing area of the circuit in the semiconductor integrated circuit.

When k1<n1 is satisfied, the multipliers TMu0a to TMuk1a of the second feedforward filter FF2 are provided with the same-numbered multiplication coefficients h1[0] to h1[n1] of the first feedforward filter FF1 without any change.

When k2<n2 is satisfied, the multipliers TMu0b to TMuk2b of the second feedback filter FB2 are provided with the same-numbered multiplication coefficients h2[0] to h2[n2] of the first feedback filter FB1 without any change.

The emphasis circuit 8 needs to be provided with the number of filter taps which is able to maintain minimum operation. FIG. 13 shows a tap length adjusting function with each of the variable arrows. As shown in FIG. 13, it may also be possible to limit the in-use portion of a second feedforward filter FF2a or/and a second feedback filter FB2a and skip remaining portions.

The above configuration can stop the operation of some elements in the second feedforward filter FF2a or/and the second feedback filter FB2a, and reduce power consumption. Thus, with the digital filters FF2a and FB2a each having the tap length adjusting function, power consumption can be reduced effectively. Herein, the digital filters FF2a and FB2a function as a second digital filter unit.

In addition, it is sufficient for the emphasis circuit 8 to clear a given S/N as a communication quality requirement. Thus, in the emphasis circuit 8, the numbers of digits of effective bits and accuracy may be further reduced compared to those of the filter constants or calculation accuracy in the DFE processing unit 16.

The second feedforward filter FF2a may be configured such that the numbers of digits in data (such as, e.g., the numbers of digits of effective bits in a binary system) of the coefficients h2[0] to h2[n2] are smaller than the numbers of digits in data (such as, e.g., the numbers of digits of effective bits in a binary system) of the coefficients h1[0] to h1[n2] of the first feedforward filter FF1.

When the filter constant holding units 12a and 8a hold the filter constants as, e.g., binary digital values, the multipliers TMu0b to TMuk2b of the second feedforward filter FF2 are provided with only the effective digits of the higher-order bits of the same-numbered multiplication coefficients h1[0] to h1[n1] of the first feedforward filter FF1 held in the filter constant holding unit 12a.

For the same reason as described above, the second feedback filter FB2a may also be configured such that the numbers of digits in data (such as, e.g., the numbers of digits of effective bits) of the coefficients h2[0] to h2[k2] are smaller than the numbers of digits in data (such as, e.g., the numbers of digits of effective bits) of the coefficients h2[0] to h2[n2] of the first feedback filter FB1.

In such a case, the multipliers TMu0b to TMuk2b of the second feedback filter FB2a are provided with only the effective digits of the higher-order bits of the same-numbered multiplication coefficients h2[0] to h2[n2] of the first feedback filter FB1. In such a case also, similar functions and effects obtained in the above-described embodiment can be obtained.

The transmission line 6 has a transmission characteristic which changes under the influence of the transmission quality of the cable or the like. As shown in the transmission characteristic in FIG. 14, the transmission characteristic of a single pulse waveform W10 variously changes into, e.g., a waveform W11, a waveform W12, or the like by way of example. The transmission characteristic of the waveform W12 is inferior to the transmission characteristic of the waveform W11 and exerts greater influence on a subsequent signal. Therefore, the digital filters FF2a and FB2a each having a larger number of filter taps are needed for maximally removing the influence of the transmission line 6.

For example, when the communication apparatus 4 is included in a semiconductor integrated circuit (such as IC or LSI), it is desirable to allow the same communication apparatus 4 to be used even when the characteristic of the transmission line 6 has changed in consideration of cable replacement or the like. With consideration of this point, the DFE processing unit 16 may be configured appropriately by preparing the number of filter taps which allows the transmission line 6 to be communicative under worst possible conditions in each of the digital filters FF2a and FB2a.

In this case, the number of filter taps to be prepared in each of the digital filters FF2a and FB2a can be determined by a characteristic simulation, experiment, or the like under worst conditions (e.g., a transmission line having the transmission characteristic of the waveform W12 in FIG. 14). This is because the filter constants of the unneeded taps converge to 0.

When it is known in advance that the communication apparatus 4 and perform communication using the transmission line 6 having a relatively-high-quality transmission characteristic (of, e.g., the waveform W11), even though the number of filter taps is reduced to be smaller than the number of filter taps determined under the worst conditions described above, communication quality can be maintained.

That is, in preparation for such a case, the DFE processing unit 16 may be configured to appropriately use the second feedforward filter FF2a or/and the second feedback filter FB2a each having a tap length adjusting function as shown in FIG. 13. This allows power consumption to be reduced by stopping the operation of some of the elements of the second feedforward filter FF2a or/and the second feedback filter FB2a.

According to the present embodiment, the communication apparatus 4 uses some of the coefficients h1[0] to h1[n1] and h2[0] to h2[n2] converged by the DFE processing unit 16 as the filter constants of the digital filters FF2 and FB2 of the emphasis circuit 8. The communication apparatus 4 corrects the distortion in advance and transmits the signal. With this configuration also, proper distortion compensation can be performed to the communication between the communication apparatus 4 and 5. In addition, the circuit scale can be reduced. In addition, since the emphasis circuit 8 is operated using only partial of the digital filters FF2 and FB2, power consumption of the circuit can be reduced.

Third Embodiment

The following will describe a third embodiment with reference to FIGS. 15 to 18. The third embodiment shows a bus connection form when a CAN (Controller Area Network) is applied to a vehicle-mounted LAN.

Figure 15:
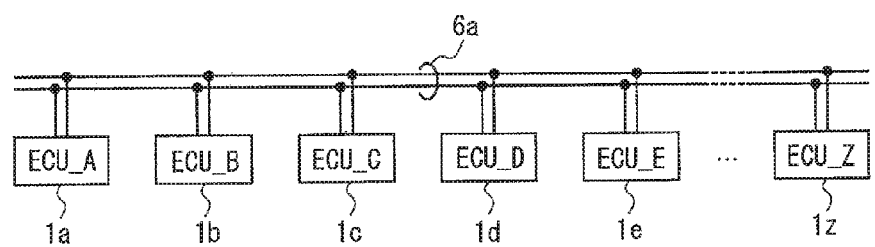
FIG. 15 is an electric configuration diagram schematically showing an example of a connection form in which three or more communication nodes are connected through an in-vehicle network in a third embodiment of the present disclosure.
Figure 16:
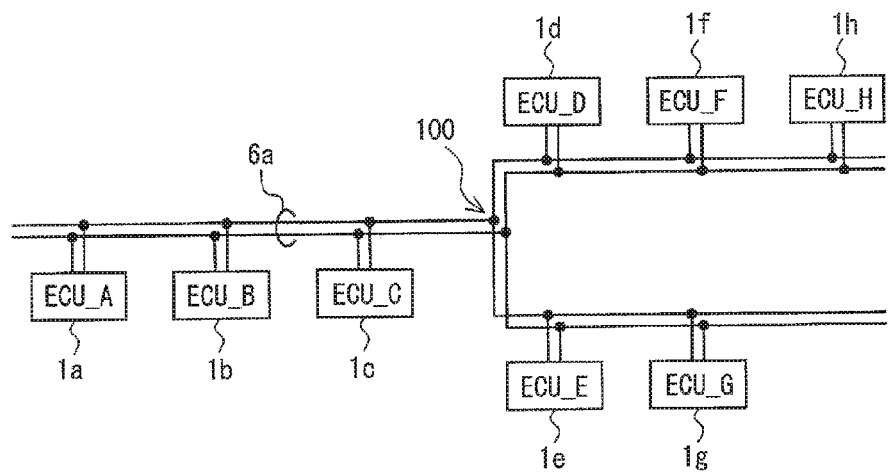
FIG. 16 is an electric configuration diagram schematically showing an example of a connection form in which three or more communication nodes are connected through a Y-branched line.
Figure 17:
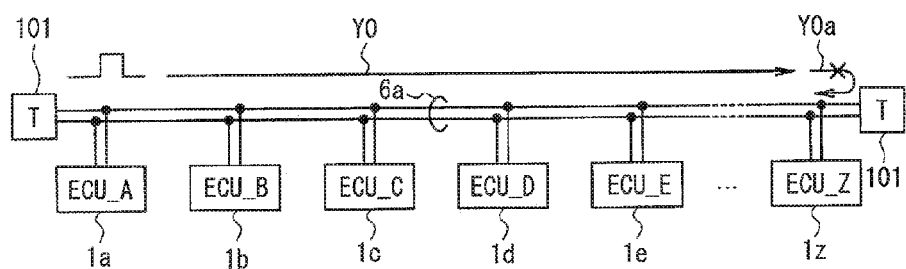
FIG. 17 is an electric configuration diagram schematically showing an example of a form in which terminal resistors are placed at the terminal portions of a network.

The CAN 6a provides the transmission line 6, and is mounted as the vehicle-mounted LAN (Local Area Network). The CAN 6a is configured of a pair of cables. As shown in FIG. 15, multiple ECUs 1a to 1z (e.g., ECU_A to ECU_Z) are connected to the CAN 6a. The multiple ECUs 1a to 1z are dispersedly arranged in a vehicle. Accordingly, as shown in FIG. 16, the CAN 6a may also include a Y-branched path 100. On the CAN 6a shown in FIG. 15, to suppress the reflection of a signal, terminal resistors (terminators) 101 may be disposed at the terminal portions of the CAN 6a as shown in FIG. 17.

In the above case, when, e.g., the predetermined ECU 1a (e.g., ECU_A) connected to the CAN 6a transmits a pulse signal to another ECU 1b (e.g., ECU_B), the pulse signal is received by the ECU 1b, but is also transmitted onto another line of the CAN 6a (see the arrow Y0).

The terminal resistors 101 are connected to the terminal ends of the CAN 6a. Thus, the energy of the pulse signal can be consumed by the terminal resistors 101 so that a reflected component of the signal is less likely to be produced (see the arrow Y0a). Thus, the signal component on the CAN 6a is less likely to be distorted.

As shown in FIG. 16, in the CAN 6a having the Y-branched path 100, the terminal resistors 101 may also be provided at all the terminal ends. When two branched paths are provided as shown in FIG. 16, it is desirable to provide the terminal resistor 101 at the terminal end of one of the branches and not provide the terminal resistor 101 at the terminal end of the other branch (see the reference numeral 101a) as shown in FIG. 18.

Figure 18:
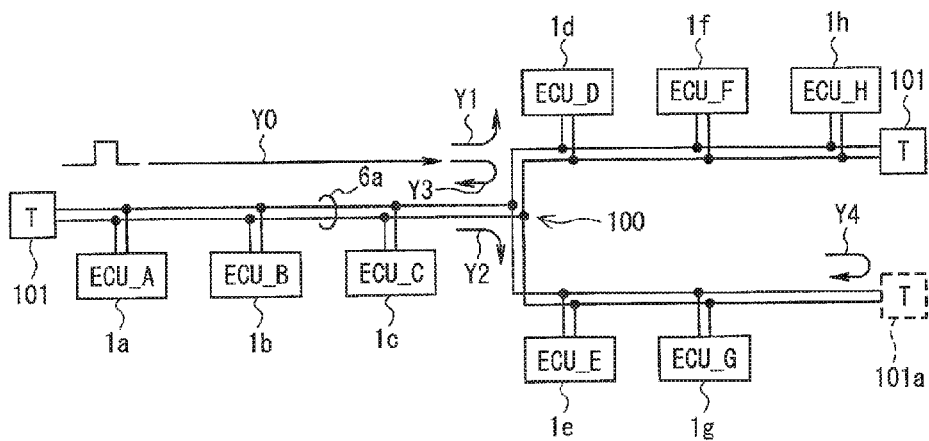
FIG. 18 is an electric configuration diagram schematically showing an example of a form in which terminal resistors are placed at the terminal portions of a network having a Y-branched line.

This is because, in the case of the branched wire shown in FIG. 18, it is easier to achieve impedance matching between the line impedance of the CAN 6a and the terminal resistor 101 and increase the signal amplitude when the terminal resistors 101 are provided at some of the terminal ends than when the terminal resistors 101 are provided at all of the terminal ends.

As shown in FIG. 18, in the case where the CAN 6a includes the Y-branched path 100, when, e.g., the ECU 1a transmits a pulse signal to another ECU 1b, the pulse signal is received by another ECU 1b, but is transmitted also to another path on the CAN 6a (see the arrow Y0).

At this time, the pulse signal enters the Y-branched path 100. However, in the Y-branched path 100, an impedance mismatch is likely to occur. In the Y-branched path 100, a reflective wave which is reflected in the entrance path simultaneously exists (see the arrow Y3) with the pulse signals that travel in both branching directions Y1 and Y2.

In addition, since the terminal resistor 101 is connected to one of the terminal ends of the CAN 6a, a reflected component is less likely to be produced in the terminal resistor 101. Further, since the terminal resistor 101 is not connected to the other terminal end, the signal that has entered the other terminal end is reflected by the terminal end (see the arrow Y4). Since another ECU 1b receives such a reflection signal, the reception signal received by another ECU 1b has a distorted waveform unlike the transmission waveform from the ECU 1a.

In the example shown in FIGS. 16 and 18, a mere example of Y-branching is shown. In an actual situation, with the recent advance of automotive control, the CAN 6a is available anywhere in the vehicle and the number of ECUs 1a to 1z connected to the CAN 6a is increasing year by year. Accordingly, when the CAN 6a includes a branched or non-terminal wire, significant waveform disturbance is likely to occur in reflected signals.

In such a case, when the DFE processing unit 16 and the emphasis circuit 8 each described in the foregoing embodiments are included in each of the ECUs 1a to 1z and each of the ECUs 1a to 1z holds the filter constants of the digital filters FF2 and FB2 for the corresponding communication partner, the distortion is able to be compensated for.

The above-described configuration may also be provided. In an actual situation, there is also an ECU having a limited circuit scale/size. In some cases, the ECU cannot internally hold the DFE processing unit 16 and the emphasis circuit 8.

In such a case, among the large number of ECUs 1a to 1z connected to the CAN 6a, at least one ECU 1a (e.g., ECU_A) may appropriately include the DFE processing unit 16 and the emphasis circuit 8, each of which is shown in the embodiments described above. At this time, it is desirable to provide the DFE processing unit 16 and the emphasis circuit 8 in a communication node which transmits particularly large-capacity data.

Prior to the transmission processing in which one ECU 1a transmits the normal data to another ECU 1b, another ECU 1b transmits the training pattern to the one ECU 1a and the one ECU 1a converges the filter constants of the digital filters FF1 and FB1 of the DEE processing unit 16. The one ECU 1a may appropriately use the converged filter constants as the filter constants of the digital filters FF2 and FB2 in the emphasis circuit 8.

In such a case, no matter what signal transmission path (such as, e.g., a reflection unit such as the branched path 100 or the terminal portion without the terminal resistor 101) is included in the transmission line 6 disposed between the ECU 1a and another ECU (e.g., ECU 1b: ECU_B), by determining filter constants in accordance with the signal transmission path, it is possible to set proper filter constants for the digital filters FF2 and FB2 in the emphasis circuit 8.

Here, "another ECU" can be provided by any one of the ECUs (e.g., the ECU_C to ECU_Z in the example described above) connected to the CAN 6a. At this time, the ECU 1a receives the training patterns from other various ECUs 1b to 1z and converges/calculates the filter constants of the digital filters FF2 and FB2 in accordance with other individual ECUs 1b to 1z with which the ECU 1a is communicable. FIG. 19 shows a matrix as an example of the filter constants obtained by the ECU 1a.

The ECU 1a sets the filter constants to the embedded emphasis circuit 8. By performing distortion compensation in advance using the emphasis circuit 8, the ECU 1a can excellently perform communication processing on the normal data between the ECU 1a and at least one different ECUs 1b to 1z (e.g., ECU_B, ECU_C, ECU_D, . . . , and ECU_Z).

According to the present embodiment, even when the communication processing is performed using the CAN 6a or the like, effects similar to the above-described embodiments can be provided.

According to the present embodiment, when three or more ECUs 1a to 1z are connected to, e.g., the CAN 6a or the like, when one ECU 1a (e.g., ECU_A) includes the DFE processing unit 16 and the emphasis circuit 8, the one ECU 1a can excellently perform communication with remaining ECUs 1b to 1z while compensating for the distortion of a signal.

Fourth Embodiment

The following will describe a fourth embodiment with reference to FIGS. 20 to 23. The fourth embodiment shows a configuration in which a CAN-FD (Flexible Data rate) protocol is used in the communication.

Waveform distortion becomes more conspicuous when the data rate of the communication processing between the multiple ECUs 1a to 1z (multiple communication nodes) increases. At present, in the technical field of, e.g., vehicle-mounted devices, for the purpose of further increasing the data rate of the CAN 6a, the introduction of a CAN-FD protocol is considered.

Figure 20:
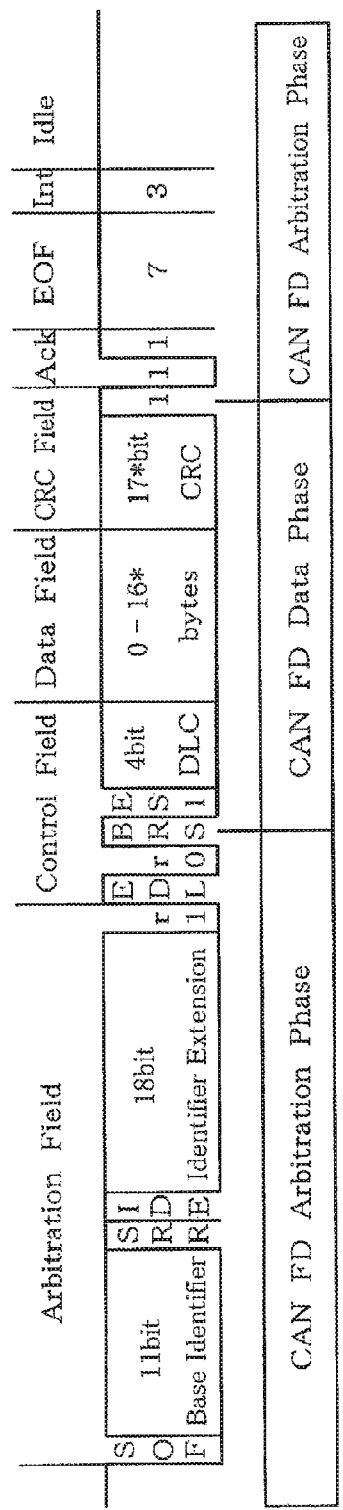
FIG. 20 is a diagram showing an illustrative view of an example of a CAN-FD frame format in a fourth embodiment of the present disclosure.

In the CAN-FD protocol, as shown in the frame format of the CAN-FD protocol in FIG. 20, a data rate in the interval of a CAN-FD Arbitration Phase is not changed from that of the conventional CAN.

Figure 21:
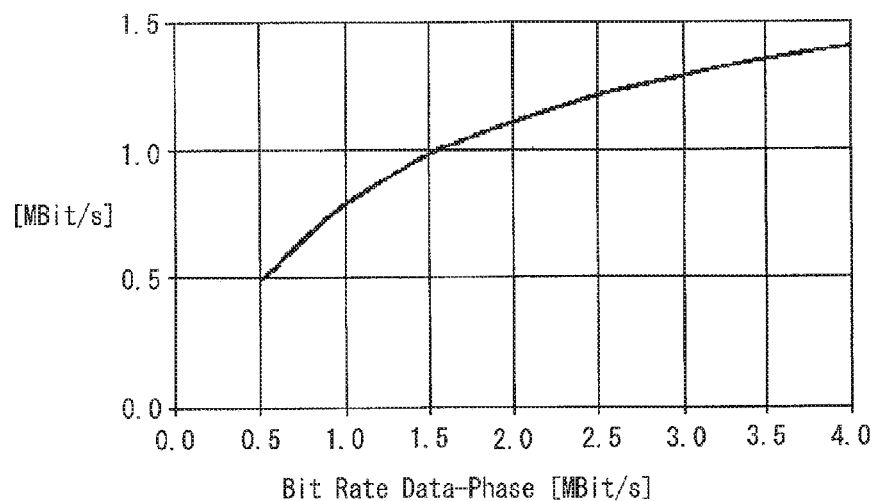
FIG. 21 is a diagram illustrating an example of a data rate characteristic in a CAN-FD data phase.

However, in the interval of a CAN FD Data Phase including a Data Field, as shown in FIG. 21, the data rate is increased to 4 Mbps at the maximum. This can improve a total communication data rate without degrading arbitration performance among the multiple ECUs. The specification of a CAN-FD frame header is configured to ignore reception data among the frames except a receiving node (ID) which is a communication target.

Accordingly, in another communication node other than the communication target receiving node, a waveform changes under the influence of the distortion transmitted through the CAN 6a and the data is ignored even in the event of a shift to a state where abnormal data is received. Therefore, by using the CAN-FD frame, high-speed transmission can be performed without causing an erroneous operation.

Figure 22:
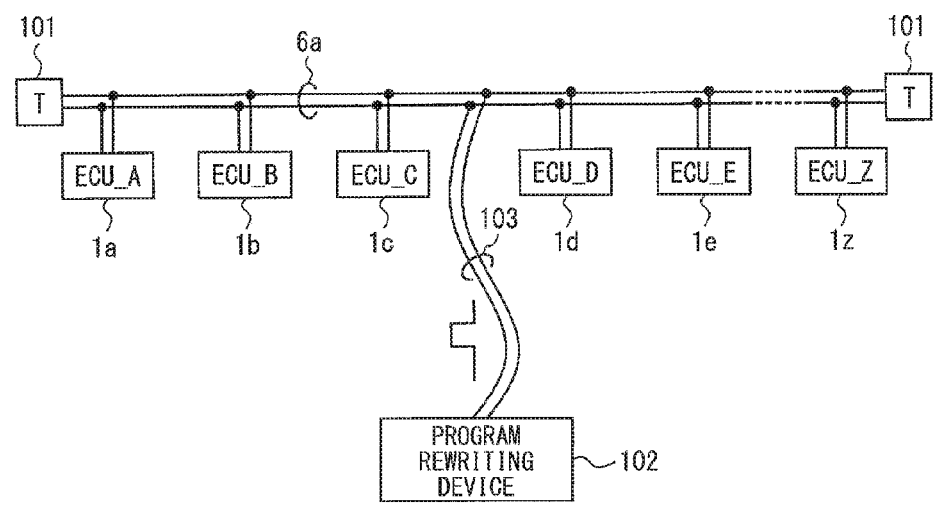
FIG. 22 is a diagram illustrating an example of a network connection form when a program rewriting device is applied to the first communication node.

One of the purposes of using the CAN-FD protocol is program write processing performed in an ECU. As shown in FIG. 22, a program rewriting device 102 is connectable to the CAN 6a through a programming cable 103 and can transfer a program to a program rewrite target ECU (e.g., the ECU 1a) at a high speed using the CAN-FD frame.

Since the performance of the ECU needs to be enhanced as required, the program embedded in the ECU 1*a* frequently updated. It is rare to purposely replace the ECU at the time of updating the program due to a cost reduction or the like. It may also be possible to equip the DFE circuit 12 (DFE processing unit 16) and the emphasis circuit 8 to all of the ECUs which are assumed to perform the update processing described above. However, this method has poor usefulness.

Accordingly, in the present embodiment, at least the program rewriting device 102 includes the above-described DFE circuit 12 and the emphasis circuit 8. The program rewriting device 102 is used only temporarily during production, inspection such as, e.g., automobile inspection, or the like. In most cases, the program rewriting device 102 is not mounted in a vehicle as a final product.

As a result, even when the DFE circuit 12 and the emphasis circuit 8 are mounted in the program rewriting device 102, it is sufficient to provide a circuit which transmits the training pattern described above in each of the ECUs 1*a* to 1*z* and there is no need to dispose an additional special purpose circuit in each of the ECUs 1*a* to 1*z*.

The above-described configuration can inhibit an increase in the number of parts of each of the ECUs 1*a* to 1*z* mounted in the vehicle main body. Therefore, it is possible to perform high-speed communication processing using the CAN-FD protocol without providing the DFE circuit 12 and the emphasis circuit 8 in each of the EUCs which need to perform update processing.

When the program rewriting device 102 and the vehicular ECU (e.g., the ECU 1*b*) perform large-capacity data communication using the CAN-FD protocol, the data transmission speed is higher than a data transmission speed between the multiple ECUs (e.g., between the ECUs 1*b* and 1*c*) which do not adopt the CAN-FD protocol.

In the present embodiment, the high-speed communication processing using the CAN-FD is described as an example. Alternatively, the communication processing described in the present embodiment may be used not only for the CAN-FD, but is also applicable even to a pair of communication nodes which is determined in the following method. When a pair of communication nodes is free from the influence of waveform distortion in low-speed communication established based on another communication standard, the communication processing described in the present embodiment may be applied to a high-speed data transmission between the paired communication nodes. At this time, in the transmitting node, the emphasis circuit 8 may appropriately compensate for the distortion to be caused by the cable in advance, and then start the data transmission.

The following will describe sequence processing of determining the pair of communication nodes (communication apparatus) during low-speed communication processing and then performing high-speed data transmission between the paired communication nodes that are determined.

Figure 23:
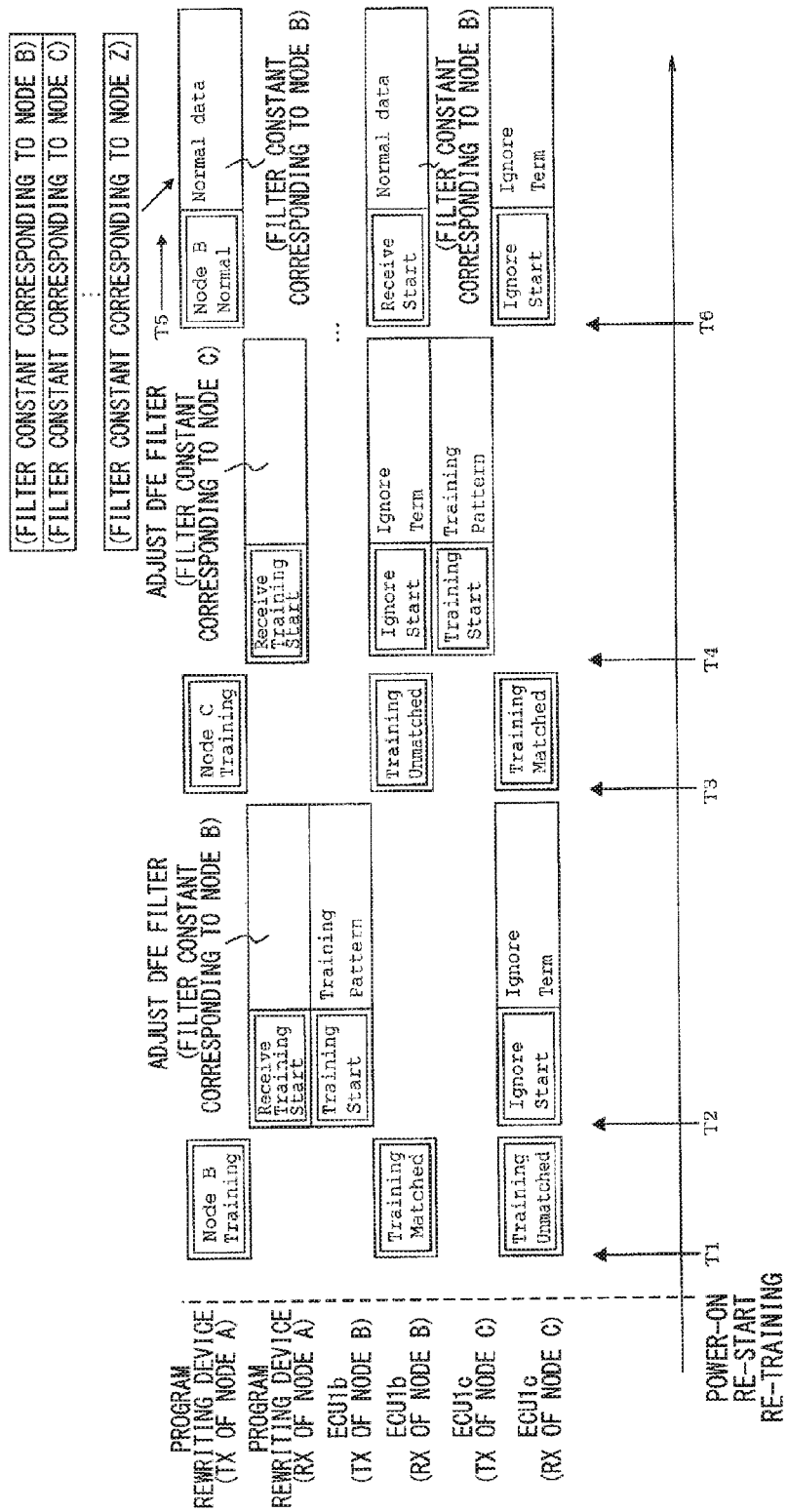
FIG. 23 is a timing chart showing an example of the flow of communication processing among multiple communication nodes.

The example shown in FIG. 23 shows an example in which, e.g., the program rewriting device 102 (communication node A) includes the configuration of the communication apparatus 4 and each of the other ECUs 1*b* to 1*z* (the communication node B, the communication node C, . . . , and the communication node Z) includes the configuration of the communication apparatus 5.

In the notation in FIG. 23, processing corresponding to "Tx of Node A" shows the processing performed by the transmission unit 10 of the communication apparatus 4 of the program rewriting device 102, and processing corresponding to "Rx of Node A" shows the processing performed by the reception unit 13 of the communication apparatus 4 of the program rewriting device 102. Also, processing corresponding to "Tx of Node B" shows the processing performed by the transmission unit 23 of the communication apparatus 5 of the ECU 1*b*, and processing corresponding to "Rx of Node B" shows the processing performed by the reception unit 24 of the communication apparatus 5 of the ECU 1*b*. Likewise, processing corresponding to "Tx of Node C" shows the processing performed by the transmission unit 23 of the communication apparatus 5 of the ECU 1*c*, and processing corresponding to "Rx of Node C" shows the processing performed by the reception unit 24 of the communication apparatus 5 of the ECU 1*c*.

FIG. 23 shows an example in which the program rewriting device 102 performs training between the program rewriting device 102 and one of the ECUs 1*b* to 1*z* during low-speed communication processing, and then performs high-speed data transmission. The following processing performed by the rewriting device 102 may also be changed into a form performed by another device such as the ECU 1*a* or the like. In FIG. 23, the processing shown in a double rectangular box indicates Low-Speed Communication Processing, and the processing shown in a single rectangular box indicates High-Speed Communication Processing.

As shown in FIG. 23, at the time of Power-on, re-start, re-training, or the like, when training is started between the rewriting device 102, which functions as a master, and the ECUs 1*b* to 1*z*, each of which functions as a slave, the rewriting device 102 initiates a low-speed communication mode with the ECU 1*b* as a communication partner node and transmits a training request command (T1).

When receiving the training request command, the ECU 1*b* recognizes that the training request has arrived at the node of the ECU 1*b* (Training Matched) since the training request is issued to the ECU 1*b*.

Another ECU 1*c* also receives the training request but, since the request is issued to the ECU 1*b*, the ECU 1*c* shifts into a mode in which input data is ignored during the training of the ECU 1*b* from the timing when the ECU 1*a* receives the request.

The ECU 1*b* shifts into a low-speed communication mode and transmits a training start reception command (T2: Training Start). Then, the rewiring device 102 receives the training start reception command (Receive Training Start). The ECU 1*b* shifts into a high-speed communication mode, sets the start of the training to the header, and transmits the training data at a high speed only for a predetermined period (Training Pattern).

The rewriting device 102 identifies the timing when the transmission of the training data was started on the basis of the header for the start of the training received from the ECU 1*b* and receives the training data for a predetermined period from the timing when the training was started.

The rewriting device 102 performs training processing while receiving the training data. In the training processing, the filter constants set to the first feedforward filter FF1 and the first feedback filter FB1 are converged such that the data items before and after the slicer S1 in the DFE processing unit 16 are the same.

At this time, the rewriting device 102 causes the filter constant holding unit 12*a* to hold the converged filter constants. The rewriting device 102 and the ECUs 1*c* and the like other than ECU 1*b* check the header of the frame being communicated, recognizes that it is during the training period, and continues to ignore the input data during the training period (Ignore Term).

On completing the converging processing of the filter constants, the rewriting device 102 holds the converged filter constants as filter constants corresponding to the ECU 1*b* (Node B) in the filter constant holding unit 12*a*. The rewriting device 102 performs training processing on the ECU 1*a* as the communication partner node for the calculation processing of the filter constants between the rewriting device 102 and the ECU 1*b*. That is, the rewriting device 102 initiates low-speed communication with the ECU 1*c* (Node C) as a transmission target node and transmits a training request command (T3).

On receiving the training request command, the ECU 1*c* recognizes that the training request has arrived at the node of the ECU 1*a* (Training Match) since the Training request is issued to the ECU 1*c*.

The ECU 1*c* shifts into the low-speed communication mode and transmits the training start reception command (T4: Training Start). Then, the rewiring device 102 receives the training start reception command (Receive Training Start). The ECU 1*c* shifts into a high-speed communication mode, sets the start of the training to the header, and transmits the training data at a high speed only for a predetermined period (Training Pattern).

The rewriting device 102 identifies the timing when the transmission of the training data was started on the basis of the header for the start of the training received from the ECU 1*c* and receives the training data for a predetermined period from the timing when the training was started.

The rewriting device 102 performs training processing while receiving the training data. In the training processing, the filter constants in the first feedforward filter FF1 and the first feedback filter FB1 are converged such that the data items before and after the slicer S1 in the DFE processing unit 12 are the same. The rewriting device 102 causes the filter constant holding unit 12*a* to hold the converged filter constants.

The rewriting device 102 repeats the foregoing processing with the other predetermined communication nodes (e.g., the ECUs 1*d* to 1*z*) which need the training processing as the communication partner nodes. This allows the rewriting device 102 to acquire the filter constants to be set to each of the communication nodes which need the training processing.

The rewriting device 102 sets the start of the transmission of the normal data to the ECU 1*b* in the header during the low-speed communication and gives a notification to the ECU 1*b*. Then, the rewriting device 102 transmits the normal data by high-speed communication. At this time, during a high-speed communication period, the rewriting device 102 gives the filter constants corresponding to the ECU 1*b* (node B) to the digital filters FF2 and FB2 in the emphasis circuit 8 and also transmits the normal data through the emphasis circuit 8 (T5: Node B Normal).

By referencing the header during the low-speed communication, the ECU 1*b* is allowed to recognize that the data communication processing is the high-speed transmission processing of the normal data to the node of the ECU 1*b* (Receive Normal Start). Accordingly, the ECU 1*b* receives the data by high-speed communication. At this time, the transmission signal from the rewriting device 102 has been processed in advance in the emphasis circuit 8. Consequently, even though waveform distortion occurs on the CAN 6*a*, when the transmission signal has arrived, the ECU 1*b* can receive the signal with reduced distortion.

The ECUs 1*c* and the like other than ECU 1*b* can recognize from the header during the low-speed communication that the data communication processing is not transmission processing to the nodes of the ECUs 1*c* and the like. Accordingly, the ECUs 1*c* and the like ignore the data communication processing during the high-speed communication period described above (Ignore Start).

Since the rewriting device 102 transmits the normal data at a high speed using the filter constants appropriate for the ECU 1*b*, if the ECUs 1*c* and the like receive the normal communication data during the high-speed communication, it follows that the ECUs 1*c* and the like receive totally inappropriate data. However, since the data communication processing is ignored during the high-speed communication period, no problem arises.

On another occasion, when the rewriting device 102 performs high-speed communication, the rewriting device 102 sets filter constants (filler constants corresponding to Nodes B and C to Z) in accordance with the communication partner nodes, and transmits data at a high speed. The rewriting device 102 performs proper distortion compensation processing on the individual communication nodes of the other multiple ECUs 1*b* to 1*z* and performs high-speed data transmission. This allows the rewriting device 102 to transmit data at a high speed to the other ECUs 1*b* and the like. Note that the communication protocol can be used by being modified as required.

According to the present embodiment, even when high-speed communication processing is performed using the CAN-FD protocol, the same effect as achieved in the embodiments described above is achieved. When the program rewriting device 102 includes the DFE circuit 12 and the emphasis circuit 8, it is possible to perform high-speed communication processing while compensating for the distortion of a transmission signal without providing an extra circuit for distortion compensation in each of the ECUs 1*b* to 1*z* as program rewrite targets.

Also, according to the present embodiment, the pair of communication nodes between which communication processing is performed during the low-speed communication processing is determined and then high-speed data transmission is performed between the determined pair of communication nodes (the rewriting device 102 and the ECUs 1*b* to 1*z*) in a state where appropriate filter constants are set to the emphasis circuit 8 of the transmitting communication node. Consequently, when data arrives at the one of the ECUs 1*b* to 1*z* as a communication partner during the high-speed data transmission, the one of the ECUs 1*b* to 1*z* as the communication partner can receive the signal with reduced distortion.

Fifth Embodiment

Figure 24:
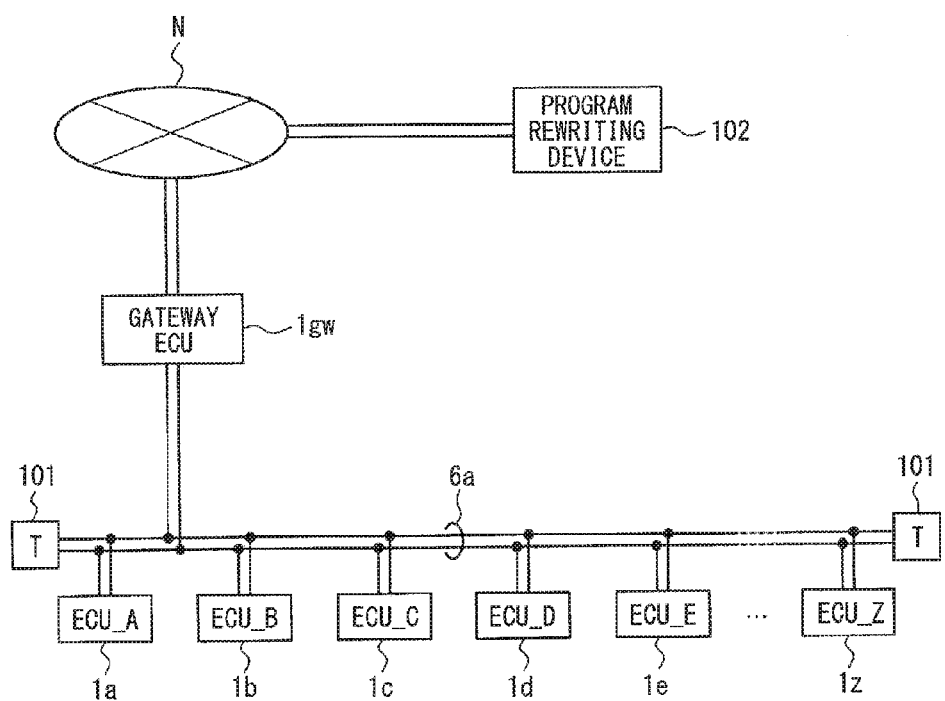
FIG. 24 is a diagram illustrating an example of a connection form in which a vehicular network is connected to a higher-order network via a gateway in a fifth embodiment of the present disclosure.

The following will describe a fifth embodiment with reference to FIG. 24. In the present embodiment, an in-vehicle network is connected to a higher-order network via a gateway.

As shown in FIG. 24, to the CAN 6*a*, a gateway ECU 1*gw* is network-connected, and the gateway ECU 1*gw* is connected to a higher-order network N having a higher order than the CAN 6*a*. The higher-order network may be a network including at least a part provided outside the vehicle, such as, e.g., a wireless communication network such as a mobile phone communication network or a middle- or short-distance wireless communication network, a wired communication network such as a phone network, or various local area networks such as a wired LAN and a wireless LAN. The gateway ECU 1*gw* has a gateway function which connects the higher-order network N and the CAN 6*a*.

The program rewriting device 102 described in the fourth embodiment is connected to the higher-order network N via a port different from the port connected to the bus 6a. The program rewriting device 102 can communicate with each of the ECUs 1a to 1z through the higher-order network and the gateway ECU 1gw. Such a communication form also achieves the same function/effect as described above.

When any data is transmitted at a high speed through the higher-order network and the gateway ECU 1gw, the data can also be used for an application other than programming.

According to the present embodiment, even when the CAN 6a is connected to the higher-order network N through the gateway ECU 1gw, the same function/effect as achieved in the embodiments described above is achieved.

In the fourth embodiment, the description about the program rewriting processing application has been given. However, even when a network such as the CAN 6a is connected to the higher-order network N shown above, the program rewriting device 102 can also be used for high-speed communication processing for another application other than the program rewriting processing application.

Sixth Embodiment

The following will describe a sixth embodiment with reference to FIGS. 25A to 28B. One of the characteristic features of the sixth embodiment is that the DFE circuit 12 of the communication apparatus (corresponding to the first communication node) 4 receives the training pattern at a sampling frequency which divides each one of the bits in the training pattern into multiple sub-bits having the same consecutive data values and converges the filter constants of the digital filters FF1 and FB1 so as to converge errors in the sub-bits and allow the training pattern to be received. Another of the characteristic features of the sixth embodiment is that the transmission unit 10 of the communication apparatus 4 performs distortion compensation on the normal data in units of sub-bits using the converged filter constants of the digital filters FF1 and FB1 as at least parts of the filter constants of the digital filters FF2 and FB2 of the emphasis circuit 8 and transmits the normal data.

For example, in the first embodiment, the description has been given of the method in which the communication apparatus 4 of the ECU 1 performs pre-emphasis processing using the emphasis circuit 8. At this time, the communication apparatus 4 of the ECU 1 operates in response to the clock signal generated by the clock generation unit 17 and outputs a signal level in accordance with the operation frequency, which has been determined for each one of the bits.

In this case, the DFE circuit 12 corrects waveform distortion at one point in an eye diagram. Consequently, only the distortion at the one point is precisely corrected and, at each of the other points in the eye diagram, a distortion detection value different from a real distortion detection value is used as a substitute, which causes an error. The present inventors have verified the amount of the error.

Figure 25A:
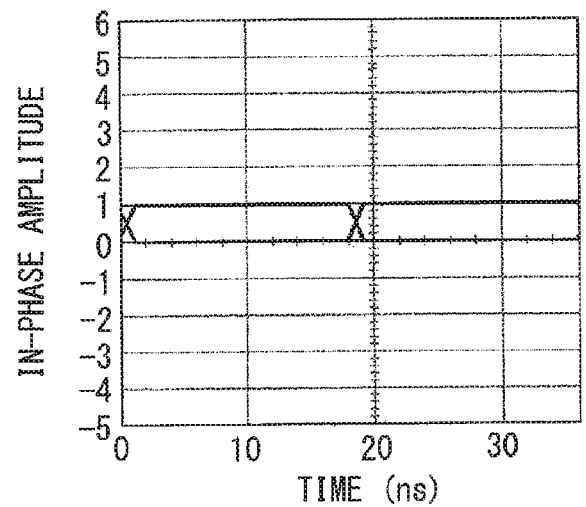
FIG. 25A is a diagram illustrating an example of a simulation data to be transmitted when a method in an example of a comparison target is used.

First, simulation data to be transmitted is shown in FIG. 25A. When it is assumed that the simulation data to be transmitted is transmitted through the transmission line 6 without using the pre-emphasis method shown in the embodiments described above, as shown in the simulation waveform (eye diagram) at the receiver in FIG. 25B, the data receiver is affected by the transmission line 6. As shown in this eye diagram, the eyes are not open and erroneous data reception increases.

Figure 26A:
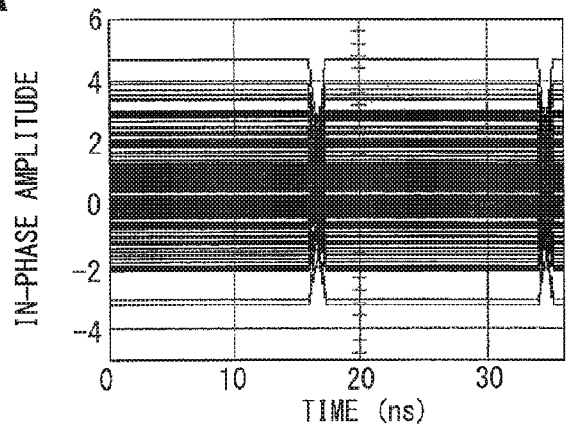
FIG. 26A is a diagram illustrating an example of simulation data to be transmitted when a method in the first embodiment is used.

By contrast, it has been confirmed that, when it is assumed that the emphasis circuit 8 of the transmitting communication apparatus 4 performs pre-emphasis processing as performed on the simulation data shown in FIG. 26A using the method in the first embodiment and transmits the signal after the processing to the receiving communication apparatus 5 via the transmission line 6 described above, the receiving communication apparatus 5 can receive data in a state where the eyes are open.

Figure 25B:
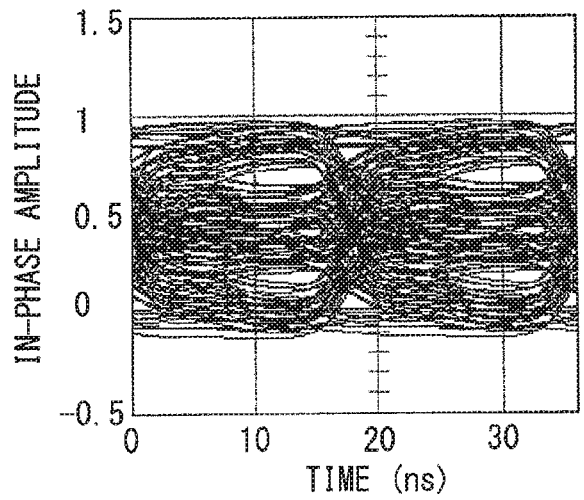
FIG. 25B is a diagram illustrating an example of an eye diagram when the method in the example of the comparison target is used.
Figure 26B:
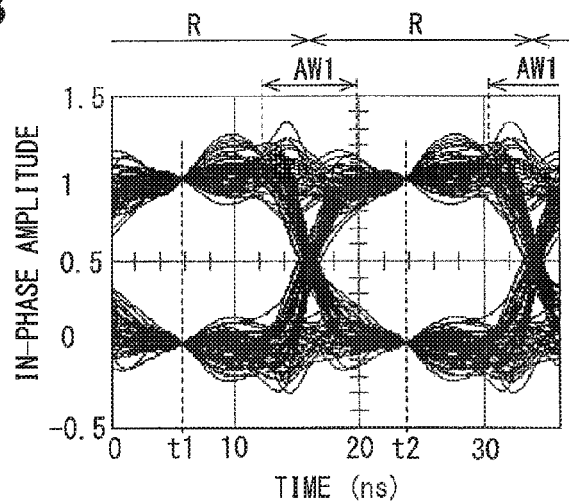
FIG. 26B is a diagram illustrating an example of an eye diagram when the method in the first embodiment is used.

When FIG. 26B is compared to FIG. 25B, it will be understood that the eyes have obviously improved. Note that, in the simulations shown in FIGS. 25B and 26B, analyses have been made using signal waveforms in which the points where pre-emphasis waveforms change linearly change. This is because the pre-emphasis waveforms are determined in accordance with the simulations. It is to be noted that, in an actual situation, the points where the pre-emphasis waveforms change more smoothly change with time.

In the eye diagram shown in FIG. 26B, the waveform distortion has been periodically corrected at the correction timings t1 and t2. Accordingly, at these periodic distortion correction timings t1 and t2, all the signal values (voltage values) substantially match. In this case also, a reception characteristic can sufficiently be improved, but time durations AW1 in the transition regions between the adjacent bits are likely to be increased.

Accordingly, the present embodiment shows a form in which the communication apparatus 4 operates at a higher operation frequency to allow reductions in time durations AW2 in the transition regions between the adjacent bits.

Figure 27A:
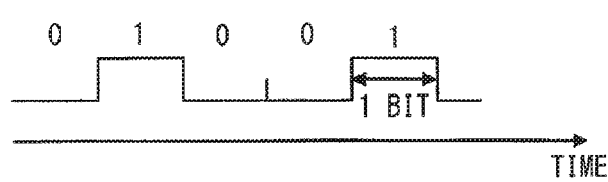
FIG. 27A is a diagram illustrating an example of a data string in the training pattern in a sixth embodiment of the present disclosure.

The present embodiment also uses the concept of multiple ($=m \geq 2$) sub-bits into which one bit is divided. For example, a consideration will be given to the case where the communication apparatus 5 serving as a slave transmits a 5-bit data string "01001" as shown in FIG. 27A as the training pattern to the communication apparatus 4 serving as a master.

At this time, the communication apparatus 4 receives the 5-bit data string "01001" on the assumption that each of the bits in the 5-bit data string includes, e.g., two ($=m$) sub-bits. That is, when a frequency corresponding to the data rate in the embodiments described above is a given frequency f1, in the present embodiment, the reception unit 13 (the DFE circuit 12 and the data reception unit 7b) of the communication apparatus 4 of the ECU 1 receives the 5-bit data string using a frequency f2 (e.g., two-fold ($=m$-fold) frequency) exceeding the frequency f1 as the sampling frequency. Specifically, the control circuit 7 outputs a control signal to the clock generation unit 17 to control the frequency of the clock signal generated by the clock generation unit 17 to a frequency which is f2/f1 times the frequency in the embodiments described above. Consequently, the clock generation unit 17 outputs the clock signal at the frequency f2 to the control circuit 7 and the reception unit 13 (such as, e.g., the DFE circuit 12 or the data reception unit 7b). At this time, the reception unit 13 of the communication apparatus 4 operates at the frequency f2 exceeding the frequency f1. This allows the reception unit 13 to receive the data using the frequency f2 as the sampling frequency.

A description will be given below on the assumption that the frequency f2 is double the frequency f1, but the multiple number is not limited to 2.

At this time, the DFE circuit 12 of the communication apparatus 4 calculates the coefficients h1[0] to h1[n1] of the first feedforward filter FF1 and the filter constants h2[0] to h2[n2] of the first feedback filter FB1 at the frequency f2 which is double ($=m$ times) the frequency f1.

Figure 27B:
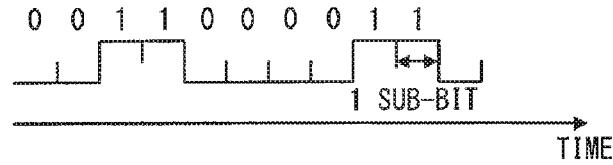
FIG. 27B is a diagram showing a conceptual view of the illustration of a case where a data string in the sixth embodiment is a data string divided into sub-bits.

As a result, as shown in FIG. 27B, the coefficients h1[0] to h1[n1] and h2[0] to h2[n2] of the digital filters FF1 and FB1 of the DFE circuit 12 can be converged such that, on the hypothetical assumption that the leading first bit "0" is "00", the second bit "1" is "11" the third bit "0" is "00", the fourth bit "0" is "00", and the fifth bit "1" is "11", the two (=m) sub-bits in each of the first to fifth bits can be received in overlapping relation. That is, the receiving communication apparatus 4 can receive the training pattern in which each one of the bits is divided into the m sub-bits having the same consecutive values.

After the DFE circuit 12 of the communication apparatus 4 performs processing and sets the coefficients h1[0] to h1[n1] and h2[0] to h2[n2] of the digital filters FF1 and FB1, which function as a first digital filter unit, to the filter constant holding unit 12a, the transfer unit 14 transfers the coefficients h1[0] to M[n1.] and h2[0] to h2[n2] of the digital filters FF1 and FB1 to the filter constant holding unit 8a.

By using at least some or all of the coefficients h1[0] to h1[n1] and h2[0] to h2[n2] transferred to the filter constant holding unit 8a as the coefficients h1[0] to h1[k1] and h2[0] to h2[k2] of the digital filters FF2 and FB2 of the emphasis circuit 8, the transmission unit 10 can perform the pre-emphasis processing and distortion compensation on the normal data and transmit the normal data. Herein, the digital filters FF2 and FB2 of the emphasis circuit 8 function as a second digital filter unit. At this time, the transmission unit 10 performs the pre-emphasis processing in units of sub-bits using the emphasis circuit 8 and transmits the data.

That is, when the communication apparatus 4 receives the bit string "01001" shown in FIG. 27A on the hypothetical assumption that the bit string "01001" is "0011000011", the transmission unit 10 thus performs the pre-emphasis processing on each one of the bits in the data in units of m consecutive sub-bits. Specifically, the clock generation unit 17 outputs the clock signal at the frequency f2 described above to the transmission unit 10 (such as, e.g., the data transmission unit 7a, the emphasis circuit 8, or a D/A converter not shown). Consequently, the transmission unit 10 of the communication apparatus 4 of the ECU 1 operates at the same frequency f2 as the reception unit 13. This allows the transmission unit 10 to perform the pre-emphasis processing on the data in units of m consecutive sub-bits and transmit the normal data. In this case, it is possible to suppress the aggravation of jitters and maximally suppress erroneous reception of the data by the communication apparatus 5.

Figure 28A:
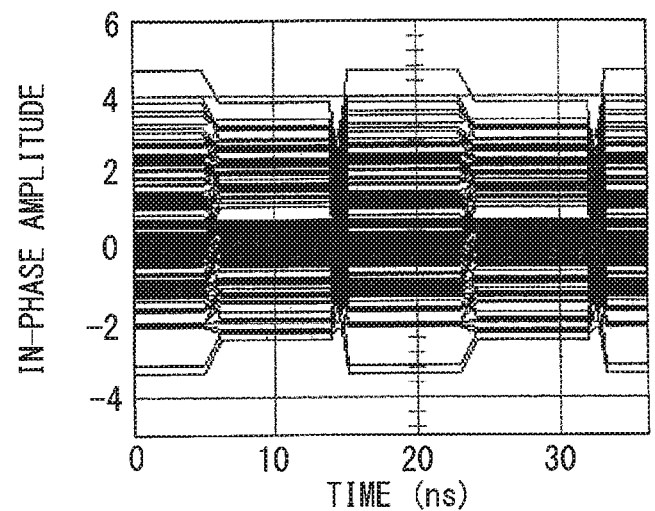
FIG. 28A is a diagram illustrating an example of simulation data to be transmitted.
Figure 28B:
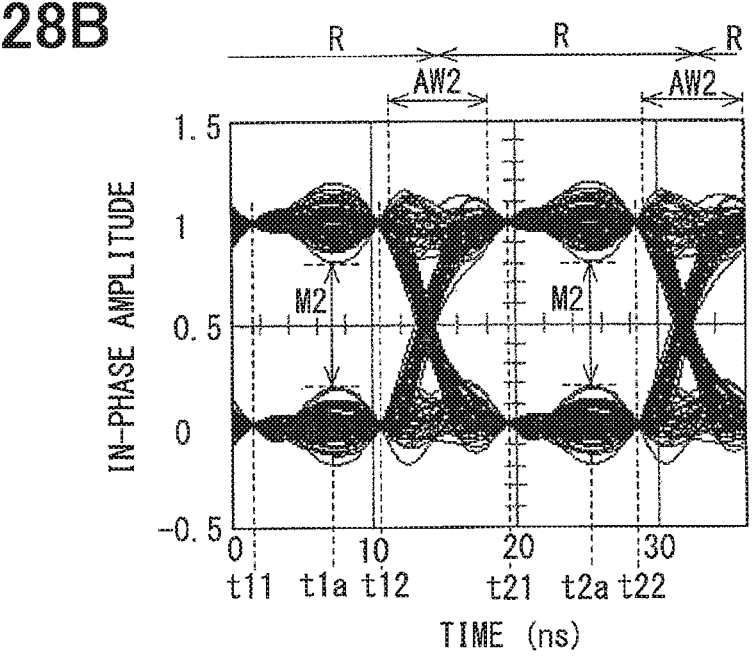
FIG. 28B is a diagram illustrating an example of an eye diagram.

The result of the verification performed by the inventors using the simulations will be described. FIG. 28A shows a simulation data waveform to be transmitted. FIG. 28B schematically shows an eye diagram when simulation data is received. As shown in FIGS. 28A and 28B, signal values (voltage values) match at each of timings t11, t12, t21, and t22 in accordance with the frequency f2 for transmitting/receiving sub-bit data. This is because the timings t11, t12, t21, and t22 at which the signal values (voltages) match serve as distortion correction timings.

In FIG. 28B, the timings t11 and t12 are timings for sampling sub-bits having the same data values (voltage values), and the timings t21 and t22 are timings for sampling sub-bits having the same data values (voltage values).

At this time, the time interval between the distortion correction timings t12 and t22 is reduced to allow a reduction in a signal changing time during the period from the distortion correction timing t12 corresponding to a given bit to the distortion correction timing t21 corresponding to the subsequent bit. As a result, it is possible to reduce the time durations AW2 in the transition regions between the adjacent bits.

Also, the time interval between the distortion correction timings t11 and t12 is reduced to allow a reduction in a signal changing time during the period from the distortion correction timing t11 corresponding to a sub-bit having a given data value to the distortion correction timing t12 corresponding to the subsequent sub-bit having the same data value. As a result, it is possible to reduce the voltage amplitude between these sub-bits. This can increase a voltage margin M2 between these sub-bits. Therefore, it is possible to suppress the aggravation of jitters and maximally suppress erroneous data reception by the communication apparatus 5.

Seventh Embodiment

The following will describe a seventh embodiment with reference to FIGS. 30A to 31B. One of the characteristic features of the seventh embodiment is that the number of sub-bits into which one single bit is divided in the sixth embodiment is set to an odd number (e.g., 3 is preferable).

When the communication apparatus 5 as a slave uses a typical reception circuit, a timing at the middle between the adjacent two transition regions is used in most cases as a data sampling timing.

For example, when each single bit is divided into multiple sub-bits and the number of the divided sub-bits is set to an even number (such as 2) and the timing at the middle between adjacent two transition regions R is used as the data sampling timing, as shown in FIG. 28B, timings t1a and t2a having the small voltage margins M2 are substantially used as data sampling timings.

As shown in FIG. 28B, even at these timings t1a and t2a also, the sufficient voltage margins M2 are ensured. Accordingly, the number of the divided sub-bits may also be set to an even number, but preferably the number of the divided sub-bits is set to an odd number. When the number of the divided sub-bits is an add number, the operation frequency f2 of the communication apparatus 4 as the master is set to an odd multiple of the frequency f1 of the data rate described above. For example, when one bit is divided into three sub-bits, the reception unit 13 of the communication apparatus 4 as the master performs sampling processing at the frequency f2 corresponding to, e.g., triple the data rate frequency f1 and operates. Then, the communication apparatus 4 assumes that one bit corresponds to three sub-bits and calculates the filter constants of the DFE circuit 12 in units of sub-bits.

Figure 29A:
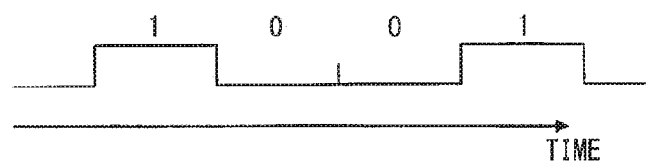
FIG. 29A is a diagram illustrating an example of a data string in the training pattern.
Figure 29B:
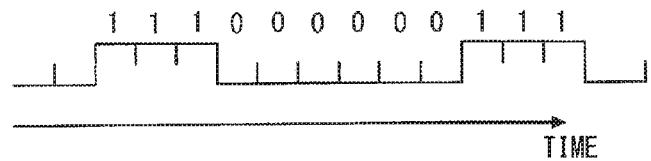
FIG. 29B is a diagram showing conceptual view of the illustration of a case where a data string in a seventh embodiment of the present disclosure is a data string divided into sub-bits.

For example, as shown in FIG. 29A, when the data string of the training pattern is "1001", the communication apparatus 4 as the master receives the training pattern as a data string of hypothetical sub-bits "111000000111", as shown in FIG. 29B. The reception unit 13 of the communication apparatus 4 converges the filter constants of the DFE circuit 12. Then, the emphasis circuit 8 of the communication apparatus 4 transmits the data in units of sub-bits using the filter constants.

Figure 30A:
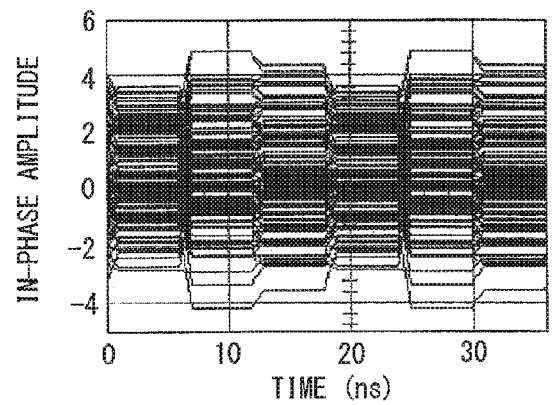
FIG. 30A is a diagram illustrating an example of simulation data to be transmitted when each single bit is divided into three sub-bits.
Figure 30B:
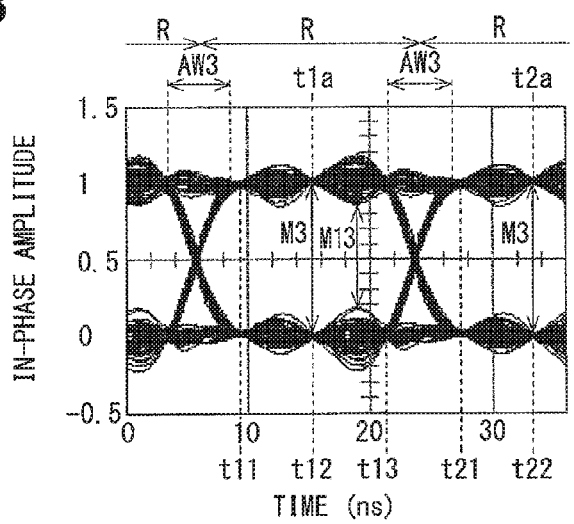
FIG. 30B is a diagram illustrating an example of an eye diagram.

For example, FIG. 30A shows simulation data to be transmitted when the number of the divided sub-bits is 3 and FIG. 30B schematically shows an eye diagram. As shown in FIGS. 30A and 30B, when the reception unit 13 operates at the frequency f2 corresponding to, e.g., triple the original data rate frequency f1, compared to the time duration AW1 (see FIG. 26B) in the transition region when the reception unit 13 operates at the frequency of the data rate and the time duration AW2 (see FIG. 28B) in the transition region when the reception unit 13 operates at a frequency corresponding to double the data rate, a time duration AW3 in the data transition region can further be reduced.

When the receiving communication apparatus (e.g., 5) uses a typical reception circuit and when substantially middle timings between the adjacent two transition regions R are used as the data sampling timings t1a and t2a, it is possible to allow the timings t1a and t2a to match the distortion correction timings t12 and t22 in principle and maximize the voltage margin M3 in principle.

For example, in a simulation, no consideration is given to the influence of external noise or the like. However, by using an odd number as the number of the divided sub-bits, the voltage margin M3 can be increased. Accordingly, even under the influence of the external noise or the like, erroneous reception can further be inhibited. This can further improve the reception characteristic. Therefore, either from a timing viewpoint or from a signal level viewpoint, the number of the divided sub-bits is preferably set to an odd number. In the description given above, the example in which the number of the divided sub-bits is 3 is shown. However, the number of the divided sub-bits may also be an odd number of 5 or more. When the number of the divided sub-bits is set to an odd number of 5 or more, the time duration in the transition region between the data sampling timings can also be further reduced. This can reduce a jitter in the time domain and allows excellent reception.

Figure 31A:
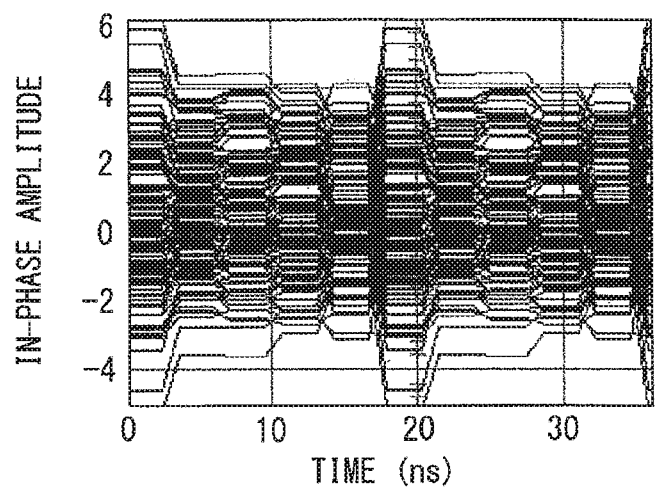
FIG. 31A is a diagram illustrating an example of simulation data to be transmitted when each single bit is divided into five sub-bits.
Figure 31B:
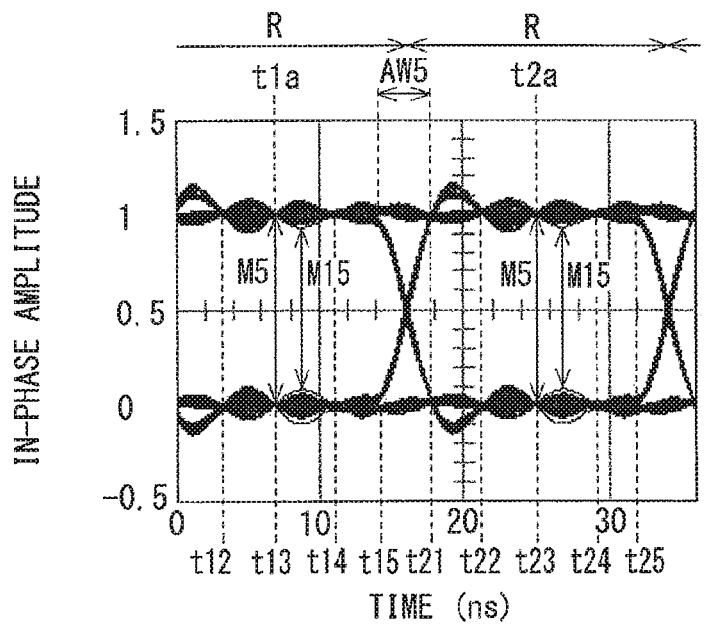
FIG. 31B is a diagram illustrating an example of an eye diagram.

FIG. 31A shows a simulation data waveform to be transmitted when the number of the divided sub-bits is 5. FIG. 31B schematically shows an eye diagram. In FIG. 31B, the timings t12 to t15 and t21 to t25 show distortion correction timings. At the timings t12 to t15, the data values are the same and, at the timings t21 to t25 also, the data values are the same.

As shown in FIGS. 31A and 31B, as the number of the divided sub-bits is increased, the time intervals between the adjacent distortion correction timings (such as e.g., between t12 and t13 and between t13 and t14) can be reduced. In particular, a signal changing time during the period from the distortion correction timing t15 corresponding to a given data value to the distortion correction timing t21 corresponding to the subsequent data value can be reduced. As a result, it is possible to reduce the time duration AW5 in the transition region between the adjacent bits and reduce a jitter in the time domain, while allowing excellent reception at the data receiver.

As also shown in FIGS. 31A and 31B, as the number of the divided sub-bits is increased, distortion can more significantly be reduced and the effect of reducing the voltage amplitude can be increased. Note that, in the case where the middle timings between the transition regions R are t1a and t2a, the voltage margin M5 substantially matches the voltage margins at the distortion correction timings t13 and t23 and the maximum voltage in principle can be obtained.

Also, as the number of the divided sub-bits is increased, the voltage amplitude between the sub-bits into which the same data is divided can be reduced. Accordingly a voltage margin M15 (see FIG. 31B) in the time domain when the number of the divided sub-bits is 5 can be larger than a voltage margin M13 (see FIG. 30B) in the time domain when the number of the divided sub-bits is 3.

Note that, when the number of the divided sub-bits is set to 5 or more, either an odd number or an even number can achieve substantially equal distortion reducing effects. When the number of the divided sub-bits increases, the operation frequency of the communication apparatus 4 increases so that a high-performance circuit is required. Accordingly, the number of the divided sub-bits may be set appropriately on the basis of a trade-off among a signal propagation state in the transmission line 6, the performances of the communication apparatus 4 and 5, cost, and the like.

When it is attempted to satisfy the condition that the number of the divided sub-bits is an odd number larger than 1 while holding the operation frequency of the communication apparatus 4 low, the control circuit 7 preferably sets the operation frequency of the communication apparatus 4 such that the number of the divided sub-bits is 3. When the influence of distortion in a propagation signal due to the transmission line 6 is relatively small, the operation frequency is preferably set such that the number of the divided sub-bits is twofold or fourfold or more. When the influence of distortion in the propagation signal due to the transmission line 6 is relatively large, the operation frequency is preferably set such that the number of the divided sub-bits is fivefold or more.

Eighth Embodiment

The following will describe an eighth embodiment with reference to FIGS. 32 to 36. The sixth embodiment described above shows that, when the number of the divided sub-bits is set to, e.g., 2, the voltage margins M2 are reduced at the middle timings t1a and t2a between the transition regions R in the eye diagrams. This is because, e.g., a 2-sub-bit transmission waveform includes a signal component which is a twofold frequency component in accordance with the pre-emphasis processing and is not included in the original data in addition to the frequency components inherently included in the original data. The present inventors have found that, if the extra frequency component is removed, the voltage margins can be improved. Accordingly, the eighth embodiment shows a form in which, when normal data on which distortion compensation is performed in units of sub-bits is transmitted, a filter 9a-1 which reduces a component in a high-frequency region is provided.

Figure 32:
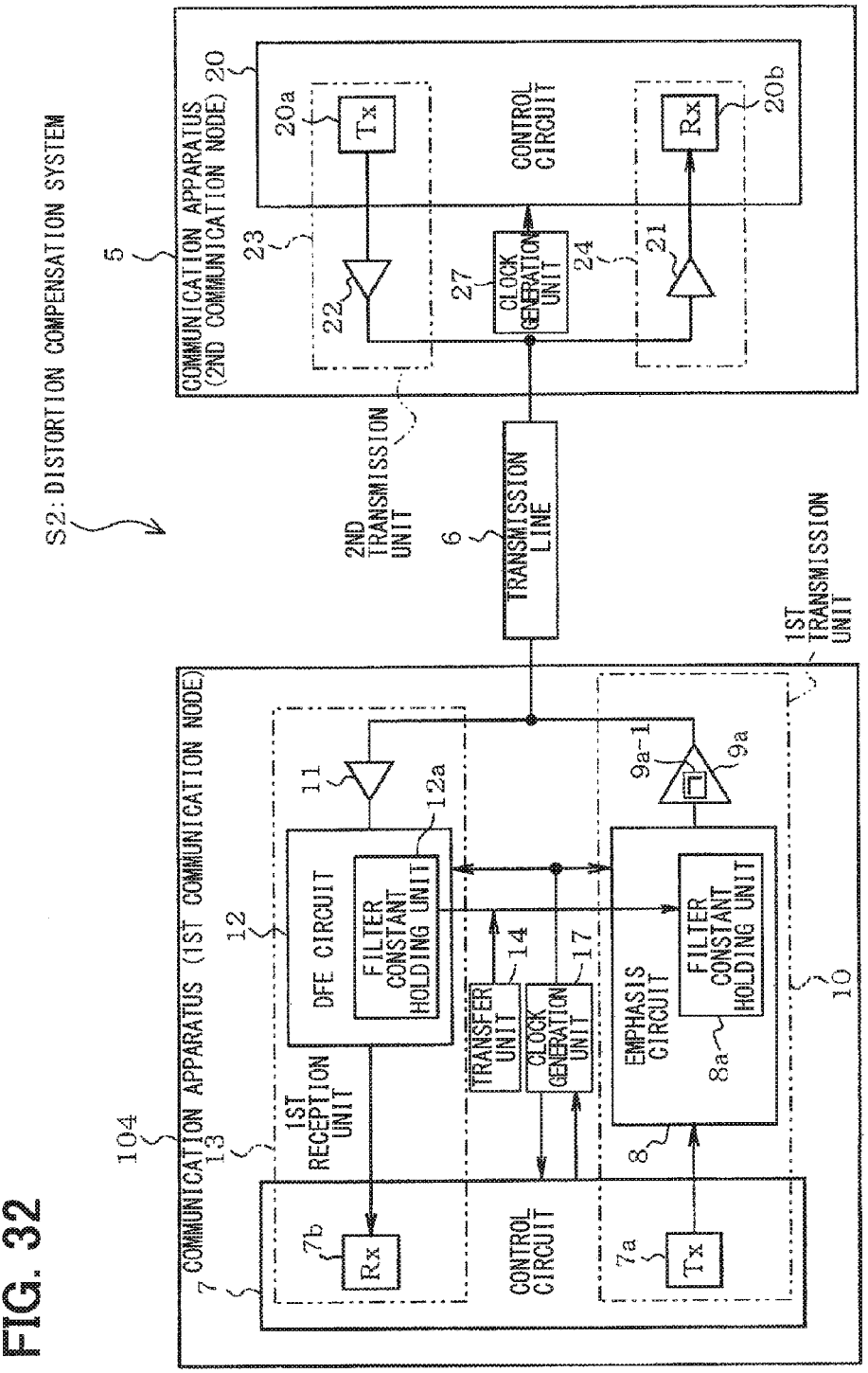
FIG. 32 is a block diagram schematically showing an example of an electric configuration of a distortion compensation system in an eighth embodiment of the present disclosure.

FIG. 32 illustrates an example of a configuration of a distortion compensation system S2 shown in correspondence to FIG. 1. Here, the communication apparatus 4 as a master in FIG. 1 includes the transmission amplifier 9 at the output of the emphasis circuit 8. By contrast, a communication apparatus 104 as a master in the present embodiment uses a transmission amplifier 9a with the filter 9a-1 instead of the transmission amplifier 9, as shown in FIG. 32.

The filter 9a-1 in the transmission amplifier 9a is provided by, e.g., an analog low-pass filter. When the transmission amplifier 9a is configured in a stage preceding or subsequent to the transmission amplifier 9 or the transmission amplifier 9 includes multiple amplification stages, the filter 9a-1 is configured between the multiple amplification stages.

The cut-off frequency in the high-frequency region of the filter 9a-1 may be set appropriately to a Nyquist frequency corresponding to the operation frequency of the DFE circuit 12 for allowing the DFE circuit 12 to operate to perform the division in units of the m sub-bits. The type of the filter 9a-1 is not particularly limited. For example, a tertiary Butterworth filter may be used appropriately.

Figure 33:
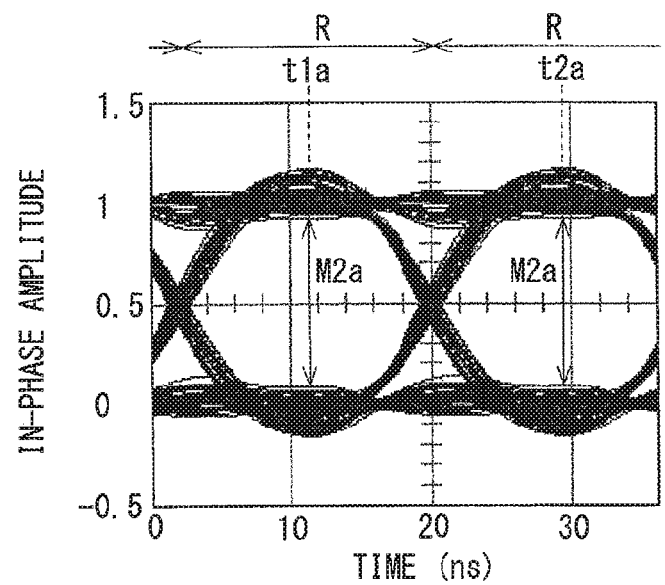
FIG. 33 is a diagram illustrating an example of an eye diagram when each single bit is divided into two sub-bits.

When a simulation is performed using the filter 9a-1 on the assumption that the number of the divided sub-bits is 2 as shown in FIG. 32, the eye diagram shown in FIG. 33 can be obtained. Note that the simulation result is the result of a simulation performed under the hypothetical condition that the transmission amplifier 9 and the filter 9a-1 are connected in cascade and all the input/output impedances thereof are matched. In this case, a frequency component corresponding to double the data rate is reduced. This allows voltage margins M2a at the middle timings t1a and t2a between the transition regions R to be larger than the voltage margins M2 shown in FIG. 28B.

According to the present embodiment, at the data transmitter, the filter 9a-1 in the transmission amplifier 9 reduces the component in the high-frequency region. Therefore, it is possible to increase the voltage margins M2a and maximally inhibit erroneous reception.

Also, since the communication apparatus 104 as the master includes the filter 9a-1, ii is possible to reduce the unneeded frequency component of the signal to be transmitted in the transmission line 6 in advance and reduce an unneeded radiant component which is produced when the signal propagates along the transmission line 6.

Note that the ninth embodiment described later shows a form in which a filer 21a-1 (see FIG. 37) corresponding to the filter 9a-1 in the present embodiment is placed in the receiving communication apparatus 5. However, when the filter 21a-1 is placed at the receiver, an extra component space should be provided in the receiving communication apparatus 5. When the communication apparatus 5 is, e.g., a vehicle-mounted apparatus, the part/component space in the vehicle-mounted apparatus is preferably minimized. In terms of this point, the distortion compensation system S2 in the present embodiment achieves the effect of allowing the receiving communication apparatus 5 to be simpler than in the ninth embodiment described later.

Figure 34:
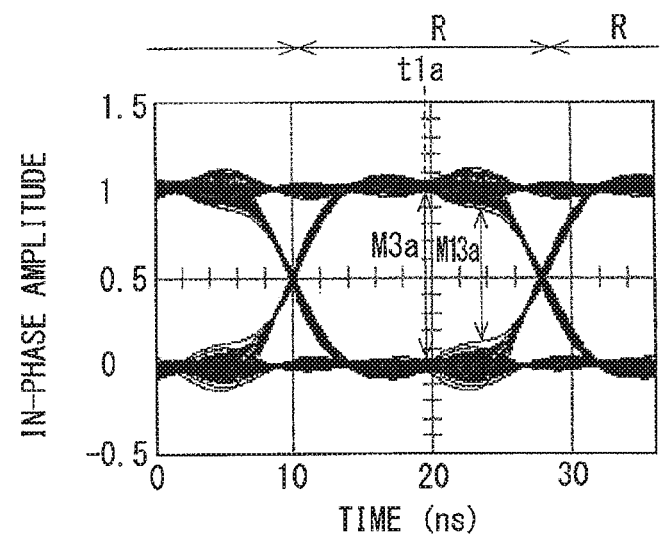
FIG. 34 is a diagram illustrating an example of an eye diagram when each single bit is divided into three sub-bits.
Figure 35:
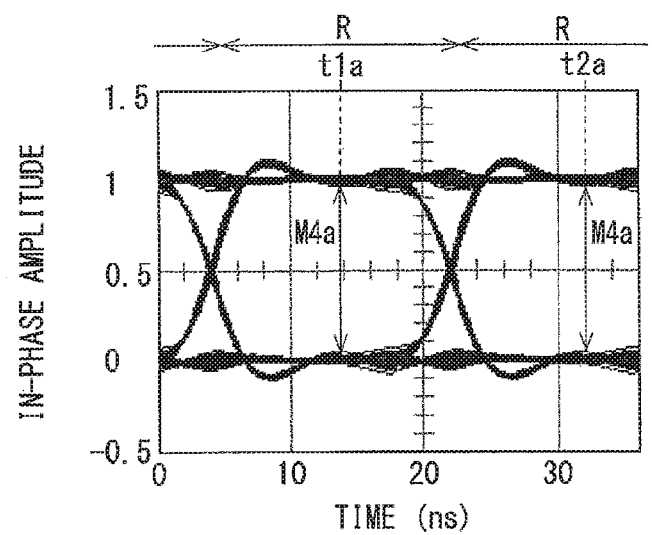
FIG. 35 is a diagram illustrating an example of an eye diagram when each single bit is divided into four sub-bits.
Figure 36:
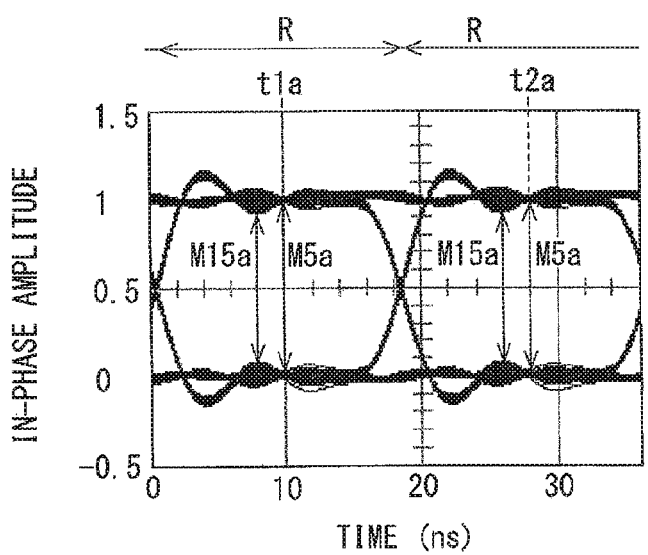
FIG. 36 is a diagram illustrating an example of an eye diagram when each single bit is divided into five sub-bits.

The present embodiment has shown the example in which one bit is halved and assumed as two sub-bits. However, the same effect can be obtained even when one bit is divided into multiple three or more sub-bits. FIG. 34 shows a simulation result (eye diagram) when one bit is divided into three sub-bits. FIG. 35 shows a simulation result (eye diagram) when one bit is divided into four sub-bits. FIG. 36 shows a simulation result (eye diagram) when one bit is divided into five sub-bits. FIGS. 34 to 36 show voltage margins M3a to M5a at the middle timings t1a and t2a between the individual transition regions R. The effect of improving the voltage margins M2a to M5a is highest when one bit is divided into two sub-bits (M2a) rather than when one bit is divided into three or more sub-bits (M3a to M5a).

As the number of the divided sub-bits is increased, the voltage amplitude between the individual sub-bits into which the data is divided can more significantly be reduced. This allows a voltage margin M15a (see FIG. 31B) in this time domain when the number of the divided sub-bits is 5 to be larger than a voltage margin M13a (see FIG. 30B) in this time domain when the number of the divided sub-bits is 3.

It may also be possible to provide the filter 9a-1 using a Nyquist frequency corresponding to the frequency of the data rate as a cut-off frequency without assuming one bit as (multiple) m sub-bits into which the one bit has been divided. In this case also, the same effects as obtained in the first to fifth embodiments can similarly be obtained and the effect of reducing unneeded radiation from the transmission line 6 can be obtained.

Ninth Embodiment

Figure 37:
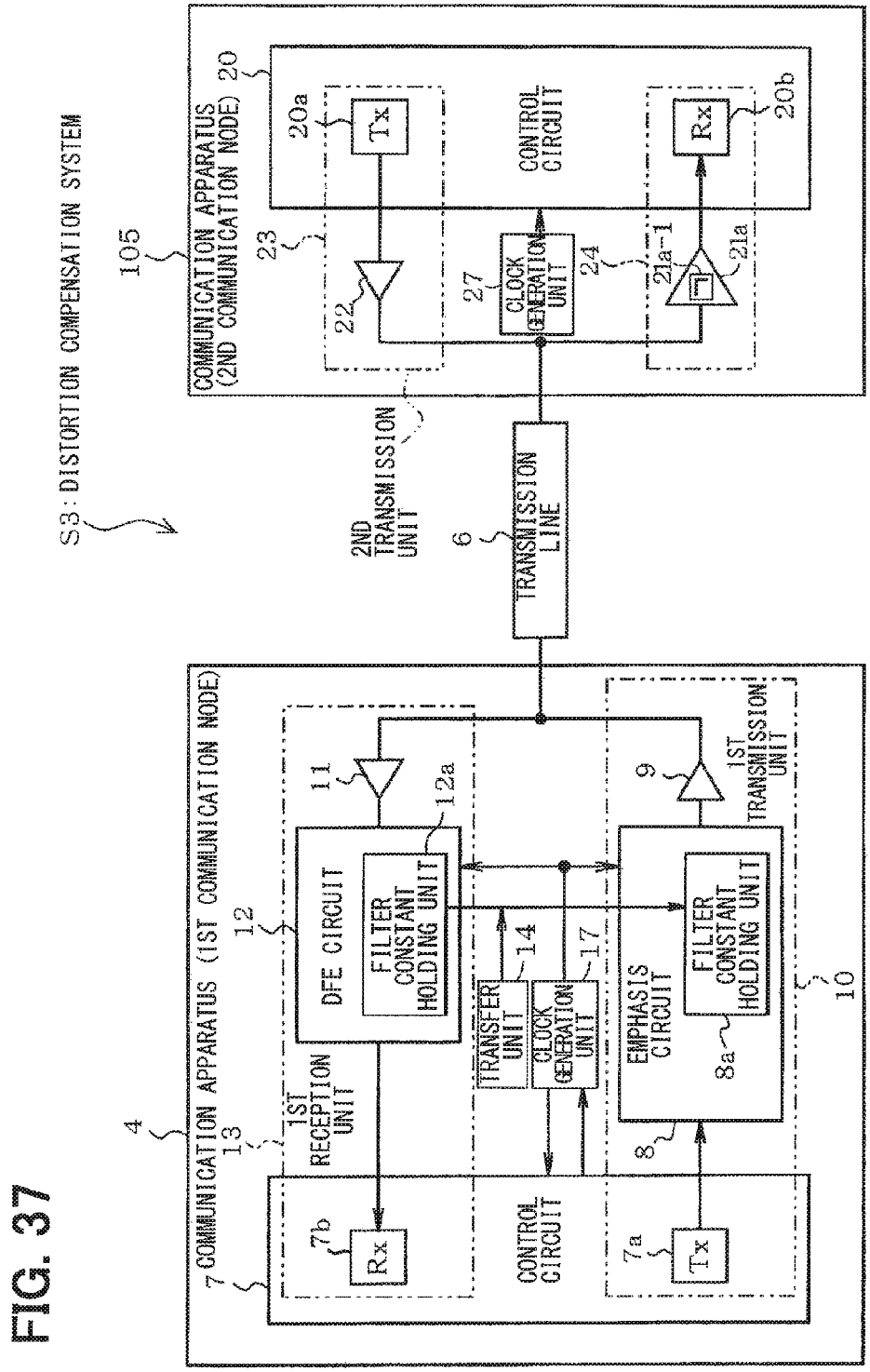
FIG. 37 is a block diagram schematically showing an example of an electric configuration of a distortion compensation system in a ninth embodiment of the present disclosure.

The following will describe a ninth embodiment with reference to FIGS. 37 to 41. The ninth embodiment shows a form in which the filter 21a-1 is provided at the receiver. FIG. 37 illustrates an example of a configuration of a distortion compensation system S3 shown in correspondence to the system S in FIG. 1. As shown in FIG. 1, the communication apparatus 5 as the slave includes the reception amplifier 21 in the reception unit 24. However, a communication apparatus 105 in the distortion compensation system S3 in the present embodiment uses a reception amplifier 21a with the additional filter 21a-1 instead of the reception amplifier 21.

In the same manner as in the filter 9a-1 in the eighth embodiment, the filter 21a-1 in the reception amplifier 21a may appropriately be provided by, e.g., an analog low-pass filter. When the filter 21a-1 is configured in the stage preceding or subsequent to the reception amplifier 21 or the reception amplifier 21a includes multiple amplification stages, the filter 21a-1 is configured at the middle between the multiple amplification stages.

In the same manner as in the present embodiment also, the cut-off frequency in the high-frequency region of the filter 21a-1 may be set appropriately to the Nyquist frequency corresponding to the operation frequency of the DFE circuit 12 for allowing the DFE circuit 12 to operate to perform the division in units of the m sub-bits. The type of the filter 21a-1 is not particularly limited. For example, the tertiary Butterworth filter may be used appropriately.

Figure 38:
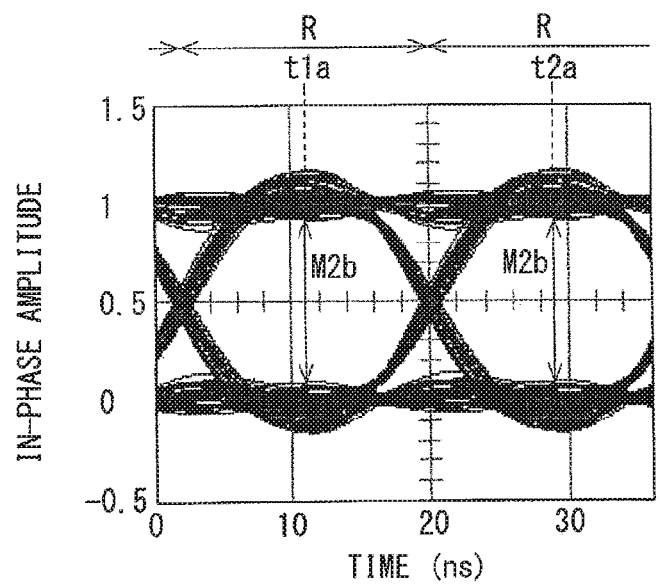
FIG. 38 is a diagram illustrating an example of an eye diagram when each single bit is divided into two sub-bits.

When a simulation is performed using the filter 21a-1 on the assumption that the number of the divided sub-bits is 2 as shown in FIG. 37, the eye diagram shown in FIG. 38 can be obtained. In this case also, a frequency component corresponding to double the data rate can similarly be reduced. This can increase voltage margins M2b at the middle timings t1a and t2a between the two transition regions R.

Note that the eye diagram shown in FIG. 38 is substantially indistinguishable from the eye diagram shown in FIG. 33. This is because, when the propagation characteristic of the transmission line 6 is Gc(f) and the propagation characteristic of each of the filters 9a-1 and 21a-1 is Glpf(f), either when the configuration (FIG. 32) in the eighth embodiment is used or when the configuration (FIG. 37) in the ninth embodiment is used, an overall characteristic Gtotal (f) is given by the following expression and remains unchanged. Accordingly, the same effect can be obtained either from the configuration in the eighth embodiment or from the configuration in the ninth embodiment:

$$Gtotal(f) = Gc(f) \times Glpf(f) \quad \text{(Expression 5)}$$
$$= Glpf(f) \times Gc(f).$$

According to the present embodiment, the filter 21a-1 reduces the high-frequency region at the receiver. This can increase the voltage margins M2b and maximally inhibit erroneous reception.

Figure 39:
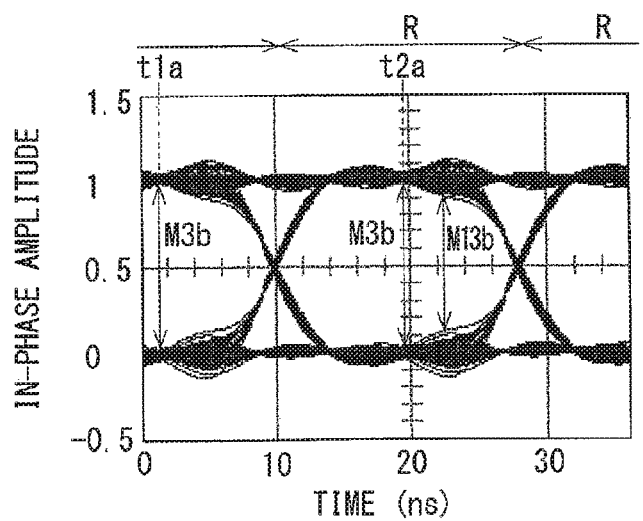
FIG. 39 is a diagram illustrating an example of an eye diagram when each single bit is divided into three sub-bits.
Figure 40:
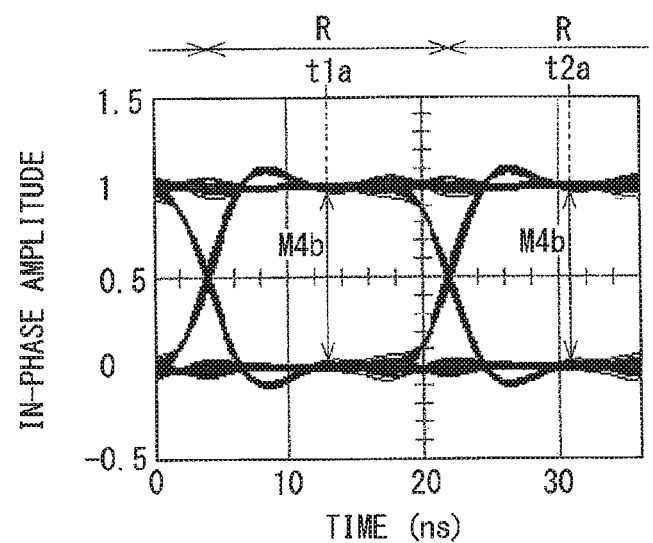
FIG. 40 is a diagram illustrating an example of an eye diagram when each single bit is divided into four sub-bits.
Figure 41:
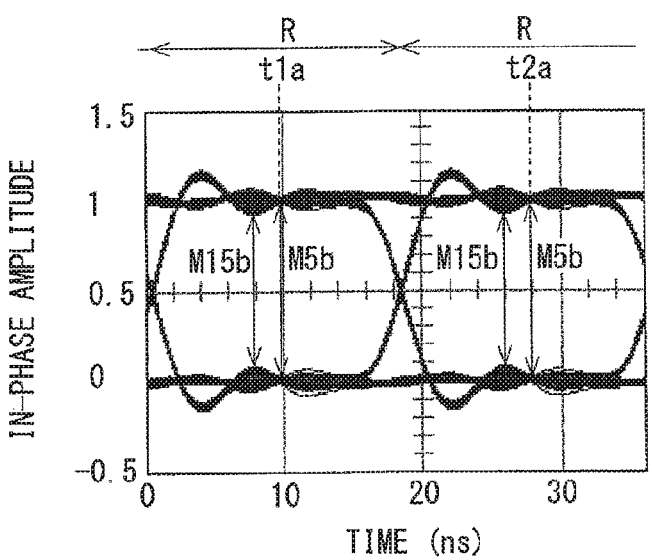
FIG. 41 is a diagram illustrating an example of an eye diagram when each single bit is divided into five sub-bits.
Figure 42:
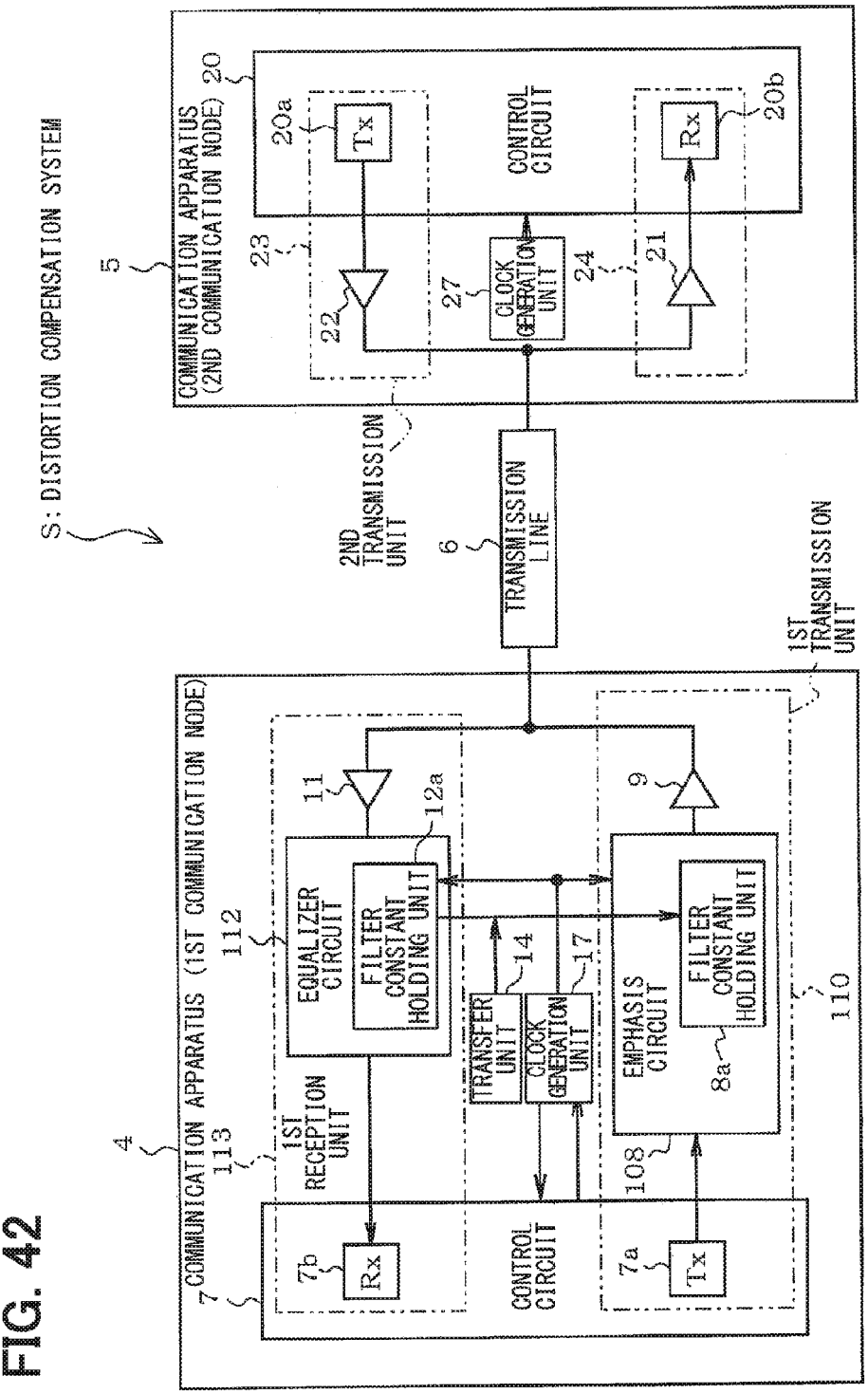
FIG. 42 is a block diagram schematically showing an example of an electric configuration of a distortion compensation system in a tenth embodiment of the present disclosure.

The present embodiment has shown the example in which one bit is halved and assumed as two sub-bits. However, the same effect can be obtained even when one bit is divided into multiple three or more sub-bits. FIG. 39 shows a simulation result (eye diagram) when one bit is divided into three sub-bits. FIG. 40 shows a simulation result (eye diagram) when one bit is divided into four sub-bits. FIG. 41 shows a simulation result (eye diagram) when one bit is divided into five sub-bits. FIGS. 39 to 41 show voltage margins M3b to M5b at the middle timings t1a and t2a between the transition regions R. The effect of improving the voltage margins M2b to M5b is highest when one bit is divided into two sub-bits (M2b) rather than when one bit is divided into three or more sub-bits (M3b to M5b).

As the number of the divided sub-bits is increased, the voltage amplitude between the sub-bits into which the same data is divided can more significantly be reduced. This allows a voltage margin M15b (see FIG. 41) in this time domain when the number of the divided sub-bits is 5 to be larger than a voltage margin M13b (see FIG. 39) in this time domain when the number of the divided sub-bits is 3.

It may also be possible to provide the filter 21a-1 using the Nyquist frequency corresponding to the frequency of the data rate as a cut-off frequency without assuming one bit as (multiple) m sub-bits into which the one bit has been divided. In this case also, the same effects as obtained in the first to fifth embodiments can similarly be obtained.

Tenth Embodiment

Figure 43:
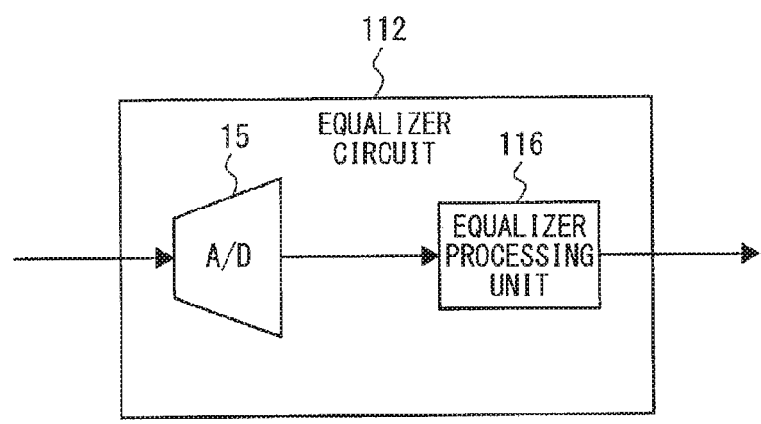
FIG. 43 is an electric configuration diagram schematically showing an example of a configuration of an equalizer.

The following will describe a tenth embodiment with reference to FIGS. 42 to 45B. The tenth embodiment shows a form which is configured using an adaptive linear equalizer serving as an equalizer circuit 112 or the like instead of the DFE circuit 12 in the embodiments described above. A reception unit 113 as a replacement for the reception unit 13 in the communication apparatus (corresponding to the first communication node) 4 shown in FIG. 42 includes the equalizer circuit 112 as an equalizer. The equalizer circuit 112 is a block which performs equalization processing for improving waveform distortion. As shown in FIG. 43, the equalizer circuit 112 includes the A/D conversion unit 15 and an equalizer processing unit 116 which performs adaptive linear equalization processing on the result of conversion by the A/D conversion unit 15. As shown in FIG. 44A, the equalizer processing unit 116 performs distortion compensation processing on an output digital signal from the A/D conversion unit 15. The equalizer processing unit 116 includes a first feedforward filter FF101 as a first digital filter unit, a determiner S101, and a subtractor M101 and is configured with a training pattern holding unit 117 connected to the equalizer processing unit 116.

Figure 44A:
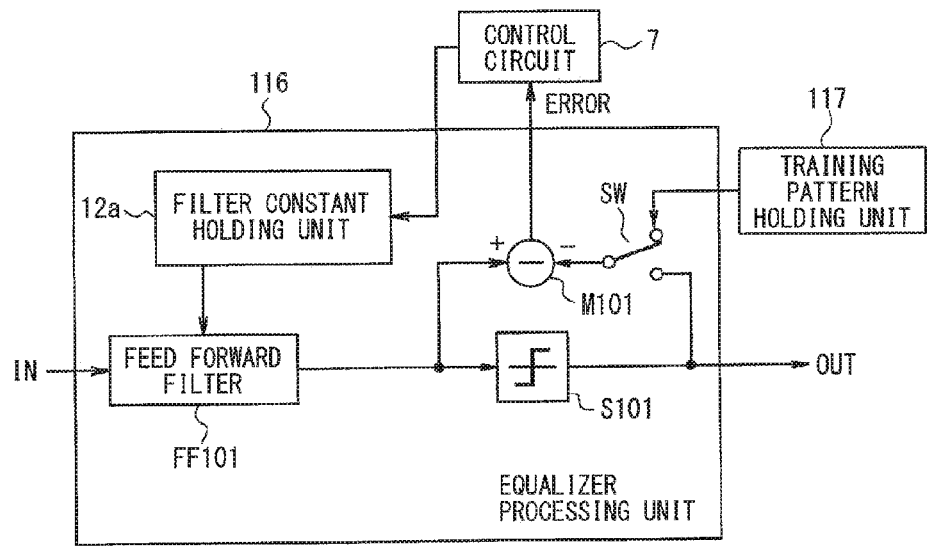
FIG. 44A is an electric configuration diagram schematically showing an example of a configuration of an equalizer processing unit.

In the example shown in FIG. 44A, the first feedforward filter FF101 performs digital filter (e.g., FIR filter) processing on an input digital signal to the equalizer processing unit 116 and outputs the filtered digital signal to the determiner S101 and to the positive input of the subtractor M101.

Figure 44B:
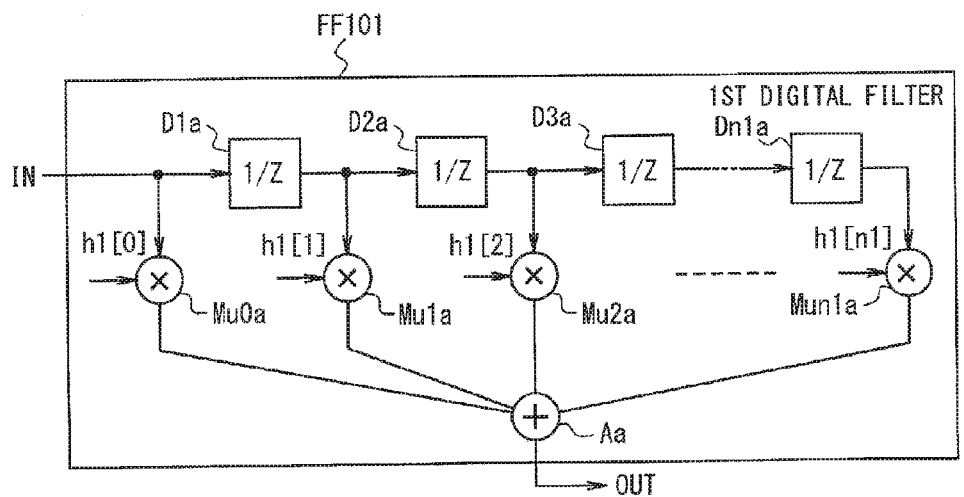
FIG. 44B is an electric configuration diagram schematically showing an example of a configuration of the first feedforward filter.

As shown in FIG. 44B, the first feedforward filter FF101 includes the n1 series-connected 1-clock delay elements D1a to Dn1a, the (n1+1) multipliers Mu0a to Mun1a, and the adder Aa.

Each of the delay elements D1a to Dn1a performs delay processing corresponding to one clock in response to the clock (not shown) given by the control circuit 7. The filter constant holding unit 12a holds the coefficients h1[0] to M[n1] and gives the coefficients h1[0] to h1[n1] to the multipliers Mu0a to Mun1a. The multipliers Mu0a to Mun1a of the first feedforward filter FF101 multiply 0 to n1 clock delay data items resulting from delay processing using the n1 delay elements D1a to Dn1a by the respective coefficients h1[0] to h1[n1]. Here, the 0 clock delay data item represents the input data IN. The adder Aa of the first feedforward filter FF101 adds up the respective results of the multiplications by the multipliers Mu0a to Mun1a to produce the output data OUT.

As shown in FIG. 44A, to the negative input of the subtractor M101, an initial training pattern is input as an initial value from the training pattern holding unit 117. The training pattern holding unit 117 stores, e.g., a pseudo random pattern as the initial training pattern.

The determiner S101 is a circuit which converts a signal waveform as a data value and provides the conversion result as an output result from the equalizer processing unit 116. A signal waveform is distorted under the influence of the transmission line 6. The first feedforward filter FF101 functions to restore the distorted waveform to a corrected waveform close to the original signal waveform. The determiner S101 determines a closest signal level for the corrected waveform. At first, the difference with the initial training pattern is output as an error to the control circuit 7. The control circuit 7 adjusts the filter coefficients h1[0] to h1[n1] of the first feedforward filter FF101 so as to minimize the error, i.e., correct the distortion. After the adjustment proceeds successfully to an extent, the control circuit 7 switches a switch SW and the subtractor M1 acquires the difference between an output of the first feedforward filter FF101 and the output OUT and outputs the different as an error to the control circuit 7.

The control circuit 7 compensates for the influence of the distortion that has occurred under the influence of the transmission line 6, converts each of the coefficients h1[0] to h1[n1] to be set to the first feedforward filter FF101 so as to converge the error to 0, and stores the converged coefficients in the filter constant holding unit 12a. Examples of a convergence method for the filter constant of the digital filter includes a method which uses an algorithm such as, e.g., an LMS (Least Mean Square). However, the convergence method is not limited to this method.

The control circuit 7 converges each of the coefficients h1[0] to h1[n1] to be set to the first feedforward filter FF101 such that the positive and negative inputs of the determiner S101 are equal to each other. It is assumed herein that the convergence is complete when the error (voltage error) between the positive and negative inputs becomes smaller than a predetermined value.

Figure 45A:
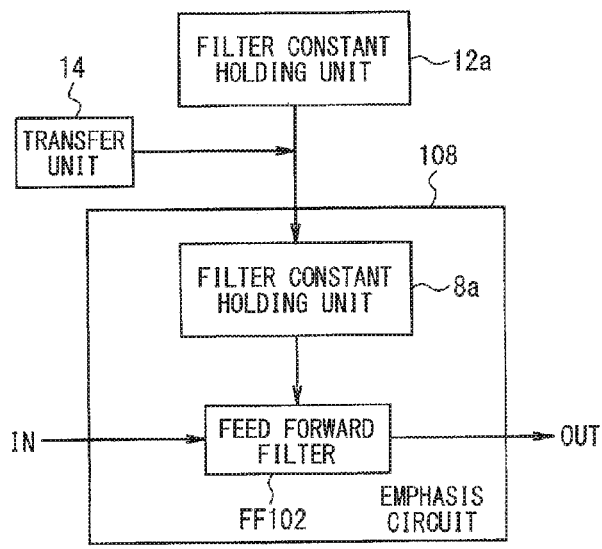
FIG. 45A is an electric configuration diagram schematically showing an example of a configuration of the emphasis circuit.

The emphasis circuit 108 shown in FIG. 45A includes a second feedforward filter FF102 and the filter constant holding unit 8a. Here, the second feedforward filter FF102 is configured to have the same structure as that of, e.g., the first feedforward filter FF101. As shown in FIG. 45A, the emphasis circuit 108 is functionally different from the equalizer circuit 112 and is provided by a circuit obtained by omitting the determiner S101, the subtractor M1, and the switch SW from the equalizer circuit 112.

Figure 45B:
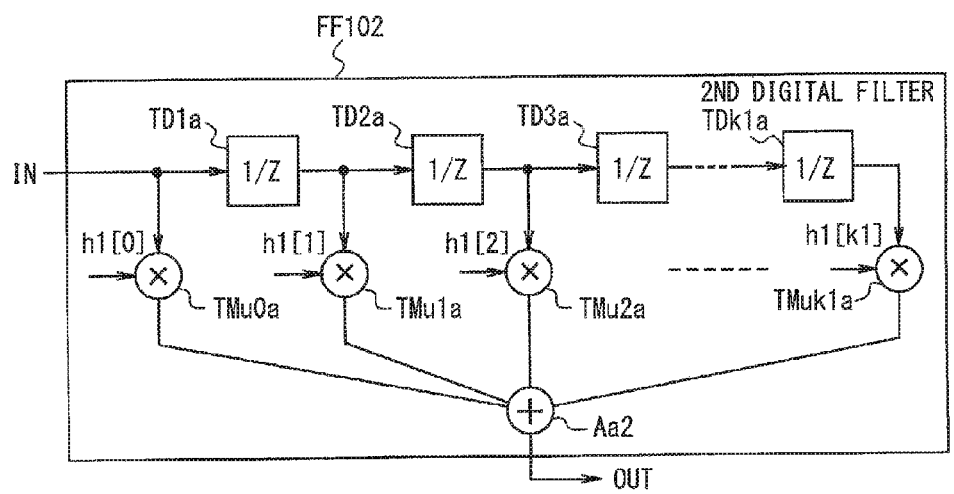
FIG. 45B is an electric configuration diagram schematically showing an example of a configuration of the second feedforward filter.

As shown in FIG. 45B, the second feedforward filter FF102 includes the k1 series-connected 1-clock delay elements TD1a to TDk1a and the (k1+1) multipliers TMu0a to Tmuk1a.

The delay elements TD1a to TDn1a of the second feedforward filter FF102 performs delay processing corresponding to one clock in response to a clock given by the control circuit 7. To the multipliers TMu0a to TMuk1a of the second feedforward filter FF2, the coefficients h1[0] to h1[k1] are given from the filter constant holding unit 8a of the emphasis circuit 8.

That is, compared with the first embodiment or the like, the present embodiment has a configuration similar to a configuration obtained by omitting the first and second feedback filters FB1 and FB2 or the like from the configuration of the first embodiment. In such a form, the equalizer processing unit 116 calculates the multiplication coefficients (tap coefficients corresponding to the filter constant) h1[0] to h1[n1] of the first feedforward filter FF101. The calculation result is stored in the filter constant holding unit 12a in the equalizer processing unit 116.

The transfer unit 14 transfers the coefficients h1[0] to h1[n1] to the filter constant holding unit 8a of the emphasis circuit 108. Then, to the multipliers TMu0b to TMUk1a of the second feedforward filter FF102, the coefficients h1[0] to h1[n1] (the coefficients of the multipliers Mu0a to Mun1a of the first feedforward filter FF1) transferred by the transfer unit 14 to the filter constant holding unit 8a are given. This embodiment shows the form in which all the coefficients are used, but it is sufficient as long as some of the coefficients are used.

Even in such a form, the same effect as obtained in the embodiments described above can be obtained. Note that the method in the present embodiment is appropriate when the frequency dependence of the signal distortion due to the transmission line 6 is not large. The method in the present embodiment is also applicable to the case where the frequency dependent characteristic of the transmission line 6 is complicated and convergence is difficult even when the DFE circuit 12 is used. This is because, since the feedback filters FB1 and FB2 are not provided, the configuration is simpler and more stable than that of the DFE circuit 12.

Eleventh Embodiment

Figure 46:
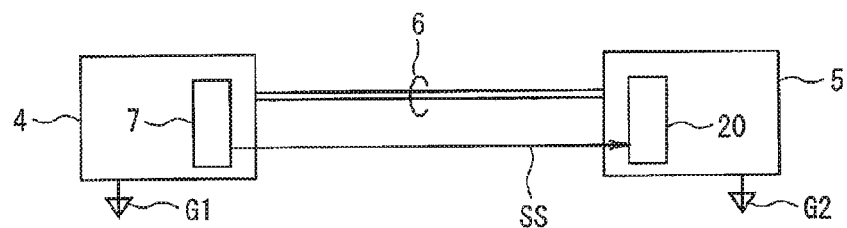
FIG. 46 is a block diagram schematically showing an example of an electric configuration when a training pattern selection signal line for selecting a node to which the training pattern is to be transmitted is connected in an eleventh embodiment of the present disclosure.
Figure 47:
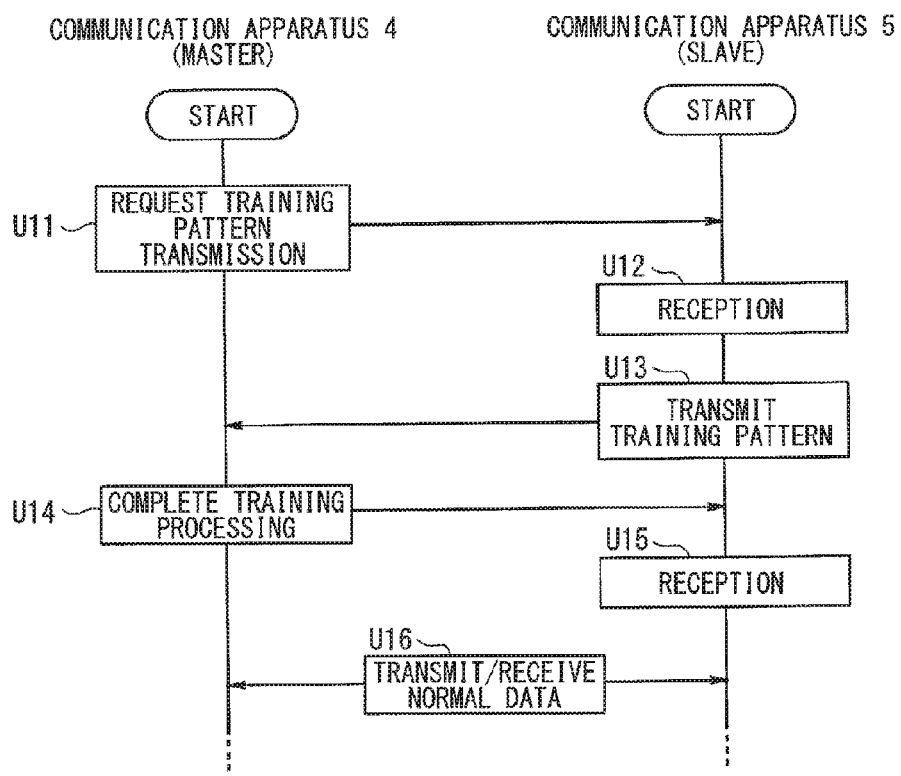
FIG. 47 is a timing chart schematically showing an operation when a training pattern transmission request is issued.

The following will describe an eleventh embodiment with reference to FIGS. 46 and 47. In the embodiments described above, bidirectional communication is performed between the communication apparatus 4 and 5 and, before communicating the normal data between the communication apparatus 4 and 5, the communication apparatus 5 transmits the training pattern to the communication apparatus 4 and observes the influence of the transmission line 6.

However, there may also be a case where, due to a temperature change, a noise environment, communication malfunction between the communication apparatus 4 and 5, it is preferred to perform training again. In such a case, as shown in FIG. 46, a training pattern selection signal line SS may be provided appropriately besides the transmission line 6.

When the control circuit 7 of the communication apparatus 4 transmits/outputs a training transmission request command to the training pattern selection signal line SS, the control circuit 20 of the communication apparatus 5 receives the training transmission request command through the training pattern selection signal line SS.

At this time, when a predetermined signal level (e.g., "H") has been defined in advance as a training pattern transmission request level (command) between the communication apparatus 4 and 5, as shown in FIG. 47, the communication apparatus 4 outputs the predetermined signal level to the communication apparatus 5 to thus issue a request to transmit the training pattern (U11). On receiving the transmission request (U12), the control circuit 20 of the communication apparatus 5 transmits the training pattern (U13) to thus allow the communication apparatus 4 to shift to the training processing.

When the DFE circuit 12 or the equalizer circuit 112 of the communication apparatus 4 performs the equalization processing to thus converge the error to 0 and determine the filter constant, a training pattern processing end signal is set to a signal level (e.g., "L") different from the predetermined signal level to thus show the end of the training processing and then transmitted (U14).

On receiving the transmission request (U15), the control circuit 20 of the communication apparatus 5 allows the data communication processing between the communication apparatus 4 and 5 to shift to the normal data transmission/reception processing (U16).

By providing the training pattern selection signal line SS described above, the communication apparatus 4 plays a major role in allowing switching between the training processing and the normal data communication processing. In particular, when the level of a ground G1 of the communication apparatus 4 and the level of a ground G2 of the communication apparatus 5 are the same (e.g., 0) or different but have a small difference therebetween, only one training pattern selection signal line SS may be provided appropriately. When the communication apparatus 4 and 5 include integrated circuits, this configuration can be provided merely by adding one pin.

Although the example using a digital level (e.g., "H") as the transmission request level has been shown, the transmission request level is not limited to this digital level. A predetermined command using multiple bit strings (a predetermined pattern of digital data) may also be used as the training pattern transmission request command. It may also be possible that, to respective communication apparatus 205a to 205n, individual identification codes are allocated in advance and the transmission request command is determined in advance using a format including the identification codes (some or all of the identification codes) of a communication node to which the transmission request is to be issued. In this case also, the same function/effect is achieved.

Twelfth Embodiment

Figure 48:
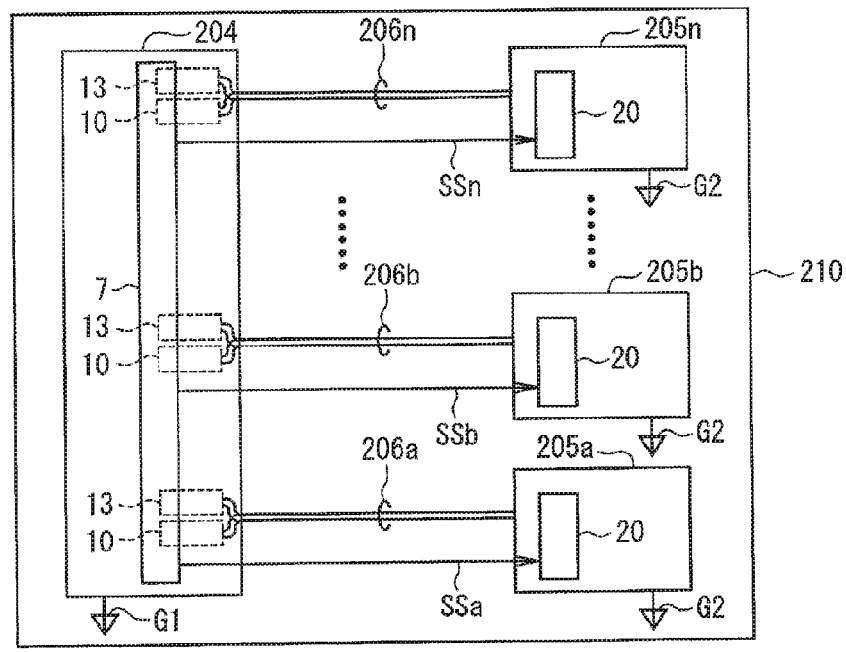
FIG. 48 is a block diagram schematically showing an exemplary implementation in a twelfth embodiment of the present disclosure.
Figure 49:
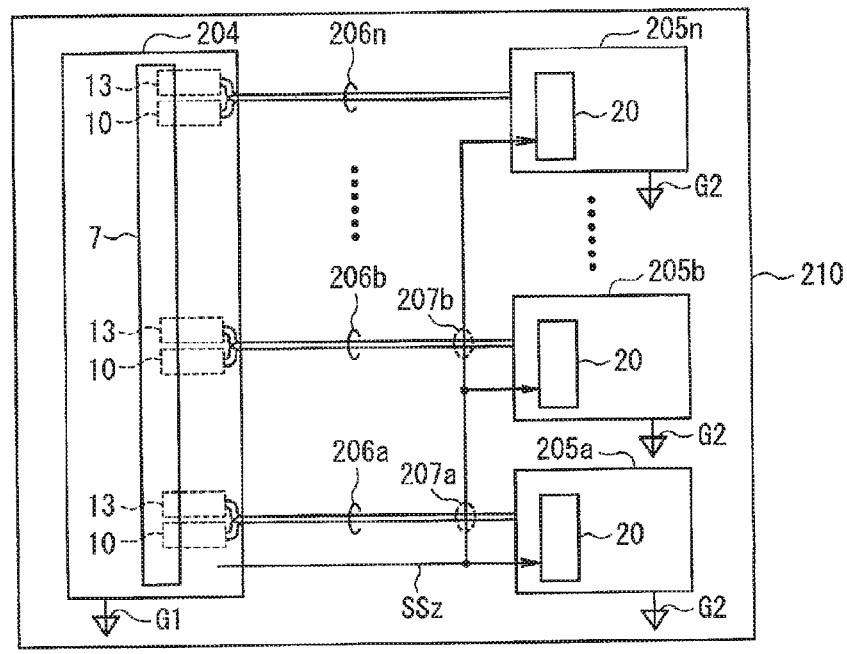
FIG. 49 is a block diagram schematically showing an exemplary implementation.
Figure 50:
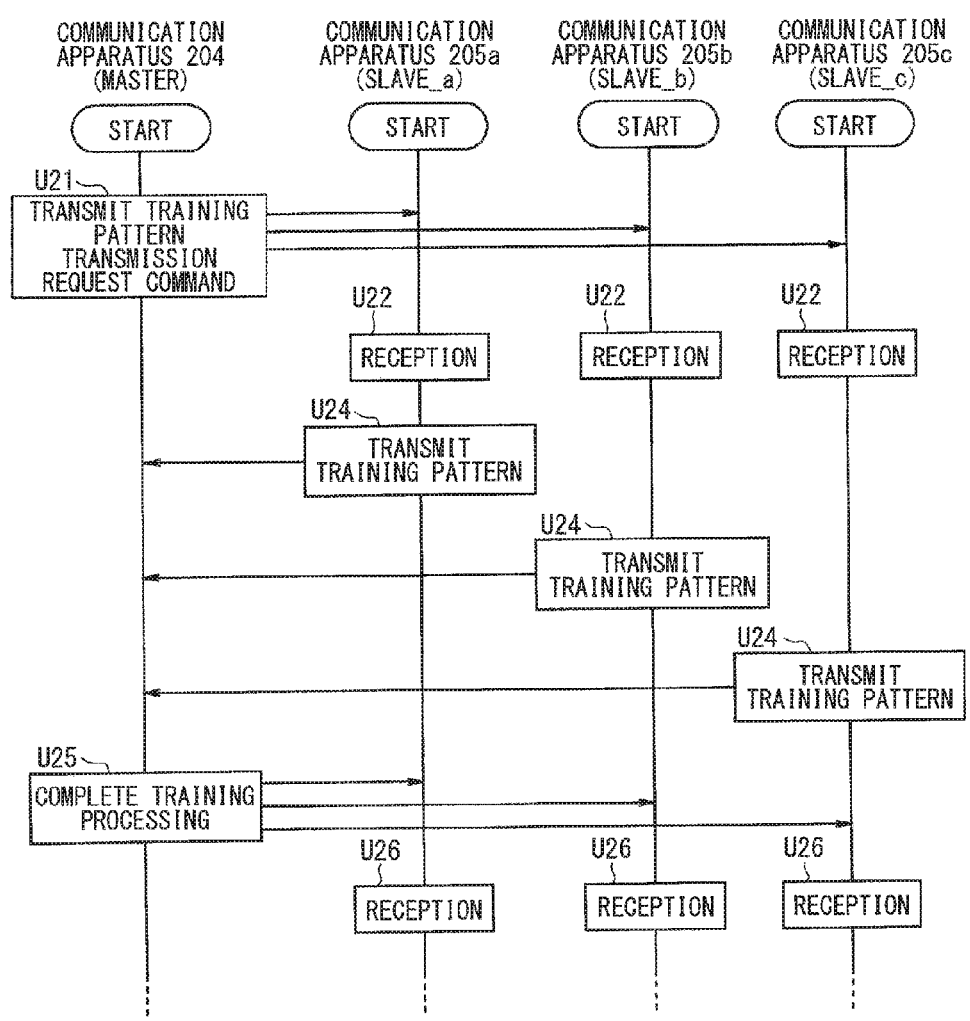
FIG. 50 is a timing chart schematically showing an operation when the training pattern transmission request is issued.

The following will describe a twelfth embodiment with reference to FIGS. 48 to 50. The twelfth embodiment shows a form in which, to a communication apparatus serving as one master, communication apparatus serving as multiple slaves are connected. In such a case, as shown in FIG. 48, a communication apparatus 204 (corresponding to the first communication node) serving as the master in place of the communication apparatus 4 is connected to communication apparatus 205a to 205n serving as the multiple slaves in place of the communication apparatus 5 through respective transmission fines 206a to 206n. As shown in FIGS. 48 and 49, the communication apparatus 204 includes the reception unit 13 and the transmission unit 10 in correspondence to the transmission lines 206a to 206n.

The communication apparatus 205a corresponds to the second communication node. The communication apparatus 205b to 205n correspond to a third communication node. In this case, to the transmission lines 206a to 206n, data communication lines are applicable. The communication apparatus 204 and 205a to 205n are applicable to an example in which the communication apparatus 204 and 205a to 205n are mounted on the same printed wiring substrate 210. Even when not mounted on the printed wiring substrate 210, the communication apparatus 204 and 205a to 205n are applicable to various communication.

In such a connection form, when consideration is given to the provision of the training pattern selection signal line SS shown in the eleventh embodiment, training pattern selection signal lines SSa to SSn may be connected appropriately between the communication apparatus 204 and 205a to 205n.

Such a connection form may be used appropriately but, when communication abnormality occurs between certain communication apparatus (e.g., between 204 and 205a), it is highly possible that there is the same abnormality between other communication apparatus (e.g., between 204 and 205b). In such a case, the communication apparatus 204 may appropriately perform training processing with all the communication apparatus 205a to 205n. This can improve the stability of the entire system.

In such a case, the training pattern selection signal lines SSa to SSn shown in FIG. 48 may be unified (commoditized) appropriately to provide a training pattern selection signal line SSz, as shown in FIG. 49. For example, as shown in FIG. 49, only the one training pattern selection signal line SSz is connected to the control circuit 7 of the communication apparatus 204. The training pattern selection signal line SSz is connected to the control circuit 20 of each of the communication apparatus 205a to 205n. In the present embodiment, the command using the predetermined digital level "H" is used as the training pattern transmission request command.

FIG. 50 schematically shows a timing chart when the training pattern transmission request is issued. When the control circuit 7 of the communication apparatus 204 transmits the training pattern transmission request command through the training pattern selection signal line SSz (U21), the control circuit 20 of each of the communication apparatus 205a to 205n receives the transmission request (U22) and transmits the training pattern (U24). Thus, the communication apparatus 204 performs distortion compensation processing for the transmission line 206a. On ending the training processing, the control circuit 7 of the communication apparatus 204 transmits an end command showing the end of the training processing through the training pattern selection signal line SSz (U25). When the communication apparatus 205a to 205n receive the end command (U26), the communication apparatus 204 and 205a to 205n can perform the normal data transmission/reception processing. This can compensate for the influence of the distortion due to the transmission line 206a and improve the stability of the entire system.

When the communication apparatus 204 is provided by the integrated circuit by applying the configuration in FIG. 49 to the communication apparatus 204, the configuration can be provided by adding only one connection pin for transmitting the training pattern transmission request command to the communication apparatus 205a to 205n. This can minimize an increase in the number of pins.

In the configuration shown in FIG. 49, the training pattern selection signal line SSz two-dimensionally crosses the transmission lines 206a and the like (see crossing portions 207a, 207b, and the like). To construct the configurations of the crossing portions 207a and 207b in the printed wiring substrate 210, the printed wiring substrate 210 may appropriately be provided by a multilayer substrate including an inner layer or a double-faced substrate. As a result, even when there are the crossing portions 207a and 207b in an electric circuit, the training pattern selection signal line SSz or the transmission lines 206a to 206n can be constructed through the inner layer of the multilayer substrate of the printed wiring substrate 210 or the two surfaces of the double-faced substrate. Accordingly, even when the training pattern selection signal line SSz two-dimensionally crosses the transmission lines 206a and the like, the configuration shown in FIG. 49 can be provided.

When the printed wiring substrate 210 is provided by a multilayer substrate, inner-layer wires in the printed wiring substrate 210 may be complicated. Therefore, it may be desirable to maximally avoid configuring the printed wiring substrate 210 of a multilayer substrate. When the foregoing configuration is to be provided using a double-faced substrate having no inner layer as the printed wiring substrate 210, a power supply node or the node of the ground G1 or G2 which is inherently desired to occupy a larger area is divided. In this case, the transmission characteristic through the transmission lines 206a to 206n may deteriorate.

For example, when an improvement in transmission characteristic is required and when, e.g., the communication apparatus 205a to 205n are provided by integrated circuits, it is appropriate to use multiple wiring layers in the integrated circuit in the communication apparatus 205a and construct the crossing portions 211a, 211b, and the like between the training pattern selection signal line SSz and the transmission lines 206a, 206b, and the like.

Figure 51:
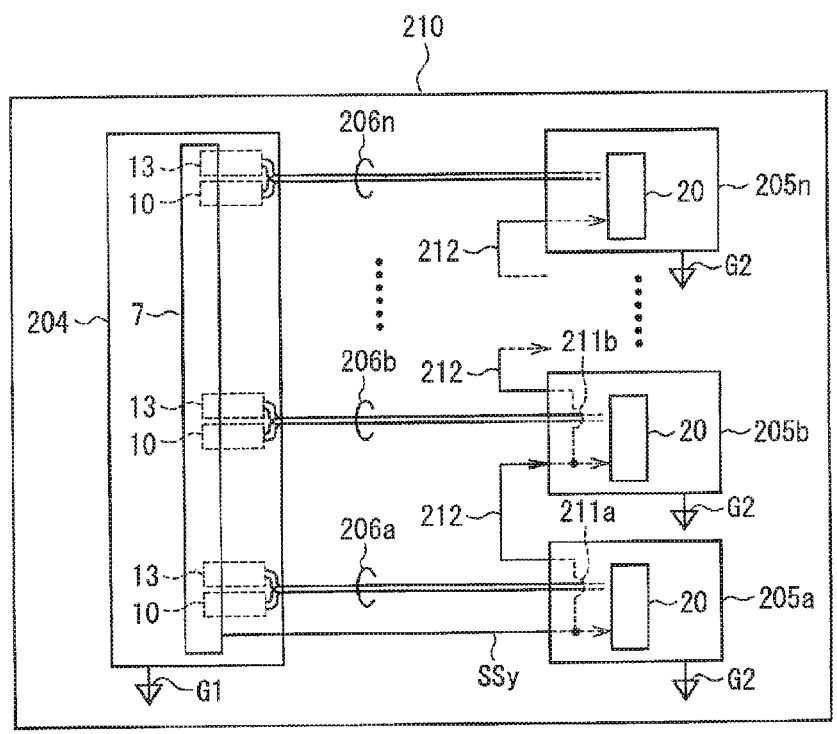
FIG. 51 is a block diagram schematically showing an exemplary implementation.

This allows the training pattern selection signal line SSy to be configured between the communication apparatus 204 and 205a and eliminates the need to connect the training pattern selection signal line SSy directly to the other communication apparatus 205b to 205n. As shown in FIG. 51, between the adjacent communication apparatus 205a and 205b, 205b and 205c, and the like, relay lines 212 may be configured appropriately. This can maximally suppress an increase in the number of wiring layers of the printed wiring substrate 210.

The training pattern transmission request command is a small amount of information even when the identification codes of communication partners such as the communication apparatus 205a, 205b, and the like are included in the training pattern transmission request command. As described above, the training pattern transmission request command may also be only a predetermined digital level (e.g., "H"). Accordingly, it is sufficient for the transmission speed to be low compared to the transmission speed for the transmission/reception of the training pattern, the transmission speed for the transmission/reception of the normal data, or the like. Therefore, the adverse effect exerted by passing though the communication apparatus 205a and the like can maximally be inhibited.

Thirteenth Embodiment

Figure 52:
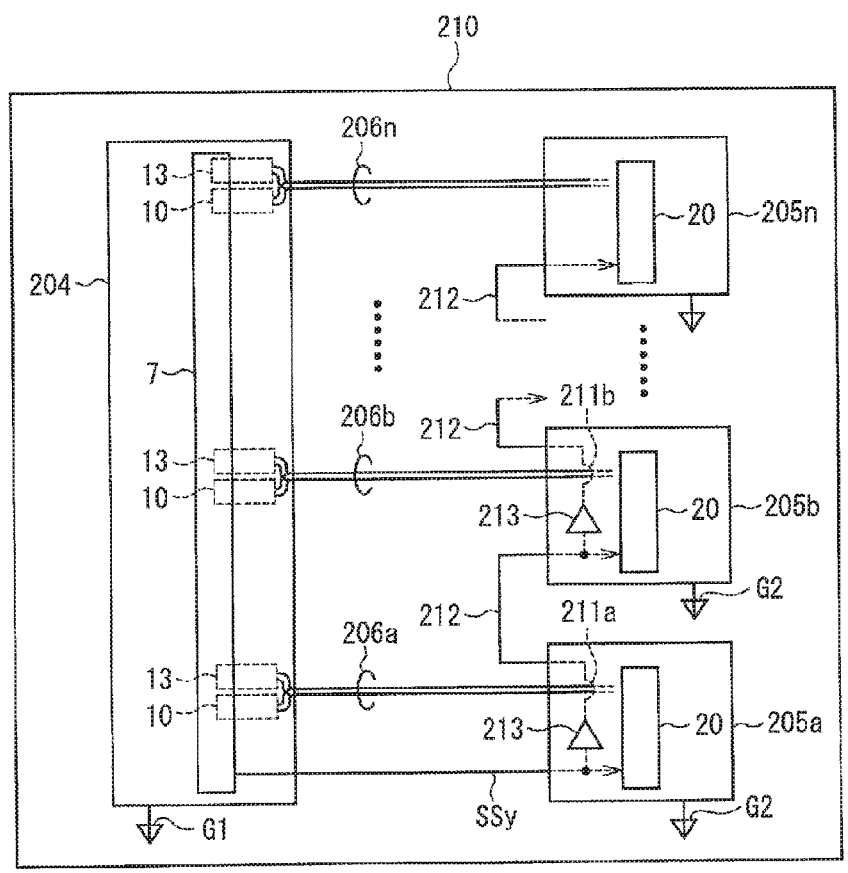
FIG. 52 is a block diagram schematically showing an exemplary implementation in a thirteenth embodiment of the present disclosure.

The following will describe a thirteenth embodiment with reference to FIG. 52. The thirteenth embodiment shows a form in which a waveform shaping unit is provided. As shown in FIG. 52, signal degradation occurs when the training pattern selection signal line SSy passes through the inner layers of the multiple wiring layers of the communication apparatus 205a and the like. When the influence of the signal degradation is ignorable, there is substantially no problem. However, some times the influence cannot be ignorable.

This is because, when the lengths of the training pattern selection signal line SSy and the relay lines 212 are increased, series resistance components are also accordingly increased and a noise source becomes closer. In this case, it is appropriate to provide a buffer 213 as a waveform shaping unit in the integrated circuit of each of the communication apparatus 205a and the like as necessary to shape the waveform of a signal and allow the communication apparatus 205a to transmit the signal to each of the communication apparatus 205b to 205n. This can minimize the degradation of the transmission characteristic.

Other Embodiments

The present disclosure is not limited to the embodiments described above, and can be modified or expanded as shown below.

Although the example in which the distortion compensation system S is configured in the vehicle has been shown, the application of the distortion compensation system S is not limited to an in-vehicle communication form. The distortion compensation system S may also be applied to another communication form outside the vehicle. In the embodiments described above, the connection form using the CAN 6a of the vehicle-mounted LAN has been shown. However, the connection form is not limited to bus connection. As long as the multiple communication apparatus which perform transmission/reception processing uses the same transmission line 6, the communication apparatus may also be applied to another connection form. Although the form in which the vehicle-mounted network is applied to the CAN 6a has been shown, the vehicle-mounted network is not limited to the CAN 6a. The vehicle-mounted network is applicable to another vehicle-mounted network system.

Although the example in which the ECUs are configured such that the circuit sizes of the other ECUs (e.g., ECU_B) are smaller than the circuit size of one of the ECUs (e.g., ECU_A) has been shown, the configuration is not limited thereto. The configuration is also applicable to the ECUs having circuit sizes any one of which may be larger than or equal to the others.

For the sake of convenience, the transmission line 6 which performs single end transmission has been described, but the transmission line 6 is not limited to this transmission method. The use of differential transmission lines is particularly desirable.

Although the form in which the DFE circuit 12 stores the processed filter constant in the filter constant holding unit 12a and the transfer unit 14 transfers the filter constant to the filter constant holding unit 8a of the emphasis circuit 8 has been shown, it may also be possible to commonly use the same register as each of the filter constant holding units 12a and 8a. As long as at least some of the filter constants of the DFE circuit 12 are used as the filter constants of the emphasis circuit 8, it is unnecessary to use all the filter constants of the DFE circuit 12.

The second feedforward filter FF2 of the emphasis circuit 8 may also be configured such that the number of the filter taps of the second feedforward filter FF2 is smaller than the number of the filter taps of the second feedback filter FB2 of the emphasis circuit 8. This is because it has been found that, even when the number of the filter taps of the second feedforward filter FF2 of the emphasis circuit 8 is reduced, the reduced number of the filter taps of the second feedforward filter FF2 is less influential than that of the second feedback filter FB2.

The second feedforward filter FF2 of the emphasis circuit 8 may also be configured such that the number of the filter taps of the second feedforward filter FF2 is smaller than the number of the filter taps of the second feedback filter FB2 of the emphasis circuit 8. This is because it has been found that, even when the number of the filter taps of the second feedforward filter FF2 of the emphasis circuit 8 is reduced, the reduced number of the filter taps of the second feedforward filter FF2 is less influential than that of the second feedback filter FB2.

Although the form in which the filter constant holding units 8a and 12a hold the coefficients of the digital filters FF1, FF2, FB1, and FB2 has been shown, a method for holding the respective parameters of the digital filters FF1, FF2, FB1, and FB2 is not limited to this method, but may also be in a form in which the parameters are held in another data format. In this case, the number of digits in data which defines an error in the filter constant of each of the digital filters may be adjusted appropriately.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A distortion compensation system comprising:
a first communication node including a first reception unit and a first transmission unit, the first reception unit including an equalizer and the equalizer including a first digital filter unit, and the first transmission unit including an emphasis circuit and the emphasis circuit including a second digital filter unit; and
a second communication node including a second transmission unit, and the second transmission unit transmitting through a first transmission line a training pattern determined in advance before receiving normal data from the first transmission unit of the first communication node through the first transmission line, wherein
the first communication node receives the training pattern transmitted from the second transmission unit of the second communication node over the first transmission line using the first reception unit,
the equalizer converges a filter constant of the first digital filter unit so that an error with respect to the training pattern to be received is converged,
the first transmission unit of the first communication node performs a distortion compensation on the normal data to be transmitted using the converged filter constant of the first digital filter unit as at least a part of a filter constant of the second digital filter unit of the emphasis circuit, and then transmits the normal data over the first transmission line,
wherein the first transmission line is an only transmission line between the first communication node and the second communication node, and
wherein the first transmission line includes a pair of differential communication cables.

2. The distortion compensation system according to claim 1, wherein
the equalizer of the first reception unit is provided by a decision feedback equalizer (DFE) circuit,
the equalizer of the first reception unit includes, as the first digital filter unit, a first feedforward filter and a first feedback filter,
the equalizer of the first reception unit further includes a slicer,
the first feedforward filter performs a first digital filter processing on input data to the DFE circuit,
the first feedback filter performs a second digital filter processing on output data from the DFE circuit,
the slicer adds up an output of the first feedforward filter and an output of the first feedback filter and compares an addition result with an output of the DFE circuit in order to match the addition result with the output of the DFE circuit,
the emphasis circuit of the first transmission unit includes, as the second digital filter unit, a second feedforward filter and a second feedback filter,
the second feedforward filter performs a first digital filter processing on input data to the emphasis circuit, the second feedback filter performs a second digital filter processing on output data from the emphasis circuit, and the emphasis circuit of the first transmission unit adds up an output of the second feedforward filter and an output of the second feedback filter, and then outputs an addition result.

3. The distortion compensation system according to claim 1, wherein the equalizer of the first reception unit is provided by an adaptive linear equalizer, the adaptive linear equalizer of the first reception unit includes, as the first digital filter unit, a first feedforward filter that performs a first digital filter processing on input data to the adaptive linear equalizer, the adaptive linear equalizer of the first reception unit further includes a determiner that compares output data from the equalizer with an output of the first feedforward filter in order to match the output data from the equalizer with the output of the first feedforward filter, the emphasis circuit of the first transmission unit includes, as the second digital filter unit, a second feedforward filter that performs a first digital filter processing on input data to the emphasis circuit, and the emphasis circuit of the first transmission unit provides an output of the second feedforward filter as an output result.

4. The distortion compensation system according to claim 1, wherein the first reception unit receives each bit of the training pattern at an operation frequency, the equalizer operates at an operation frequency higher than the operation frequency of the first reception unit so as to divide each bit of the training pattern into two or more sub-bits and the divided sub-bits have equal consecutive data values, the equalizer converges the filter constant of the first digital filter unit so that errors in the sub-bits of the received training pattern are converged, the first transmission unit of the first communication node operates at an equal frequency as the equalizer, and the first transmission unit of the first communication node performs the distortion compensation on the normal data to be transmitted in units of the sub-bits using the converged filter constant of the first digital filter unit as at least a part of the filter constant of the second digital filter unit of the emphasis circuit, and then transmits the normal data.

5. The distortion compensation system according to claim 4, wherein a quantity of the divided sub-bits is an odd number.

6. The distortion compensation system according to claim 5, wherein the quantity of the divided sub-bits is equal to three.

7. The distortion compensation system according to claim 4, wherein the first communication node further includes a filter which reduces components in a high-frequency region when the first communication node performs the distortion compensation on the normal data in units of the sub-bits and transmits the normal data to the second communication node.

8. The distortion compensation system according to claim 4, wherein the second communication node further includes a filter which reduces components in a high-frequency region when the second communication node receives, from the first communication node, the normal data on which the distortion compensation has been performed in units of the sub-bits.

9. The distortion compensation system according to claim 7, wherein the filter has a cut-off frequency in the high-frequency region, and the cut-off frequency is set to a Nyquist frequency corresponding to the operation frequency of the equalizer at which the equalizer divides each bit of the training pattern into the sub-bits.

10. The distortion compensation system according to claim 2, wherein a quantity of filter taps in the second feedforward filter of the emphasis circuit is smaller than a quantity of filter taps in the first feedforward filter of the equalizer.

11. The distortion compensation system according to claim 2, wherein a quantity of filter taps in the second feedback filter of the emphasis circuit is smaller than a quantity of filter taps in the first feedback filter of the DFE circuit.

12. The distortion compensation system according to claim 2, wherein a quantity of the filter taps in the second feedforward filter of the emphasis circuit is smaller than a quantity of filter taps in the second feedback filter of the emphasis circuit.

13. The distortion compensation system according to claim 2, wherein a quantity of digits of data which defines an error in a filter constant of the second feedforward filter of the emphasis circuit is smaller than a quantity of digits of data which defines an error in a filter constant of the first feedback filter of the DFE circuit.

14. The distortion compensation system according to claim 2, wherein a quantity of digits of data which defines an error in a filter constant of the second feedback filter of the emphasis circuit is smaller than a quantity of digits of data which defines an error in a filter constant of the first feedback filter of the DFE circuit.

15. The distortion compensation system according to claim 2, wherein a quantity of effective bits which define an error in a filter constant of the second feedforward filter of the emphasis circuit is smaller than a quantity of effective bits which define an error in a filter constant of the second feedback filter of the emphasis circuit.

16. The distortion compensation system according to claim 1, wherein the training pattern includes a pseudo random number pattern.

17. The distortion compensation system according to claim 1, wherein the first communication node transmits, as the normal data, a program to the second communication node.

18. The distortion compensation system according to claim 1, wherein the first communication node includes a filter constant holding unit which holds the filter constants of the first digital filter unit and the second digital filter unit when the second communication node is a communication partner node.

19. The distortion compensation system according to claim 1,
wherein the first transmission line includes a bus and the bus includes a non-terminal branched path.

20. The distortion compensation system according to claim 1, wherein
the first transmission line includes a bus,
the first communication node and the second communication node are connected to the bus, and
the distortion compensation system further comprises one or more third communication nodes other than the first and second communication nodes, and the one or more third communication nodes are also connected to the bus.

21. The distortion compensation system according to claim 20, wherein
each of the one or more third communication nodes includes the second transmission unit which transmits the training pattern determined in advance before communicating the normal data between the second transmission unit and the first communication node,
the first communication node includes a transmission request unit which successively transmits at least one transmission request to at least one different communication node,
the at least one different communication node is at least one of the second communication node or the one or more third communication nodes which is different from the first communication node, and,
when the at least one different communication node receives the at least one transmission request from the transmission request unit of the first communication node, the second transmission unit of each of the at least one different communication node transmits the training pattern to the first communication node.

22. The distortion compensation system according to claim 20, wherein
a data transmission speed from the first communication node to the second communication node is higher than a data transmission speed between the second communication node and each of the one or more third communication nodes on the bus, and
the data transmission speed from the first communication node to the second communication node is also higher than a data transmission speed between each two of the one or more third communication nodes on the bus.

23. The distortion compensation system according to claim 20, wherein,
while the first communication node performs a communication with the second communication node or with the third communication node on the bus, remaining communication nodes which do not join the communication ignore the data being communicated on the bus.

24. The distortion compensation system according to claim 19,
wherein the first communication node is connectable to the bus using a cable that is detachable from the bus.

25. The distortion compensation system according to claim 19,
wherein the first communication node is connected to a higher-order network via a port different from a port connected to the bus.

26. The distortion compensation system according to claim 1, further comprising:
a training pattern selection signal line which connects the first communication node with the second communication node, wherein
the first communication node includes a transmission request unit which transmits a transmission request requiring a transmission of the training pattern to the second communication node through the training pattern selection signal line, and
the second transmission unit of the second communication node transmits the training pattern to the first communication node in response to the transmission request from the transmission request unit of the first communication node.

27. The distortion compensation system according to claim 1, further comprising:
one or more third communication nodes other than the first communication node and the second communication node, and the one or more third communication nodes being connected to the first communication node through respective second transmission lines;
a first training pattern selection signal line connecting the first communication node with the second communication node; and
one or more second training pattern selection signal lines connecting the first communication node, respectively, with the one or more third communication nodes, wherein
the first communication node includes a transmission request unit which transmits a transmission request for the training pattern to each of the second communication node and the one or more third communication nodes as a target communication node through each of the first and second training pattern selection signal lines, and
the second transmission unit of the target communication node transmits the training pattern to the first communication node in response to the transmission request from the transmission request unit of the first communication node.

28. The distortion compensation system according to claim 1, further comprising:
one or more third communication nodes other than the first communication node and the second communication node, and the one or more third communication nodes being connected to the first communication node through respective second transmission lines; and
a training pattern selection signal line connecting the first communication node with each of the second communication node and the one or more third communication nodes, wherein
the first communication node includes a transmission request unit which transmits a transmission request for the training pattern to each of the second communication node and the one or more third communication nodes as a target communication node through the training pattern selection signal line, and
the second transmission unit of the target communication node transmits the training pattern to the first communication node in response to the transmission request from the transmission request unit of the first communication node.

29. The distortion compensation system according to claim 1, further comprising:
one or more third communication nodes other than the first communication node and the second communication node, and the one or more third communication nodes being connected to the first communication node through respective second transmission lines;

a training pattern selection signal line connecting the first communication node with the second communication node; and a relay line connecting the second communication node with the one or more third communication nodes, wherein the first communication node includes a transmission request unit which communicates with the second communication node through the training pattern selection signal line so as to transmit a transmission request for the training pattern to the second communication node or to each of the one or more third communication nodes, the second communication node is provided by an integrated circuit, and the integrated circuit includes multiple wiring layers which enable a transmission of the transmission request to each of the one or more third communication nodes through the multiple wiring layers and the relay line when the transmission request is transmitted from the transmission request unit of the first communications node, and the second transmission unit of a target communication node, which is one of the second communication node and the one or more third communication nodes to which the transmission request is transmitted, transmits the training pattern to the first communication node.

30. The distortion compensation system according to claim 29,
wherein the first communication node and the second communication node are mounted on a printed wiring substrate.

31. The distortion compensation system according to claim 29,
wherein the integrated circuit of the second communication node includes a waveform shaping unit which shapes a waveform of the transmission request.

32. The distortion compensation system according to claim 26,
wherein the transmission request unit transmits the transmission request for the training pattern to each of one or more target communication nodes.

33. The distortion compensation system according to claim 26,
wherein a quantity of the training pattern selection signal line is only one.

34. The distortion compensation system according to claim 26,
wherein the transmission request unit outputs a predetermined digital level to the training pattern selection signal line as the transmission request for the training pattern when transmitting the transmission request for the training pattern through the training pattern selection signal line.

35. The distortion compensation system according to claim 27,
wherein the transmission request unit outputs a predetermined digital level to the first or second training pattern selection signal line as the transmission request for the training pattern when transmitting the transmission request for the training pattern through the first or second training pattern selection signal line.

36. The distortion compensation system according to claim 1,
wherein the second communication node is equipped to a drive circuit of a vehicular actuator.

37. The distortion compensation system according to claim 1,
wherein the first communication node is equipped to a vehicular ECU.

38. The distortion compensation system according to claim 1,
wherein the first communication node is equipped to a program rewriting device and transmits a program as the normal data to the second communication node.

39. A communication apparatus comprising the first communication node according to claim 1.

40. A communication apparatus comprising:
a first reception unit including an equalizer and the equalizer including a first digital filter unit; and
a first transmission unit including an emphasis circuit and the emphasis circuit including a second digital filter unit, wherein
the first reception unit receives a training pattern over a first transmission line when the training pattern determined in advance is transmitted from a second transmission unit of a second communication node,
the equalizer converges a filter constant of the first digital filter unit so that an error with respect to the training pattern to be received is converged, and
the first transmission unit performs a distortion compensation on normal data to be transmitted over the first transmission line using the converged filter constant of the first digital filter as at least a part of a filter constant of the second digital filter unit of the emphasis circuit, and then transmits the normal data,
wherein the first transmission line is an only transmission line between the first communication node and the second communication node, and
wherein the first transmission line includes a pair of differential communication cables.

* * * * *